United States Patent [19]
Dannheim

[11] Patent Number: 5,821,347
[45] Date of Patent: Oct. 13, 1998

[54] WATER-SOLUBLE AZO DYESTUFFS, PROCESSES FOR THEIR PREPARATION AND THEIR USE

[75] Inventor: Jörg Dannheim, Frankfurt, Germany

[73] Assignee: Dy Star Textil farben Gmbh & Co. Deutschland KG, Frankfurt am Main, Germany

[21] Appl. No.: 771,130

[22] Filed: Dec. 20, 1996

[30] Foreign Application Priority Data

Dec. 22, 1995 [DE] Germany .................. 195 48 429.0

[51] Int. Cl.⁶ .................. C09B 62/09; C09B 62/513
[52] U.S. Cl. .................. 534/634; 534/631
[58] Field of Search ............ 534/634

[56] References Cited

U.S. PATENT DOCUMENTS

| | | | |
|---|---|---|---|
| 4,323,497 | 4/1982 | Hoyer et al. ............. | 534/634 |
| 4,845,202 | 7/1989 | Schlafer et al. .......... | 534/605 |
| 5,175,262 | 12/1992 | Loeffler et al. .......... | 534/634 |
| 5,552,532 | 9/1996 | Klier et al. ............. | 534/612 |
| 5,612,463 | 3/1997 | Tzikas .................. | 534/634 |

FOREIGN PATENT DOCUMENTS

| | | |
|---|---|---|
| 0 235 521 | 9/1987 | European Pat. Off. . |
| 0 265 828 | 5/1988 | European Pat. Off. . |
| 0 387 579 | 9/1990 | European Pat. Off. . |
| 0 458 743 | 11/1991 | European Pat. Off. . |
| 0 625 549 | 11/1994 | European Pat. Off. . |
| 2 008 144 | 5/1979 | United Kingdom . |

*Primary Examiner*—Fiona T. Powers
*Attorney, Agent, or Firm*—Connelly & Hute

[57] ABSTRACT

Dyestuffs corresponding to the general formula

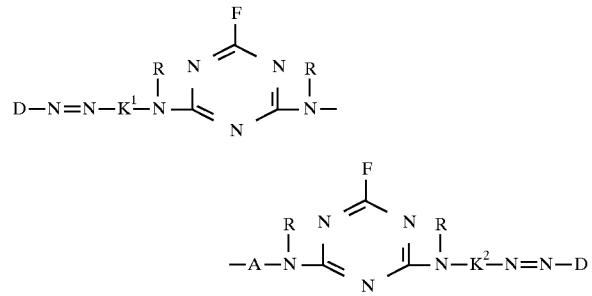

are described in which the variables have the meaning given in the specification. These dyestuffs have fiber-reactive properties and dye materials containing hydroxy and/or carboxamide groups, in particular fiber materials, such as wool, synthetic polyamide fibers and, in particular, cellulose fibers, such as cotton, in deep shades with good fastness properties.

19 Claims, No Drawings

WATER-SOLUBLE AZO DYESTUFFS, PROCESSES FOR THEIR PREPARATION AND THEIR USE

The invention relates to the technical field of fiber-reactive azo dyestuffs.

Dis- and tetrakis-azo dyestuffs which comprise two azo chromophores linked by means of two triazinylamino radicals bonded by a bridge member are already known from U.S. Pat. No. 4,323,497.

Azo dyestuffs of a similar structure in which the triazine radical is a fluorotriazine radical have now been found with the present invention. These dis- and tetrakis-azo dyestuffs according to the invention correspond to the formula (1)

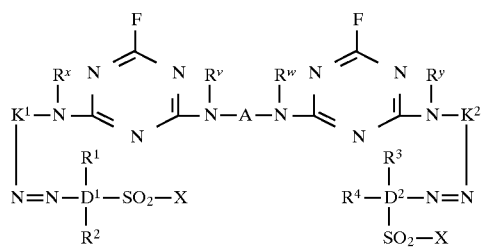

in which:
- $D^1$ is a benzene or a naphthalene radical;
- $D^2$ is a benzene or a naphthalene radical;
- $R^1$ is hydrogen, halogen, such as chlorine or bromine, alkyl having 1 to 4 carbon atoms, such as ethyl and, in particular, methyl, alkoxy having 1 to 4 carbon atoms, such as ethoxy and, in particular, methoxy, hydroxy, carboxy or sulfo, preferably hydrogen, methyl, methoxy, ethoxy or sulfo, if $D^1$ is a benzene radical, or is hydrogen or sulfo, if $D^1$ is a naphthalene radical;
- $R^2$ is hydrogen, halogen, such as chlorine or bromine, alkyl having 1 to 4 carbon atoms, such as ethyl and, in particular, methyl, alkoxy having 1 to 4 carbon atoms, such as ethoxy and, in particular, methoxy, nitro or sulfo, preferably hydrogen, methyl, methoxy or ethoxy, if $D^1$ is a benzene radical, or is hydrogen or sulfo, preferably hydrogen, if $D^1$ is a naphthalene radical;
- $R^3$ is hydrogen, halogen, such as chlorine or bromine, alkyl having 1 to 4 carbon atoms, such as ethyl and, in particular, methyl, alkoxy having 1 to 4 carbon atoms, such as ethoxy and, in particular, methoxy, hydroxy, carboxy or sulfo, preferably hydrogen, methyl, methoxy, ethoxy or sulfo, if $D^2$ is a benzene radical, or is hydrogen or sulfo, if $D^2$ is a naphthalene radical;
- $R^4$ is hydrogen, halogen, such as chlorine or bromine, alkyl having 1 to 4 carbon atoms, such as ethyl and, in particular, methyl, alkoxy having 1 to 4 carbon atoms, such as ethoxy and, in particular, methoxy, nitro or sulfo, preferably hydrogen, methyl, methoxy or ethoxy, if $D^2$ is a benzene radical, or is hydrogen or sulfo, preferably hydrogen, if $D^2$ is a naphthalene radical;
- X is vinyl, β-sulfatoethyl, β-thiosulfatoethyl or β-chloroethyl, preferably vinyl or β-sulfatoethyl;
- $R^x$ is hydrogen or alkyl having 1 to 4 carbon atoms, preferably hydrogen;
- $R^y$ is hydrogen or alkyl having 1 to 4 carbon atoms, preferably hydrogen;
- $R^v$ is hydrogen or alkyl having 1 to 4 carbon atoms, preferably hydrogen;
- $R^w$ is hydrogen or alkyl having 1 to 4 carbon atoms, preferably hydrogen;

$K^1$ is a radical of the formula (2a), (2b) or (2c)

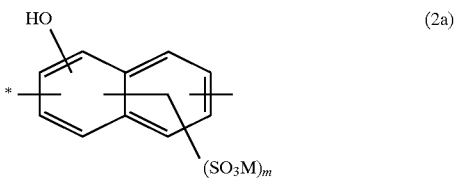

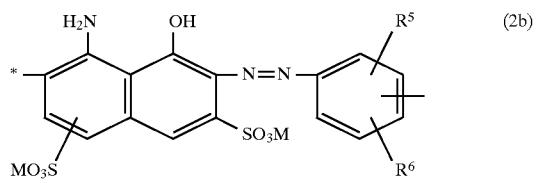

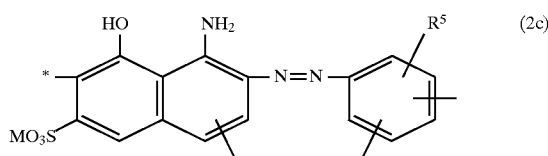

in which
- M is hydrogen or an alkali metal, such as lithium, sodium or potassium,
- m is the number zero, 1 or 2 (where, if m is zero, this group is hydrogen), preferably 1 or 2,
- the bond marked with * is bonded to the azo group,
- $R^5$ is hydrogen or sulfo and
- $R^6$ is hydrogen, sulfo, carboxy, alkyl having 1 to 4 carbon atoms, such as ethyl and, in particular, methyl, alkoxy having 1 to 4 carbon atoms, such as ethoxy and, in particular, methoxy, chlorine or bromine, preferably methyl, sulfo or hydrogen, and particularly preferably hydrogen;

$K^2$ is a radical of the formula (3a), (3b) or (3c)

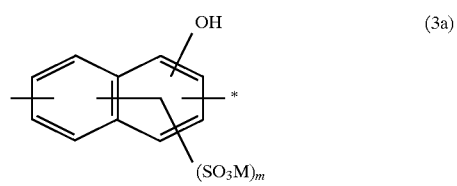

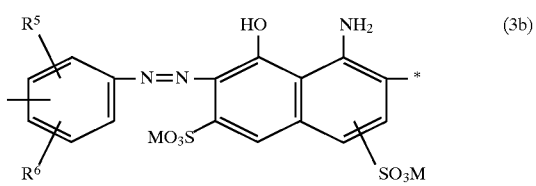

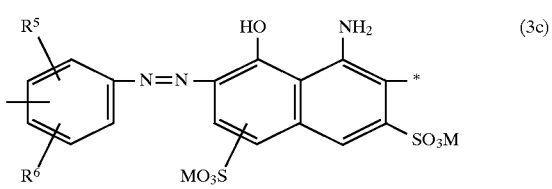

in which M, m, $R^5$ and $R^6$ have the abovementioned meanings and the bond marked with * is bonded to the azo group, the hydroxy group and the bond marked with * being bonded in the ortho-position relative to one another and said hydroxy group is preferably bonded in the α-position of the naphthalene radical;

A is straight-chain or branched alkylene having 2 to 10 carbon atoms, preferably 2 to 4 carbon atoms, such as, in particular, 1,2-ethylene and 1,3-propylene, or is alkylene having 4 to 10 carbon atoms, which is interrupted by 1 or 2 hetero groups, such as, for example, by hetero groups from the group consisting of —O—, —NH—, —N(R⁰)—, where R⁰ is hydrogen, methyl or ethyl, —CO—, —CO—NH— and —NH—CO—, or is phenylene, preferably 1,3- or 1,4-phenylene, unsubstituted or substituted by 1 or 2 substituents from the group consisting of alkyl having 1 to 4 carbon atoms, such as ethyl and, in particular, methyl, alkoxy having 1 to 4 carbon atoms, such as ethoxy and, in particular, methoxy, sulfo, carboxy, chlorine and bromine, or is naphthylene, preferably 2,6- or 2,7-naphthylene, unsubstituted or substituted by 1 or 2 substituents from the group consisting of sulfo and carboxy, or is cycloalkylene having 5 to 8 carbon atoms, such as cyclohexylene, or is a group of the formula alk-B , B-alk , alk-B-alk or phen-G-phen, in which alk is alkylene having 2 to 4 carbon atoms, such as 1,2-ethylene, 1,3-propylene and 1,4-butylene, or alkylene having 2 to 10 carbon atoms, preferably 4 to 6 carbon atoms, which is interrupted by 1 or 2, preferably one, hetero groups from the group consisting of —O— and —NH—, B is phenylene unsubstituted or substituted by 1 or 2 substituents from the group consisting of sulfo, carboxy, methyl, ethyl, methoxy, ethoxy, chlorine and bromine, or cycloalkylene having 5 to 8 carbon atoms, such as cyclohexylene, or the bivalent radical of a saturated 5- to 8-membered heterocyclus containing two N atoms, such as, for example, 1,4-piperazinylene, one or both N atoms of which are bonded to the alk radicals or to alk and a carbon atom of the triazine radical, phen is a phenylene unsubstituted or substituted by 1 or 2 substituents from the group consisting of carboxy, sulfo, methyl, ethyl, methoxy, ethoxy, chlorine and bromine, and G is a covalent bond or is a group of the formula —CH=CH— or cycloalkylene having 5 to 8 carbon atoms, such as cyclohexylene, or the group —N(R')—A—N(R'')— is the bivalent radical of a saturated 5- to 8-membered heterocyclus radical containing the two N atoms, the N atoms being bonded to a carbon atom of the triazine radical.

Radicals $K^1$ and $K^2$ are, for example, radicals of the formulae (4a), (4b), (4c), (4d), (4e), (4f), (4g), (4h) and (4j), preferably (4a), (4b), (4c) and (4d),

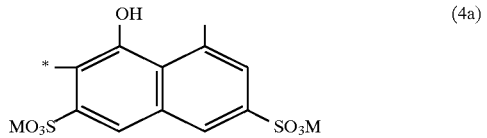

(4a)

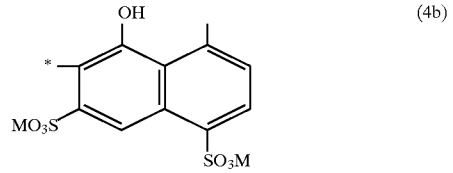

(4b)

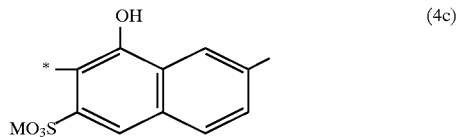

(4c)

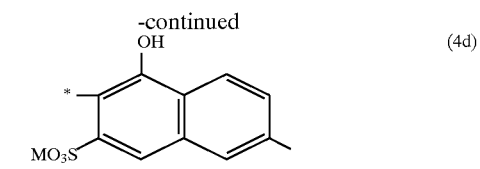

(4d)

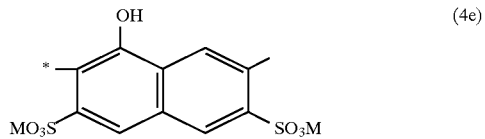

(4e)

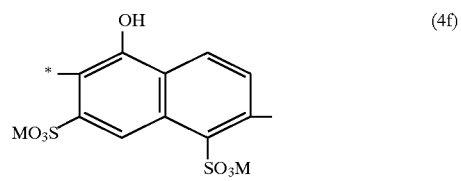

(4f)

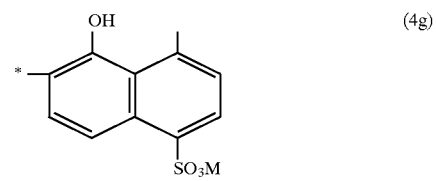

(4g)

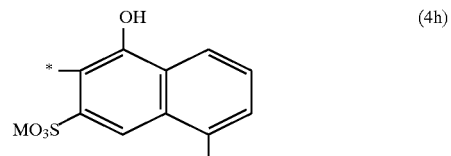

(4h)

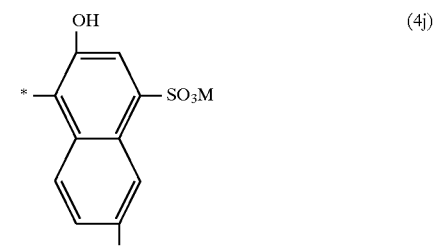

(4j)

in which M has the abovementioned meaning and the bond marked with * is bonded to the azo group.

If $D^1$ and $D^2$ are a naphthalene radical, the azo group on this naphthalene radical is preferably in the β-position.

In the abovementioned formulae and in the following formulae, the individual formulae members, both where they have different meanings and where they have the same meaning within a formula, can be identical to one another or different from one another in the scope of their meaning.

The "sulfo", "carboxy", "phosphate", "thiosulfato" and "sulfato" groups include both the acid form thereof and the salt form thereof. Accordingly, sulfo groups are groups corresponding to the formula —SO₃M, carboxy groups are groups corresponding to the formula —COOM, phosphato groups are groups corresponding to the formula —OPO₃M₂, thiosulfato groups are groups corresponding to the formula —S—SO₃M and sulfato groups are groups corresponding to the formula —OSO₃M, in which M has the abovementioned meaning.

Radicals X—SO₂—D¹(R¹R²)— and X—SO₂—D²(R³, R⁴)— are, for example, 3-(β-sulfatoethylsulfonyl)phenyl, 4-(β-sulfatoethylsulfonyl)phenyl, 2-methyl-5-(β-sulfatoethylsulfonyl)phenyl, 2-methoxy-5-(β-sulfatoethylsulfonyl)-phenyl, 2-methoxy-4-(β-sulfatoethylsulfonyl)phenyl, 2-carboxy-5-(β- sulfatoethylsulfonyl)phenyl, 2-methoxy-5-methyl-4-(β-sulfatoethylsulfonyl)-phenyl, 2,5-dimethoxy-4-(β-sulfatoethylsulfonyl)phenyl, 2,4-dimethoxy-5-(β-sulfatoethylsulfonyl)phenyl, 4-methoxy-3-(β-sulfatoethylsulfonyl)phenyl, 4-methyl-3-(β-sulfatoethylsulfonyl)phenyl, 2-sulfo-4-(β-sulfatoethylsulfonyl)-phenyl, 2-sulfo-5-(β-sulfatoethylsulfonyl)phenyl, 2-chloro-4-(β-sulfatoethylsulfonyl)phenyl), 2-chloro-5-(β-sulfatoethylsulfonyl)phenyl), 2-bromo-4-(β-sulfatoethylsulfonyl)phenyl), 2,6-dichloro-4-(β-sulfatoethylsulfonyl)phenyl, 2,6-dimethyl-4-(β-sulfatoethylsulfonyl)phenyl, 2,6-dimethyl-3-(β-sulfatoethylsulfonyl)phenyl, 2-hydroxy-4-β-(sulfatoethylsulfonyl)phenyl, 2-hydroxy-5-β-(sulfatoethylsulfonyl)phenyl, 3-bromo-5-(β-sulfatoethylsulfonyl)phenyl, 3-chloro-2-hydroxy-5-(β-sulfatoethylsulfonyl)phenyl, 3-nitro-2-hydroxy-5-(β-sulfatoethylsulfonyl)-phenyl, 2-hydroxy-5-methyl-4-(β-sulfatoethylsulfonyl)phenyl, 5-(β-sulfatoethylsulfonyl)naphth-2-yl, 8-(β-sulfatoethylsulfonyl)naphth-2-yl, 6-sulfo-8-(β-sulfatoethylsulfonyl)naphth-2-yl, 1-sulfo-6-(β-sulfatoethylsulfonyl)-naphth-2-yl and 6-(β-sulfatoethylsulfonyl)naphth-2-yl as well as the vinylsulfonyl, β-thiosulfatoethylsulfonyl and β-chloroethylsulfonyl derivatives thereof, and of these preferably 3-(β-sulfatoethylsulfonyl)-phenyl, 4-(β-sulfatoethylsulfonyl)phenyl, 2-methoxy-5-(β-sulfatoethylsulfonyl)phenyl, 2-methoxy-4-(β-sulfatoethylsulfonyl)phenyl, 2,5-dimethoxy-4-(β-sulfatoethylsulfonyl)-phenyl, 2,4-dimethoxy-5-(β-sulfatoethylsulfonyl)phenyl, 2-methoxy-5-methyl-4-(βsulfatoethylsulfonyl)-phenyl and 1-sulfo-6-(β-sulfatoethylsulfonyl)naphth-2-yl.

The present invention furthermore relates to processes for the preparation of the azo dyestuffs of the formula (1) according to the invention, which comprise reacting, in an equivalent amount, the diazonium compounds of the amines of the formulae (5a) and (5b)

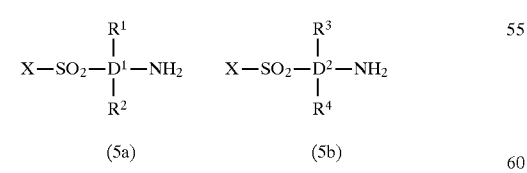

(5a)  (5b)

in which $D^1$, $D^2$, $R^1$, $R^2$, $R^3$, $R^4$ and X have the abovementioned meanings, with a compound of the formula (6)

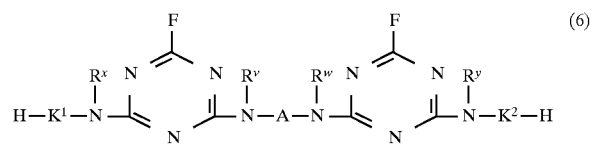

in which $R^x$, $R^y$, $R^w$, $R^y$ and A have the abovementioned meanings, $K^1$ is a radical of the formula (2a) or (2b) and $K^2$ is a radical of the formula (3a) or (3b), or coupling, in an equivalent amount, the azo compounds of the formulae (7a) and (7b)

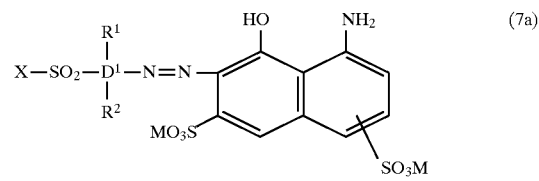

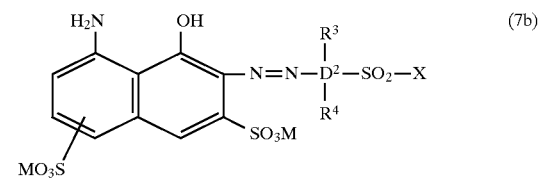

in which $D^1$, $D^2$, $R^1$, $R^2$, $R^3$, $R^4$, X and M have the abovementioned meanings, with a tetrazotized diamine of the formula (8)

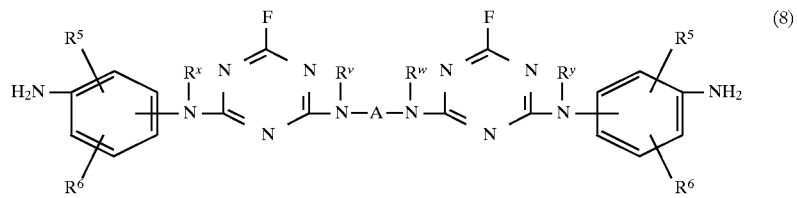

in which $R^5$, $R^6$, $R^x$, $R^y$, $R^y$, $R^w$ and A have the abovementioned meanings, or reacting, in an equivalent amount, azo compounds of the formulae (9a) and (9b)

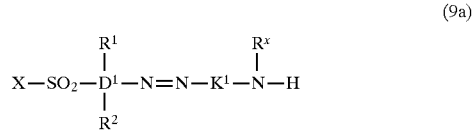

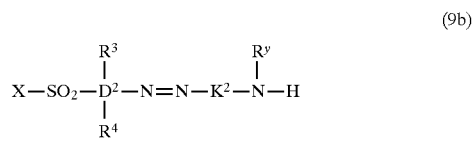

in which $D^1$, $D^2$, $R^1$, $R^2$, $R^3$, $R^4$, X, $K^1$, $K^2$, $R^x$ and $R^y$ have the abovementioned meanings, and a compound of the formula (10)

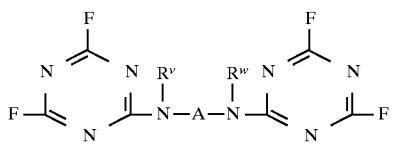

(10)

in which $R^v$, $R^w$ and A have the abovementioned meanings, with one another, or reacting, in an equivalent amount, azo compounds of the formulae (11a) and (11b)

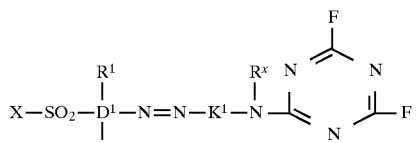

(11a)

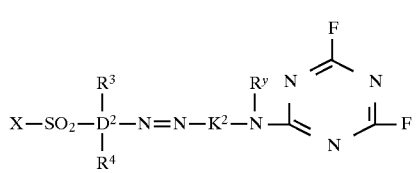

(11b)

in which $D^1$, $D^2$, $R^1$, $R^2$, $R^3$, $R^4$, X, $K^1$, $K^2$, $R^x$ and $R^y$ have the abovementioned meanings, with a diamino compound of the formula (12)

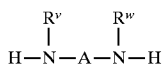

(12)

in which $R^v$, $R^w$ and A have the abovementioned meanings.

The coupling reactions are carried out analogously to known procedures in preferably aqueous solution at a pH of between 4 and 6, if the coupling takes place in the ortho-position relative to the hydroxy group of the compound which is capable of coupling, or at a pH of between 0.5 and 2, if the coupling takes place in the ortho-position relative to the amino group of the compound which is capable of coupling, in each case at a temperature between 10 and 25° C.

The reactions according to the invention between the abovementioned difluoro-s-triazinylamino compounds and the corresponding diamino compounds are preferably carried out in aqueous solution, if appropriate in the presence of organic solvents which are inert towards the cyanuric fluoride, at a temperature between 0° and 30° C., preferably between 5° and 20° C., and at a pH of between 3 and 10, preferably between 5 and 9, analogously to known procedures familiar to the expert for reaction of difluoro-s-triazinylamino compounds with amino compounds. To maintain the pH during these reactions, the alkali metal salts of weak inorganic or organic acids, such as, preferably, sodium carbonate, sodium bicarbonate and sodium acetate, and where appropriate advantageously also lithium carbonate and lithium hydroxide, are preferably used as acid-binding agents.

The starting compounds of the formulae (6), (7a), (7b), (8), (9a), (9b), (10), (11a) and (11b) which can be employed in the procedures according to the invention can be prepared analogously to known procedures for diazotization and coupling of corresponding amines and coupling components, which can be ascertained from these starting compounds, or by reaction of cyanuric fluoride with the corresponding amino compounds, which can be ascertained from the formulae of the starting compounds. Such procedures are known in all cases and are described in numerous instances in the literature, such as, for example, in the abovementioned U.S. Pat. No. 4,323,497. The starting compounds on which the reactions are based, such as, for example, the diazo components of the formulae (5a) and (5b), the coupling components of the formulae H—$K^1$—N($R^x$)—H and H—$K^2$—N($R^y$)—H, cyanuric fluoride and the diamino compounds of the formula H—N(R')—A—N(R'')—H, are described in the common literature.

Aromatic amines of the formulae (5a) and (5b) are known, for example, from German Patents Nos. 1 278 041, 1 276 842, 1 150 163, 1 126 542 and 1 153 029, from German Offenlegungsschriften Nos. 2 154 943, 2 100 080, 2 049 664, 2 142 728, 2 034 591 and 1 943 904, and from German Auslegeschrift 1 204 666. Such aromatic amines are, for example, aniline-3-β-sulfatoethylsulfone, aniline-4-β-sulfatoethylsulfone, 2-aminotoluene-4-β-sulfatoethylsulfone, 2-aminoanisole-4-β-sulfatoethylsulfone, 2-aminoanisol-5-β-sulfatoethylsulfone, 2-amino-4-β-sulfatoethylsulfonylbenzoic acid, 2-methoxy-5-methylaniline-4-β-sulfatoethylsulfone, 2,5-dimethoxyaniline-4-β-sulfatoethylsulfone, 2,4-dimethoxyaniline-5-β-sulfatoethylsulfone, 4-aminoanisole-2-β-sulfatoethylsulfone, 4-aminotoluene-2-β-sulfatoethylsulfone, 4-β-sulfatoethylsulfonylaniline-2-sulfonic acid, 5-β-sulfatoethylsulfonylaniline-2-sulfonic acid, 2-chloro-aniline-4-β-sulfatoethylsulfone, 2-chloroaniline-5-β-sulfatoethylsulfone, 2-bromoaniline-4-β-sulfatoethylsulfone, 2,6-dichloroaniline-4-β-sulfatoethylsulfone, 2,6-dimethylaniline-4-β-sulfatoethylsulfone, 2,6-dimethyl-aniline-3-β-sulfatoethylsulfone, 2-aminophenol-4-β-sulfatoethylsulfone, 2-aminophenol-5-β-sulfatoethylsulfone, 6-bromo-2-aminophenol-4-β-sulfatoethylsulfone, 6-chloro-2-aminophenol-4-β-sulfatoethylsulfone, 6-nitro-2-aminophenol-4-β-sulfatoethylsulfone, 4-methyl-2-aminophenol-5-β-sulfatoethylsulfone, 2-naphthylamine-5-β-sulfatoethylsulfone, 2-naphthylamine-8-β-sulfatoethylsulfone, 8-β-sulfatoethylsulfonyl-2-aminonaphthalene-6-sulfonic acid, 6-β-sulfatoethylsulfonyl-2-amino-naphthalene-1-sulfonic acid and 2-naphthylamine-6-β-sulfatoethylsulfone and the corresponding vinylsulfonyl, -β-thiosulfatoethylsulfonyl and -β-chloroethylsulfonyl compounds, and of these preferably aniline-3-β-sulfatoethylsulfone, aniline-4-β-sulfatoethylsulfone, 2-aminoanisole-4-β-sulfatoethylsulfone, 2-amino-anisole-5-β-sulfatoethylsulfone, 2,5-dimethoxyanilin-4-β-sulfatoethylsulfone, 2,4-dimethoxyaniline-5-β-sulfatoethylsulfone, 2-methoxy-5-methylaniline-4-β-sulfatoethylsulfone and 6-β-sulfatoethylsulfonyl-2-aminonaphthalene-1-sulfonic acid.

Diamino starting compounds of the formula (12) are, for example, 1,2-diaminoethane, 1,3-diaminopropane, 1,4-diaminobutane, 1,6-diaminohexane, 1,4-diaminocyclohexane, 1,3-diaminocyclohexane, 1,2-diaminopropane, 1,3-bis-aminomethylcyclohexane, 4-methylamino-aniline, 1,3-diaminobenzene-4-sulfonic acid, 1,4-diaminobenzene-3-sulfonic acid, 1,3-diaminobenzene-4,6-disulfonic acid, p-aminobenzyl-methylamine, p-phenylenediamine, m-phenylenediamine, o-phenylene-diamine, m-toluylenediamine, 2,4-diaminoanisole, piperazine, 1,1-bis-(4'-aminophenyl) cyclohexane, benzidine, 4,4'-diamino-3,3'-dimethoxydiphenyl-6,6'-disulfonic acid, 3,3'-dimethyl-4,4'-diaminodiphenyl-6,6'-disulfonic acid, 1,5-diaminopentane, N-(2-aminoethyl)piperazine, bis-(2-aminoethyl) ether, 1,5- diaminonaphthalene, 1,8-diaminonaphthalene, 2,6-diaminonaphthalene-4,8-disulfonic acid, 1,6-diaminonaphthalene-4,8-disulfonic acid, 4-(4'-aminophenylcarbonylamino)aniline and 3-(4'-aminophenylcarbonylamino)aniline, and of these preferably 1,4-diaminobenzene-3-sulfonic acid and 1,3-diaminobenzene-4,6-disulfonic acid, and particularly preferably 1,2-diaminoethane, 1,3-diaminopropane, 1,6-diaminohexane, piperazine, 1,3-phenylene-diamine and 1,4-phenylene-diamine.

The separation out of the resulting dyestuffs of the formula (1) from the synthesis batch is carried out by generally known methods, either by precipitation from the reaction medium by means of electrolytes, such as, for example, sodium chloride or potassium chloride, or by evaporation of the reaction solution, for example by spray drying. If the latter mode of dyestuff isolation is chosen, it is often advisable for any amounts of sulfate present in the solutions to be removed by being precipitated as gypsum and separated off by filtration before the evaporation. In some cases, it may also be desirable to put the dyestuff solution, if appropriate after addition of buffer substances, directly to use for dyeing as a liquid preparation.

The present invention also relates to dyeing (which includes printing) of cellulose and polyamide fiber materials with the dyestuffs according to the invention.

Cellulose fiber materials are preferably understood as meaning cotton and regenerated cellulose, but also other plant fibers, such as linen, hemp and jute. Polyamide fibers are to be understood as meaning both those of natural and those of synthetic origin, such as, for example, wool and other animal hair, as well as silk and fibers of synthetic polyamide 6,6, polyamide 6, polyamide 11 or polyamide 4.

The dyestuffs according to the invention can be applied to the substrates mentioned by the application techniques known for reactive dyestuffs. Very good color yields are thus obtained with them on cellulose fibers by the exhaust process from a long liquor using the most diverse alkali additions. It is remarkable here that high fixing yields are obtained even at a low electrolyte content (up to 20 g/l) of the dye liquor; the good ease of washoff of nonfixed dyestuff portions may furthermore be emphasized.

Excellent color yields are also obtained on cellulose fibers by the padding processes, in which fixing can be carried out by batching at room temperature, by steaming or with dry heat.

The fastness properties of the dyeings and prints obtained on cellulose fibers with the aid of the dyestuffs according to the invention are considerable. This applies both to the most important manufacturing fastnesses and to the most important fastness properties during use. The light-fastness and the wet-fastness properties, such as fastness to washing, fastnesses to milling, fastness to water, fastness to seawater, fastness to crossdyeing and fastness to perspiration, as well as the fastness to pleating, fastness to ironing and fastness to rubbing, are to be mentioned in particular.

The dyeings on polyamide fibers are usually carried out from an acid medium. Thus, for example, acetic acid or acetic acid and ammonium acetate can be added to the dyebath in order to obtain the desired pH. For the purpose of achieving a usable levelness of the dyeings, addition of customary leveling agents is recommended, for example those based on a reaction product of cyanuric chloride with three times the molar amount of an aminobenzenesulfonic acid and/or an aminonaphthalenesulfonic acid, or based on a reaction product of, for example, stearylamine with ethylene oxide. The dyeings can be carried out both at boiling point and at 110° to 120° C.

The following Examples serve to illustrate the invention. The parts are parts by weight and the percentage data are percentages by weight, unless noted otherwise. Parts by weight bear the same relation to parts by volume as the kilogram to the liter.

The compounds described by way of their formulae in the Examples are shown in the form of the free acid; in general, they are prepared and isolated in the form of their alkali metal salts, such as lithium, sodium or potassium salts, and used for dyeing in the form of their salts. The starting compounds and components mentioned in the form of the free acid in the following Examples, in particular the Tabular Examples, can likewise be employed in the synthesis as such or in the form of their salts, preferably alkali metal salts.

The absorption maxima ($\lambda_{max}$) in the visible range stated for the dyestuffs according to the invention were determined with the aid of their alkali metal salts in aqueous solution. In the Tabular Examples, the $\lambda_{max}$ values are placed in parentheses with the color shade data; the wavelength data are based on nm.

Example 1

31.9 parts of 1-amino-8-naphthol-3,6-disulfonic acid, 4.2 parts of sodium fluoride and 14.2 parts of trifluoro-s-triazine (cyanuric fluoride) are reacted with one another in accordance with the instructions of European Patent Application Publication No. 0 172 790. In a separate batch, 28 parts of 4-(β-sulfatoethylsulfonyl)aniline are diazotized in the customary manner, and the product is added to the solution of this reaction product. The coupling reaction is carried out at a pH of between 4 and 6 and at a temperature of about 15° C. 7.3 parts of 1,3-diaminopropane dihydrochloride are then added to this batch, the batch is warmed to 10° C. and a pH of between 7 and 8 is maintained during the reaction by addition of an aqueous sodium carbonate solution. After a reaction time of about two hours, the pH is brought to a value of 7 and the disazo dyestuff according to the invention is isolated in the customary manner, such as, for example, by salting out with sodium chloride or by spray drying.

It has, when written in the form of the free acid, the formula

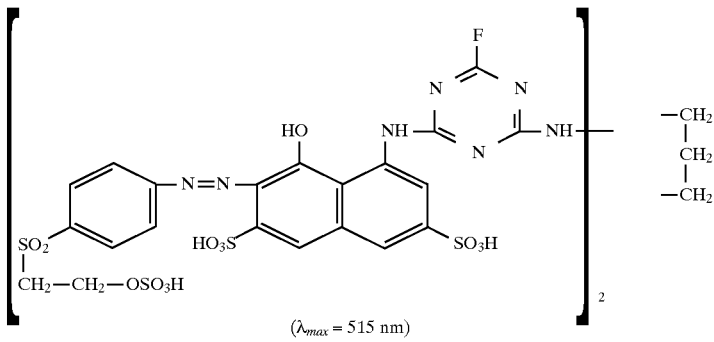

($\lambda_{max}$ = 515 nm)

and dyes the materials mentioned in the description, such as, in particular, cellulose fiber materials, such as cotton, in strong red shades with good general fastnesses, of which the fastnesses to washing may be emphasized in particular, by the dyeing and printing processes customary in the art for fiber-reactive dyestuffs.

Example 2

A neutral solution of 31.9 parts of 1-amino-8-naphthol-3,6-disulfonic acid, 4.2 parts of sodium fluoride and 4.3 parts of piperazine in 100 parts of ice-water is prepared and is reacted with 14.2 parts of cyanuric fluoride in accordance with the instructions of German Offenlegungsschrift No. 3 917 046. The batch is then brought to a pH of 6 and cooled to a temperature of 5° to 10° C. A hydrochloric acid suspension, prepared in the usual way, of the diazonium salt of 28 parts of diazotized 4-(β-sulfato-ethylsulfonyl)aniline is added to the solution thus obtained and a pH of 5 to 6 is established and kept at 15° to 20° C. during the coupling period of about 30 minutes.

Thereafter, the batch is brought to a pH of between 6.5 and 7 and the disazo dyestuff according to the invention which has been synthesized and, written in the form of the free acid, has the formula is isolated in the customary manner by salting out by means of sodium chloride or by spray drying.

On the fiber materials mentioned in the description, such as, in particular, cotton, it produces deep red dyeings with good fastness properties by the customary use processes.

Example 3

31.9 parts of 1-amino-8-naphthol-3,6-disulfonic acid, 4.2 parts of sodium fluoride and 14.2 parts of cyanuric fluoride are reacted with one another in accordance with the instructions of European Patent Application Publication No. 0 172 790. A solution of 5.3 parts of 1,3-phenylenediamine in 100 parts of water is added to the resulting solution of the difluorotriazine compound. A pH of 5 to 6 is established and the reaction is carried out at a temperature of 10° C., while maintaining this pH.

A hydrochloric acid suspension, prepared in the customary way, of the diazonium salt of 28 parts of diazotized 4-(β-sulfatoethylsulfonyl)aniline is added to the resulting solution of the coupling component, the coupling reaction is carried out at a pH of 6 and a temperature of about 15° C. for about 30 minutes and the resulting disazo dyestuff according to the invention is then isolated in the customary manner.

It has, written in the form of the free acid, the formula

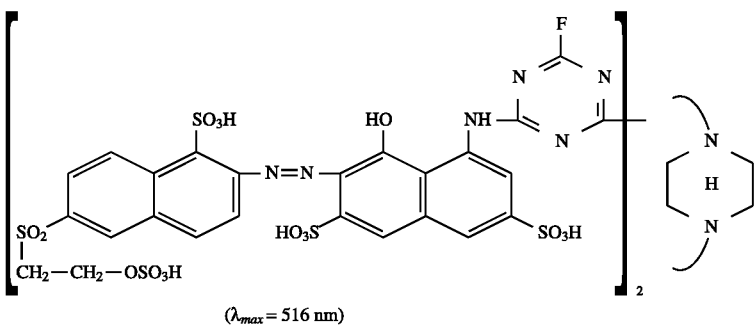

($\lambda_{max}$ = 516 nm)

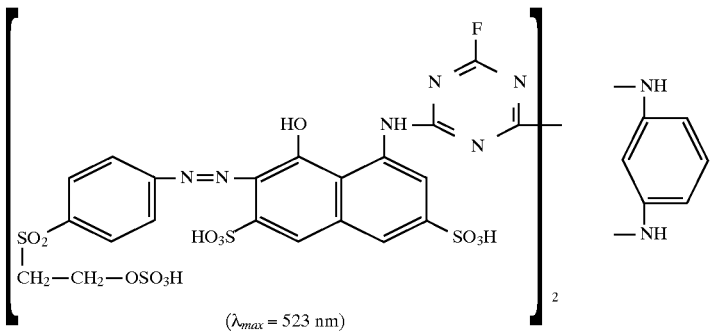

($\lambda_{max}$ = 523 nm)

and dyes, for example, cotton in deep red shades with high fastness properties.

Example 4

To prepare a disazo compound according to the invention, the procedure according to the instructions of Example 3 is followed, but instead of the 1,3-phenylenediamine, 6.6 parts of 1,2-diaminoethane dihydrochloride are employed, a pH of between 8 and 9 is established for reaction of the diaminoethane with the difluorotriazine compound, the reaction is carried out at this pH at a temperature of between 5° and 10° C. for about one hour, the batch is then brought to a pH of 6.5 and the disazo dyestuff according to the invention of the formula (written in the form of the free acid)

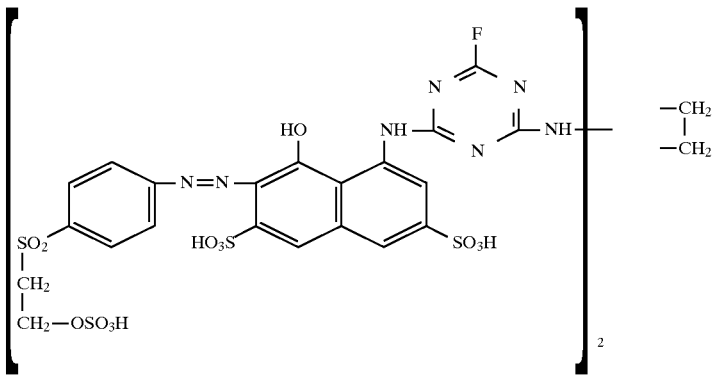

is isolated in the customary manner by salting out or spray drying. It has the same good properties as the disazo dyestuff prepared according to Example 1.

Example 5

23.9 parts of 3-amino-6-sulfo-8-naphthol and 14.2 parts of cyanuric fluoride are reacted with one another in accordance with the instructions of European Patent Application Publication No. 0 172 790. When the reaction has taken place, a hydrochloric acid diazonium salt suspension, prepared in the customary manner, from 28 parts of diazotized 4-(β-sulfatoethylsulfonyl)aniline is added to the batch and the coupling reaction is carried out at a pH of between 4 and 5 and a temperature between 15° and 20° C. Thereafter, 7.3 parts of 1,3-diaminopropane dihydrochloride are added and the reaction is carried out at a temperature of about 10° C. and a pH of between 7 and 8 for about two hours. Thereafter, the pH is brought to a value of 7 and the disazo dyestuff according to the invention of the formula (written in the form of the free acid)

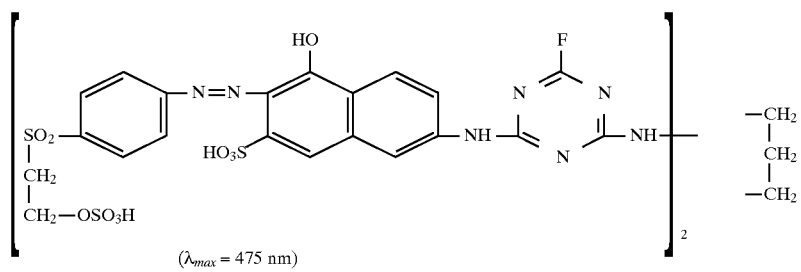

($\lambda_{max}$ = 475 nm)

is isolated in the customary manner. It dyes, for example, cotton in deep orange-yellow shades with good general fastness properties, of which the light- and wet-fastness properties may be emphasized in particular.

Example 6

23.9 parts of 3-amino-6-sulfo-8-naphthol and 14.2 parts of cyanuric fluoride are reacted with one another in accordance with the instructions of EP-A-0 172 790. 7.9 parts of piperazine dihydrochloride are then added to the batch and the second condensation reaction is carried out at a pH of between 7 and 8 and a temperature of 0° to 10° C.

An aqueous hydrochloric acid diazonium salt suspension, obtained in the customary manner, from 41 parts of diazotized 1-sulfo-6-(β-sulfatoethylsulfonyl)-2-aminonaphthalene is added to the resulting aqueous solution of a coupling component and the coupling reaction is carried out at a pH of between 6 and 6.5 and at about 15° C. When the coupling reaction has ended, 10 parts of tetrasodium diphosphate are added and the disazo dyestuff according to the invention is isolated in the customary manner by salting out or spray drying.

It has, written in the form of the free acid, the formula

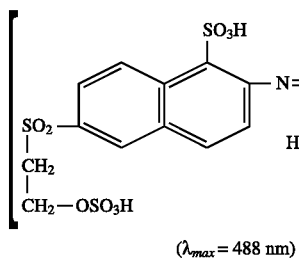

($\lambda_{max}$ = 488 nm)

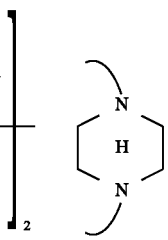

shows very good fiber-reactive properties and dyes the fiber materials mentioned in the description, such as, for example, cotton, in deep orange shades and with good fastness properties by the dyeing and printing processes customary in the art for fiber-reactive dyestuffs.

Example 7

To prepare a disazo dyestuff according to the invention, the procedure in accordance with the instructions of Example 6 is followed, but instead of the piperazine, 5.4 parts of 1,4-phenylenediamine are employed, and this second condensation reaction is carried out at a pH of between 5 and 6 and a temperature between 0° and 10° C.

The resulting disazo dyestuff according to the invention has the formula (written in the form of the free acid)

and dyes cotton, for example, in deep orange shades with good fastness properties.

Example 8

30 parts of cyanuric fluoride are added constantly to a neutral aqueous solution of 135 parts of the disazo compound 2-[4'-(β-sulfatoethylsulfonyl-phenyl)]-azo-7-(2"-sulfo-5"-aminophenyl)-azo-3,6-disulfo-1-amino-8-hydroxynaphthalene in 1500 parts of a mixture of water and ice in the course of approximately five minutes, with vigorous stirring and while maintaining a pH of between 5 and 6 by means of aqueous sodium hydroxide solution. The batch is subsequently stirred for a further 30 minutes, and 14.7 parts of 1,3-diaminopropane dihydrochloride are then added, stirring is continued for a further four hours at 0° to 5° C. and a pH of between 8 and 9, the batch is then brought to a pH of 6.5 by means of aqueous hydrochloric acid and the resulting disazo compound according to the invention of the formula (written in the form of the free acid)

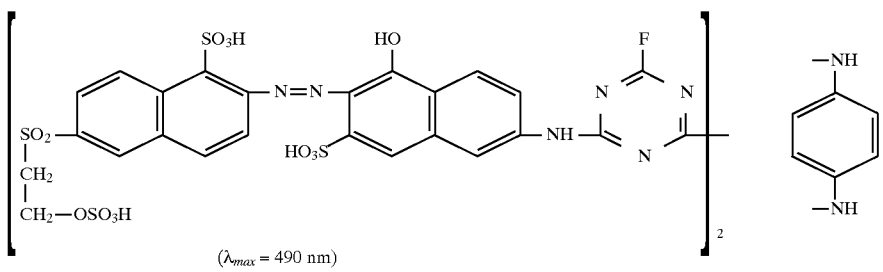

($\lambda_{max}$ = 490 nm)

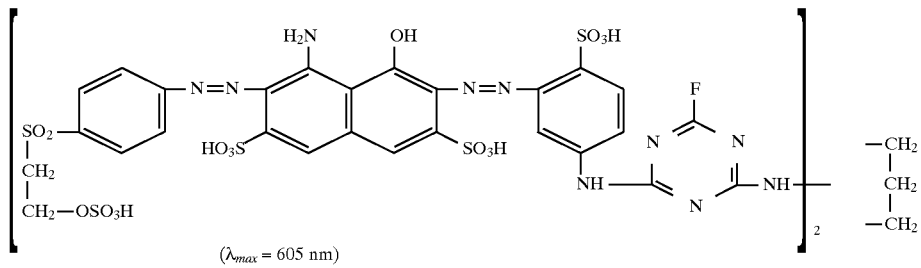

($\lambda_{max}$ = 605 nm)

is isolated in the customary manner, for example by spray drying or by salting out with sodium chloride, as an alkali metal salt (sodium salt).

The tetrakis-azo compound according to the invention has very good fiber-reactive dyestuff properties and gives dyeings and prints in deep navy blue shades with good fastness properties on the materials mentioned in the description, in particular on materials containing cellulose fibers, by the use processes customary in the art for fiber-reactive dyestuffs.

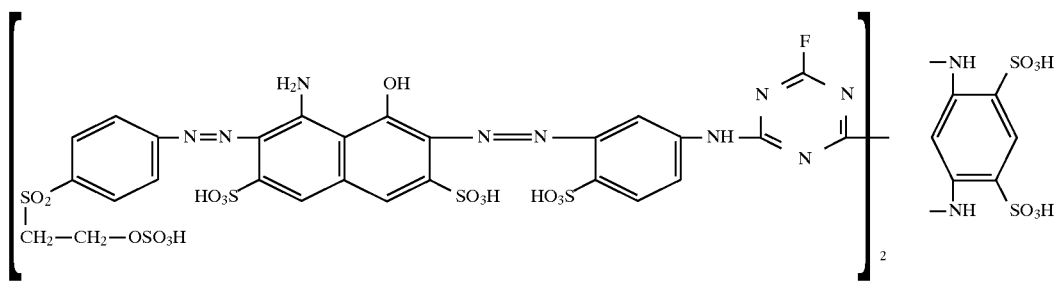

Example 9

26.8 parts of 1,3-diaminobenzene-4,6-disulfonic acid and 15 parts of cyanuric fluoride are reacted with one another in accordance with the instructions of German Offenlegungsschrift No. 2 746 109. When the reaction has ended, 336 parts of an aqueous solution, with a pH of 6, of 36 parts of 1,3-diaminobenzene-4-sulfonic acid are added to this aqueous batch, and during the reaction a pH of between 5 and 6 and a temperature of 5° to 10° C. is maintained for one hour.

The resulting compound of the formula (written in the form of the free acid),

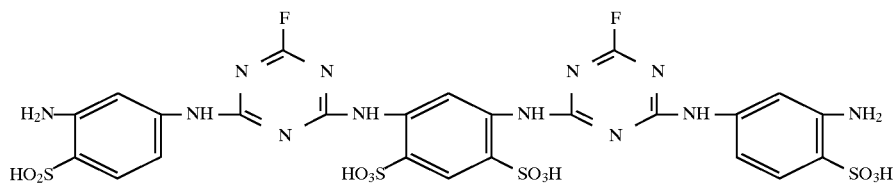

is tetrazotized in the customary manner by means of an aqueous sodium nitrite solution, after addition of concentrated aqueous hydrochloric acid. An aqueous solution of 122 parts of the compound 2-[4'(β-sulfatoethyl-sulfonyl) phenyl]-azo-3,6-disulfo-1-amino-8-hydroxynaphthalene is added to the resulting solution of the tetrazonium compound, and the coupling reaction is carried out at a pH of between 7 and 8 and a temperature between 10° and 20° C.

The tetrakis-azo dyestuff according to the invention is isolated in the customary manner. It has, written in the form of the free acid, the formula shows very good fiber-reactive properties and dyes the materials mentioned in the description, such as, for example, cotton, in strong navy blue shades with good fastness properties.

Example 10 a) 31.9 parts of 1-amino-8-naphthol-3,6-disulfonic acid, 4.2 parts of sodium fluoride and 14.2 parts of cyanuric fluoride are reacted with one another analogously to the instructions of European Patent Application Publication No. 0 172 790. 10.6 parts of 1,4-phenylenediamine are added to the resulting difluoro-s-triazinylamino compound. A pH of between 5 and 6 is established and the batch is further stirred for one hour, while maintaining this pH and at a temperature of about 10° C.

b) In a separate batch, 23.9 parts of 3-amino-6-sulfo-8-naphthol and 14.2 parts of cyanuric fluoride are reacted with one another analogously to the instructions of EP-A-0 172 790. When the reaction has taken place, this batch is added to the solution obtained under a), the pH is brought to a value of between 5 and 6 and the reaction is brought to completion at 10° C. while maintaining this pH.

c) A diazonium salt solution, prepared in the customary manner, from 82 parts of diazotized 1-sulfo-6-(β- sulfatoethylsulfonyl)-2-amino-naphthalene is stirred into the reaction product obtained under b) and the coupling reaction is carried out at a pH of between 6 and 7 and at a temperature between 10° and 20° C.

The disazo dyestuff according to the invention is isolated in the customary manner by salting out with sodium chloride or by spray drying. It has, written in the form of the free acid, the formula

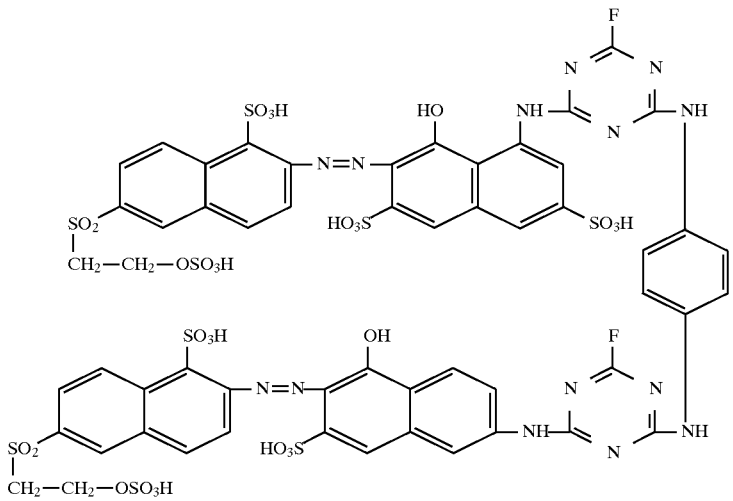

and dyes the materials mentioned in the description, such as, in particular, cellulose fiber materials, in strong orange-red shades.

Examples 11 to 812

Further azo dyestuffs according to the invention, corresponding to the formula (A)

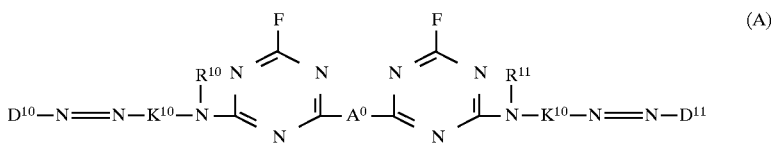

(A)

are described in the following Tabular Examples with the aid of the components shown in the particular Tabular Example. They can be prepared in the manner according to the invention, for example analogously to one of the above Embodiment Examples, by means of the starting compounds, which can be ascertained from the components of the particular Tabular Example in association with the formula (A) (cyanuric fluoride, the diazo components $D^{10}$—$NH_2$ and $D^{11}$—$NH_2$, the coupling components H—$K^{10}$—N($R^{10}$)H and H—$K^{11}$—N($R^{11}$)H and a diamino compound H—$A^0$—H). These azo dyestuffs according to the invention show very good fiber-reactive dyestuff properties and give, on the materials mentioned in the description, such as, for example, wool and, in particular, cellulose fiber materials, deep dyeings and prints with good fastness properties in the color shade stated for the dyestuff of the particular Tabular Example (in this case on cotton).

| Ex. | Radical $D^{10}$- | Radical -$K^{10}$-N($R^{10}$)- | Azo dyestuff of the formula (A) Radical $A^0$ | Radical -N($R^{11}$)-$K^{11}$- | Radical $D^{11}$- | Color shade |
|---|---|---|---|---|---|---|
| 11 | 4-(β-Sulfatoethyl-sulfonyl)phenyl | 8-Hydroxy-3,6disulfo-naphth-7-yl-1-ylamino | Eth-1,2-di-ylamino | 8-Hydroxy-3,6-disulfo-naphth-7-yl-1-ylamino | 4-(β-Sulfatoethyl-sulfonyl)phenyl | red |
| 12 | 4-(β-Sulfatoethyl-sulfonyl)phenyl | 8-Hydroxy-3,6disulfo-naphth-7-yl-1-ylamino | But-1,4-di-ylamino | 8-Hydroxy-3,6-disulfo-naphth-7-yl-1-ylamino | 4-(β-Sulfatoethyl-sulfonyl)phenyl | red (518) |
| 13 | 4-(β-Sulfatoethyl-sulfonyl)phenyl | 8-Hydroxy-3,6disulfo-naphth-7-yl-1-ylamino | Hex-1,6-di-ylamino | 8-Hydroxy-3,6-disulfo-naphth-7-yl-1-ylamino | 4-(β-Sulfatoethyl-sulfonyl)phenyl | red (519) |
| 14 | 4-(β-Sulfatoethyl- | 8-Hydroxy-3,6disulfo- | Phen-1,4-di-ylamino | 8-Hydroxy-3,6-disulfo- | 4-(β-Sulfatoethyl- | red (525) |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | | naphth-7-yl-1-ylamino | | naphth-7-yl-1-ylamino | sulfonyl)phenyl | |
| 15 | 4-(β-Sulfatoethyl-sulfonyl)phenyl | 8-Hydroxy-3,6disulfo-naphth-7-yl-1-ylamino | Phen-1,3-di-ylamino | 8-Hydroxy-3,6-disulfo-naphth-7-yl-1-ylamino | 4-(β-Sulfatoethyl-sulfonyl)phenyl | red (523) |
| 16 | 4-(β-Sulfatoethyl-sulfonyl)phenyl | 8-Hydroxy-3,6disulfo-naphth-7-yl-1-ylamino | Phen-1,2-di-ylamino | 8-Hydroxy-3,6-disulfo-naphth-7-yl-1-ylamino | 4-(β-Sulfatoethyl-sulfonyl)phenyl | red (521) |
| 17 | 4-(β-Sulfatoethyl-sulfonyl)phenyl | 8-Hydroxy-3,6disulfo-naphth-7-yl-1-ylamino | Piperazin-1,4-ylene | 8-Hydroxy-3,6-disulfo-naphth-7-yl-1-ylamino | 4-(β-Sulfatoethyl-sulfonyl)phenyl | red (517) |
| 18 | 4-(β-Sulfatoethyl-sulfonyl)phenyl | 8-Hydroxy-3,6disulfo-naphth-7-yl-1-ylamino | Cyclohex-1,4-di-ylamino | 8-Hydroxy-3,6-disulfo-naphth-7-yl-1-ylamino | 4-(β-Sulfatoethyl-sulfonyl)phenyl | red (519) |
| 19 | 4-(β-Sulfatoethyl-sulfonyl)phenyl | 8-Hydroxy-3,6disulfo-naphth-7-yl-1-ylamino | Phen-1-ylamino-4-(N-methyl)ylamino | 8-Hydroxy-3,6-disulfo-naphth-7-yl-1-ylamino | 4-(β-Sulfatoethyl-sulfonyl)phenyl | red (520) |
| 20 | 4-(β-Sulfatoethyl-sulfonyl)phenyl | 8-Hydroxy-3,6disulfo-naphth-7-yl-1-ylamino | 4-Sulfophen-1,3-di-ylamino | 8-Hydroxy-3,6-disulfo-naphth-7-yl-1-ylamino | 4-(β-Sulfatoethyl-sulfonyl)phenyl | red (522) |
| 21 | 4-(β-Sulfatoethyl-sulfonyl)phenyl | 8-Hydroxy-3,6disulfo-naphth-7-yl-1-ylamino | 3-Sulfophen-1,4-di-ylamino | 8-Hydroxy-3,6-disulfo-naphth-7-yl-1-ylamino | 4-(β-Sulfatoethyl-sulfonyl)phenyl | red |
| 22 | 4-(β-Sulfatoethyl-sulfonyl)phenyl | 8-Hydroxy-3,6disulfo-naphth-7-yl-1-ylamino | N-Methylbenzyl-amino-4'-ylamino | 8-Hydroxy-3,6-disulfo-naphth-7-yl-1-ylamino | 4-(β-Sulfatoethyl-sulfonyl)phenyl | red |
| 23 | 4-(β-Sulfatoethyl-sulfonyl)phenyl | 8-Hydroxy-3,6disulfo-naphth-7-yl-1-ylamino | 4-Methylphen-1,3-di-ylamino | 8-Hydroxy-3,6-disulfo-naphth-7-yl-1-ylamino | 4-(β-Sulfatoethyl-sulfonyl)phenyl | red |
| 24 | 4-(β-Sulfatoethyl-sulfonyl)phenyl | 8-Hydroxy-3,6disulfo-naphth-7-yl-1-ylamino | 3-Methyl-phen-1,4-di-ylamino | 8-Hydroxy-3,6-disulfo-naphth-7-yl-1-ylamino | 4-(β-Sulfatoethyl-sulfonyl)phenyl | red |
| 25 | 4-(β-Sulfatoethyl-sulfonyl)phenyl | 8-Hydroxy-3,6disulfo-naphth-7-yl-1-ylamino | 4-Methoxy-phen-1,3-di-ylamino | 8-Hydroxy-3,6-disulfo-naphth-7-yl-1-ylamino | 4-(β-Sulfatoethyl-sulfonyl)phenyl | red |
| 26 | 4-(β-Sulfatoethyl-sulfonyl)phenyl | 8-Hydroxy-3,6disulfo-naphth-7-yl-1-ylamino | Prop-1,2-di-ylamino | 8-Hydroxy-3,6-disulfo-naphth-7-yl-1-ylamino | 4-(β-Sulfatoethyl-sulfonyl)phenyl | red |
| 27 | 4-(β-Sulfatoethyl-sulfonyl)phenyl | 8-Hydroxy-3,6disulfo-naphth-7-yl-1-ylamino | Cyclohex-1,3-di-ylamino | 8-Hydroxy-3,6-disulfo-naphth-7-yl-1-ylamino | 4-(β-Sulfatoethyl-sulfonyl)phenyl | red |
| 28 | 4-(β-Sulfatoethyl-sulfonyl)phenyl | 8-Hydroxy-3,6disulfo-naphth-7-yl-1-ylamino | 1,1-Di-phen-cyclo-hexan-4'-ylamino-4"-ylamino | 8-Hydroxy-3,6-disulfo-naphth-7-yl-1-ylamino | 4-(β-Sulfatoethyl-sulfonyl)phenyl | red |
| 29 | 4-(β-Sulfatoethyl-sulfonyl)phenyl | 8-Hydroxy-3,6disulfo-naphth-7-yl-1-ylamino | 3,3'-Dimethoxy-6,6'-disulfo-1,1'-diphenyl-4,4'-di-ylamino | 8-Hydroxy-3,6-disulfo-naphth-7-yl-1-ylamino | 4-(β-Sulfatoethyl-sulfonyl)phenyl | red |
| 30 | 4-(β-Sulfatoethyl-sulfonyl)phenyl | 8-Hydroxy-3,6disulfo-naphth-7-yl-1-ylamino | Cyclo-1,3-di-(methylamino) | 8-Hydroxy-3,6-disulfo-naphth-7-yl-1-ylamino | 4-(β-Sulfatoethyl-sulfonyl)phenyl | red |
| 31 | 4-(β-Sulfatoethyl-sulfonyl)phenyl | 8-Hydroxy-3,6disulfo-naphth-7-yl-1-ylamino | 1-(Phenylamino)-phen-4,4'-di-ylamino | 8-Hydroxy-3,6-disulfo-naphth-7-yl-1-ylamino | 4-(β-Sulfatoethyl-sulfonyl)phenyl | red |
| 32 | 4-(β-Sulfatoethyl-sulfonyl)phenyl | 8-Hydroxy-3,6disulfo-naphth-7-yl-1-ylamino | 3,3'-Dimethyl-6,6'-disulfo-1,1'-diphenyl 4,4'-di-ylamino | 8-Hydroxy-3,6-disulfo-naphth-7-yl-1-ylamino | 4-(β-Sulfatoethyl-sulfonyl)phenyl | red |
| 33 | 3-(β-Sulatoethyl-sulfonyl)phenyl | 8-Hydroxy-3,6-di-sulfonaphth-7-yl-1-ylamino | Eth-1,2-di-ylamino | 8-Hydroxy-3,6-di-sulfonaphth-7-yl-1-ylamino | 3-(β-Sulfatoethyl-sulfonyl)phenyl | red (517) |
| 34 | 3-(β-Sulatoethyl-sulfonyl)phenyl | 8-Hydroxy-3,6-di-sulfonaphth-7-yl-1-ylamino | But-1,2-di-ylamino | 8-Hydroxy-3,6-di-sulfonaphth-7-yl-1-ylamino | 3-(β-Sulfatoethyl-sulfonyl)phenyl | red (517) |
| 35 | 3-(β-Sulatoethyl-sulfonyl)phenyl | 8-Hydroxy-3,6-di-sulfonaphth-7-yl-1-ylamino | Hex-1,6-di-ylamino | 8-Hydroxy-3,6-di-sulfonaphth-7-yl-1-ylamino | 3-(β-Sulfatoethyl-sulfonyl)phenyl | red (516) |
| 36 | 3-(β-Sulatoethyl-sulfonyl)phenyl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 3-(β-Sulfatoethyl-sulfonyl)phenyl | red (519) |
| 37 | 3-(β-Sulatoethyl-sulfonyl)phenyl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 3-(β-Sulfatoethyl-sulfonyl)phenyl | red (520) |
| 38 | 3-(β-Sulatoethyl-sulfonyl)phenyl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 3-(β-Sulfatoethyl-sulfonyl)phenyl | red |
| 39 | 3-(β-Sulatoethyl-sulfonyl)phenyl | 8-Hydroxy-3,6-di-sulfonaphth-7-yl-1-ylamino | Piperazin-1,4-ylene | 8-Hydroxy-3,6-di-sulfonaphth-7-yl-1-ylamino | 3-(β-Sulfatoethyl-sulfonyl)phenyl | red |
| 40 | 3-(β-Sulatoethyl-sulfonyl)phenyl | 8-Hydroxy-3,6-di-sulfonaphth-7-yl-1-ylamino | Cyclohex-1,4-di-ylamino | 8-Hydroxy-3,6-di-sulfonaphth-7-yl-1-ylamino | 3-(β-Sulfatoethyl-sulfonyl)phenyl | red |
| 41 | 3-(β-Sulatoethyl-sulfonyl)phenyl | 8-Hydroxy-3,6-di-sulfonaphth-7-yl-1-ylamino | Phen-1-yl-amino-4-(N-methyl)-ylamino | 8-Hydroxy-3,6-di-sulfonaphth-7-yl-1-ylamino | 3-(β-Sulfatoethyl-sulfonyl)phenyl | red |
| 42 | 3-(β-Sulatoethyl-sulfonyl)phenyl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 3-(β-Sulfatoethyl-sulfonyl)phenyl | red |
| 43 | 3-(β-Sulatoethyl-sulfonyl)phenyl | 8-Hydroxy-3,6-di-sulfonaphth-7-yl-1-ylamino | 3-Sulfophen-1,4-di-ylamino | 8-Hydroxy-3,6-di-sulfonaphth-7-yl-1-ylamino | 3-(β-Sulfatoethyl-sulfonyl)phenyl | red |
| 44 | 3-(β-Sulatoethyl-sulfonyl)phenyl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 3-(β-Sulfatoethyl-sulfonyl)phenyl | red |
| 45 | 3-(β-Sulatoethyl-sulfonyl)phenyl | 8-Hydroxy-3,6-di-sulfonaphth-7-yl-1-ylamino | 4-Methylphen-1,3-di-ylamino | 8-Hydroxy-3,6-di-sulfonaphth-7-yl-1-ylamino | 3-(β-Sulfatoethyl-sulfonyl)phenyl | red |
| 46 | 3-(β-Sulatoethyl-sulfonyl)phenyl | 8-Hydroxy-3,6-di-sulfonaphth-7-yl-1-ylamino | 3-Methylphen-1,4-di-ylamino | 8-Hydroxy-3,6-di-sulfonaphth-7-yl-1-ylamino | 3-(β-Sulfatoethyl-sulfonyl)phenyl | red |
| 47 | 3-(β-Sulatoethyl-sulfonyl)phenyl | 8-Hydroxy-3,6-di-sulfonaphth-7-yl-1-ylamino | 4-Methoxyphen-1,3-di-ylamino | 8-Hydroxy-3,6-di-sulfonaphth-7-yl-1-ylamino | 3-(β-Sulfatoethyl-sulfonyl)phenyl | red |
| 48 | 3-(β-Sulatoethyl-sulfonyl)phenyl | 8-Hydroxy-3,6-di-sulfonaphth-7-yl-1-ylamino | Prop-1,2-di-ylamino | 8-Hydroxy-3,6-di-sulfonaphth-7-yl-1-ylamino | 3-(β-Sulfatoethyl-sulfonyl)phenyl | red |
| 49 | 3-(β-Sulatoethyl-sulfonyl)phenyl | 8-Hydroxy-3,6-di-sulfonaphth-7-yl-1-ylamino | Cyclohex-1,3-di-ylamino | 8-Hydroxy-3,6-di-sulfonaphth-7-yl-1-ylamino | 3-(β-Sulfatoethyl-sulfonyl)phenyl | red |
| 50 | 3-(β-Sulatoethyl-sulfonyl)phenyl | 8-Hydroxy-3,6-di-sulfonaphth-7-yl-1-ylamino | 1,1-Di-phen-cyclo-hexan-4'-ylamino-4"-ylamino | 8-Hydroxy-3,6-di-sulfonaphth-7-yl-1-ylamino | 3-(β-Sulfatoethyl-sulfonyl)phenyl | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| 51 | 3-(β-Sulatoethyl-sulfonyl)phenyl | 8-Hydroxy-3,6-di-sulfonaphth-7-yl-1-ylamino | 3,3'-Dimethoxy-6,6'-disulfo-1,1'-diphenyl-4,4'-di-ylamino | 8-Hydroxy-3,6-di-sulfonaphth-7-yl-ylamino | 3-(β-Sulfatoethyl-sulfonyl)phenyl | red |
| 52 | 3-(β-Sulatoethyl-sulfonyl)phenyl | 8-Hydroxy-3,6-di-sulfonaphth-7-yl-1-ylamino | Cyclohex-1,3-di-(methylamino) | 8-Hydroxy-3,6-di-sulfonaphth-7-yl-ylamino | 3-(β-Sulfatoethyl-sulfonyl)phenyl | red |
| 53 | 3-(β-Sulatoethyl-sulfonyl)phenyl | 8-Hydroxy-3,6-di-sulfonaphth-7-yl-1-ylamino | 1-(Phenylamino)-phen-4,4'-di-ylamino | 8-Hydroxy-3,6-di-sulfonaphth-7-yl-ylamino | 3-(β-Sulfatoethyl-sulfonyl)phenyl | red |
| 54 | 3-(β-Sulatoethyl-sulfonyl)phenyl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-ylamino | 3-(β-Sulfatoethyl-sulfonyl)phenyl | red |
| 55 | 2-Sulfo-4-(β-sulfatoethyl-sulfonyl)phenyl | 8-Hydroxy-3,6-di-sulfonaphth-7-yl-1-ylamino | Eth-1,2-di-ylamino | 8-Hydroxy-3,6-di-sulfonaphth-7-yl-1-ylamino | 2-Sulfo-4-(β-sulfatoethyl-sulfonyl)phenyl | red |
| 56 | 2-Sulfo-4-(β-sulfatoethyl-sulfonyl)phenyl | 8-Hydroxy-3,6-di-sulfonaphth-7-yl-1-ylamino | But-1,4-di-ylamino | 8-Hydroxy-3,6-di-sulfonaphth-7-yl-1-ylamino | 2-Sulfo-4-(β-sulfatoethyl-sulfonyl)phenyl | red |
| 57 | 2-Sulfo-4-(β-sulfatoethyl-sulfonyl)phenyl | 8-Hydroxy-3,6-di-sulfonaphth-7-yl-1-ylamino | Hex-1,6-di-ylamino | 8-Hydroxy-3,6-di-sulfonaphth-7-yl-1-ylamino | 2-Sulfo-4-(β-sulfatoethyl-sulfonyl)phenyl | red |
| 58 | 2-Sulfo-4-(β-sulfatoethyl-sulfonyl)phenyl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 2-Sulfo-4-(β-sulfatoethyl-sulfonyl)phenyl | red |
| 59 | 2-Sulfo-4-(β-sulfatoethyl-sulfonyl)phenyl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 2-Sulfo-4-(β-sulfatoethyl-sulfonyl)phenyl | red |
| 60 | 2-Sulfo-4-(β-sulfatoethyl-sulfonyl)phenyl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 2-Sulfo-4-(β-sulfatoethyl-sulfonyl)phenyl | red |
| 61 | 2-Sulfo-4-(β-sulfatoethyl-sulfonyl)phenyl | 8-Hydroxy-3,6-di-sulfonaphth-7-yl-1-ylamino | Piperazin-1,4-ylene | 8-Hydroxy-3,6-di-sulfonaphth-7-yl-1-ylamino | 2-Sulfo-4-(β-sulfatoethyl-sulfonyl)phenyl | red |
| 62 | 2-Sulfo-4-(β-sulfatoethyl-sulfonyl)phenyl | 8-Hydroxy-3,6-di-sulfonaphth-7-yl-1-ylamino | Cyclohex-1,4-di-ylamino | 8-Hydroxy-3,6-di-sulfonaphth-7-yl-1-ylamino | 2-Sulfo-4-(β-sulfatoethyl-sulfonyl)phenyl | red |
| 63 | 2-Sulfo-4-(β-sulfatoethyl-sulfonyl)phenyl | 8-Hydroxy-3,6-di-sulfonaphth-7-yl-1-ylamino | Phen-1-ylamino-4-(N-methyl)ylamino | 8-Hydroxy-3,6-di-sulfonaphth-7-yl-1-ylamino | 2-Sulfo-4-(β-sulfatoethyl-sulfonyl)phenyl | red |
| 64 | 2-Sulfo-4-(β-sulfatoethyl-sulfonyl)phenyl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 2-Sulfo-4-(β-sulfatoethyl-sulfonyl)phenyl | red |
| 65 | 2-Sulfo-4-(β-sulfatoethyl-sulfonyl)phenyl | 8-Hydroxy-3,6-di-sulfonaphth-7-yl-1-ylamino | 3-Sulfophen-1,3-di-ylamino | 8-Hydroxy-3,6-di-sulfonaphth-7-yl-1-ylamino | 2-Sulfo-4-(β-sulfatoethyl-sulfonyl)phenyl | red |
| 66 | 2-Sulfo-4-(β-sulfatoethyl-sulfonyl)phenyl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 2-Sulfo-4-(β-sulfatoethyl-sulfonyl)phenyl | red |
| 67 | 2-Sulfo-4-(β-sulfatoethyl-sulfonyl)phenyl | 8-Hydroxy-3,6-di-sulfonaphth-7-yl-1-ylamino | 4-Methylphen-1,3-di ylamino | 8-Hydroxy-3,6-di-sulfonaphth-7-yl-1-ylamino | 2-Sulfo-4-(β-sulfatoethyl-sulfonyl)phenyl | red |
| 68 | 2-Sulfo-4-(β-sulfatoethyl-sulfonyl)phenyl | 8-Hydroxy-3,6-di-sulfonaphth-7-yl-1-ylamino | 3-Methylphen-1,4-di-ylamino | 8-Hydroxy-3,6-di-sulfonaphth-7-yl-1-ylamino | 2-Sulfo-4-(β-sulfatoethyl-sulfonyl)phenyl | red |
| 69 | 2-Sulfo-4-(β-sulfatoethyl-sulfonyl)phenyl | 8-Hydroxy-3,6-di-sulfonaphth-7-yl-1-ylamino | 4-Methoxyphen-1,3-di-ylamino | 8-Hydroxy-3,6-di-sulfonaphth-7-yl-1-ylamino | 2-Sulfo-4-(β-sulfatoethyl-sulfonyl)phenyl | red |
| 70 | 2-Sulfo-4-(β-sulfatoethyl-sulfonyl)phenyl | 8-Hydroxy-3,6-di-sulfonaphth-7-yl-1-ylamino | Cyclohex-1,3-di-ylamino | 8-Hydroxy-3,6-di-sulfonaphth-7-yl-1-ylamino | 2-Sulfo-4-(β-sulfatoethyl-sulfonyl)phenyl | red |
| 71 | 2-Sulfo-4-(β-sulfatoethyl-sulfonyl)phenyl | 8-Hydroxy-3,6-di-sulfonaphth-7-yl-1-ylamino | Prop-1,2-di-ylamino | 8-Hydroxy-3,6-di-sulfonaphth-7-yl-1-ylamino | 2-Sulfo-4-(β-sulfatoethyl-sulfonyl)phenyl | red |
| 72 | 2-Sulfo-4-(β-sulfatoethyl-sulfonyl)phenyl | 8-Hydroxy-3,6-di-sulfonaphth-7-yl-1-ylamino | 1,1-Diphencyclo-hexan-4'-ylamino-4"-ylamino | 8-Hydroxy-3,6-di-sulfonaphth-7-yl-1-ylamino | 2-Sulfo-4-(β-sulfatoethyl-sulfonyl)phenyl | red |
| 73 | 2-Sulfo-4-(β-sulfatoethyl-sulfonyl)phenyl | 8-Hydroxy-3,6-di-sulfonaphth-7-yl-1-ylamino | 3,3'-Dimethoxy-6,6'-disulfo-1,1'-diphenyhl-4,4'-di-ylamino | 8-Hydroxy-3,6-di-sulfonaphth-7-yl-1-ylamino | 2-Sulfo-4-(β-sulfatoethyl-sulfonyl)phenyl | red |
| 74 | 2-Sulfo-4-(β-sulfatoethyl-sulfonyl)phenyl | 8-Hydroxy-3,6-di-sulfonaphth-7-yl-1-ylamino | Cyclohex-1,3-di-(methylamino) | 8-Hydroxy-3,6-di-sulfonaphth-7-yl-1-ylamino | 2-Sulfo-4-(β-sulfatoethyl-sulfonyl)phenyl | red |
| 75 | 2-Sulfo-4-(β-sulfatoethyl-sulfonyl)phenyl | 8-Hydroxy-3,6-di-sulfonaphth-7-yl-1-ylamino | 1-(Phenylamino)phen-4,4'-di-ylamino | 8-Hydroxy-3,6-di-sulfonaphth-7-yl-1-ylamino | 2-Sulfo-4-(β-sulfatoethyl-sulfonyl)phenyl | red |
| 76 | 2-Sulfo-4-(β-sulfatoethyl-sulfonyl)phenyl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-1-ylamino | 2-Sulfo-4-(β-sulfatoethyl-sulfonyl)phenyl | red |
| 77 | 2-Methoxy-5-(β- | 8-Hydroxy-4,6-di- | Eth-1,2-di-ylamino | 8-Hydroxy-4,6-di- | 2-Methoxy-5-(β- | bluish-tinged |

-continued

| Ex. | Radical $D^{10}$- | Radical -$K^{10}$-N($R^{10}$)- | Azo dyestuff of the formula (A) Radical $A^{\circ}$ | Radical -N($R^{11}$)-$K^{11}$- | Radical $D^{11}$- | Color shade |
|---|---|---|---|---|---|---|
|  | sulfatoethyl-sulfonyl)phenyl | sulfonaphth-7-yl-1-ylamino |  | sulfonaphth-7-yl-1-ylamino | sulfatoethyl-sulfonyl)phenyl | red (520) |
| 78 | 2-Methoxy-5-(β-sulfatoethyl-sulfonyl)phenyl | 8-Hydroxy-4,6-di-sulfonaphth-7-yl-1-ylamino | But-1,4-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 79 | 2-Methoxy-5-(β-sulfatoethyl-sulfonyl)phenyl | 8-Hydroxy-4,6-di-sulfonaphth-7-yl-1-ylamino | Hex-1,6-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 80 | 2-Methoxy-5-(β-sulfatoethyl-sulfonyl)phenyl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 81 | 2-Methoxy-5-(β-sulfatoethyl-sulfonyl)phenyl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 82 | 2-Methoxy-5-(β-sulfatoethyl-sulfonyl)phenyl | 8-Hydroxy-4,6-di-sulfonaphth-7-yl-1-ylamino | Phen-1,2-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 83 | 2-Methoxy-5-(β-sulfatoethyl-sulfonyl)phenyl | 8-Hydroxy-4,6-di-sulfonaphth-7-yl-1-ylamino | Piperazin-1,4-ylene | 8-Hydroxy-4,6-di-sulfonaphth-7-yl-1-ylamino | 2-Methoxy-5-(β-sulfatoethyl-sulfonyl)phenyl | bluish-tinged red |
| 84 | 2-Methoxy-5-(β-sulfatoethyl-sulfonyl)phenyl | 8-Hydroxy-4,6-di-sulfonaphth-7-yl-1-ylamino | Cyclo-1,4-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 85 | 2-Methoxy-5-(β-sulfatoethyl-sulfonyl)phenyl | 8-Hydroxy-4,6-di-sulfonaphth-7-yl-1-ylamino | Phen-1-ylamino-4-(N-methyl)ylamino | 8-Hydroxy-4,6-di-sulfonaphth-7-yl-1-ylamino | 2-Methoxy-5-(β-sulfatoethyl-sulfonyl)phenyl | bluish-tinged red |
| 86 | 2-Methoxy-5-(β-sulfatoethyl-sulfonyl)phenyl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 87 | 2-Methoxy-5-(β-sulfatoethyl-sulfonyl)phenyl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 88 | 2-Methoxy-5-(β-sulfatoethyl-sulfonyl)phenyl | 8-Hydroxy-4,6-di-sulfonaphth-7-yl-1-ylamino | N-Methylbenzylamino-4'-ylamino | 8-Hydroxy-4,6-di-sulfonaphth-7-yl-1-ylamino | 2-Methoxy-5-(β-sulfatoethyl-sulfonyl)phenyl | bluish-tinged red |
| 89 | 2-Methoxy-5-(β-sulfatoethyl-sulfonyl)phenyl | 8-Hydroxy-4,6-di-sulfonaphth-7-yl-1-ylamino | 4-Methylphen-1,3-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 90 | 2-Methoxy-5-(β-sulfatoethyl-sulfonyl)phenyl | 8-Hydroxy-4,6-di-sulfonaphth-7-yl-1-ylamino | 3-Methylphen-1,3-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 91 | 2-Methoxy-5-(β-sulfatoethyl-sulfonyl)phenyl | 8-Hydroxy-4,6-di-sulfonaphth-7-yl-1-ylamino | 4-Methoxyphen-1,3-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 92 | 2-Methoxy-5-(β-sulfatoethyl-sulfonyl)phenyl | 8-Hydroxy-4,6-di-sulfonaphth-7-yl-1-ylamino | Prop-1,2-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 93 | 2-Methoxy-5-(β-sulfatoethyl-sulfonyl)phenyl | 8-Hydroxy-4,6-di-sulfonaphth-7-yl-1-ylamino | Cyclohex-1,3-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 94 | 2-Methoxy-5-(β-sulfatoethyl-sulfonyl)phenyl | 8-Hydroxy-4,6-di-sulfonaphth-7-yl-1-ylamino | 1,1-Di-phencyclo-hexan-4'-ylamino-4"-ylamino | 8-Hydroxy-4,6-di-sulfonaphth-7-yl-1-ylamino | 2-Methoxy-5-(β-sulfatoethyl-sulfonyl)phenyl | bluish-tinged red |
| 95 | 2-Methoxy-5-(β-sulfatoethyl-sulfonyl)phenyl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 96 | 2-Methoxy-5-(β-sulfatoethyl-sulfonyl)phenyl | 8-Hydroxy-4,6-di-sulfonaphth-7-yl-1-ylamino | Cyclohex-1,3-di-(methylamino) | 8-Hydroxy-4,6-di-sulfonaphth-7-yl-1-ylamino | 2-Methoxy-5-(β-sulfatoethyl-sulfonyl)phenyl | bluish-tinged red |
| 97 | 2-Methoxy-5-(β-sulfatoethyl-sulfonyl)phenyl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 98 | 2-Methoxy-5-(β-sulfatoethyl-sulfonyl)phenyl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 2-Methoxy-5-(β-sulfatoethyl-sulfonyl)phenyl | bluish-tinged red |
| 99 | 4-(Vinylsulfonyl)-phenyl | 8-Hydroxy-3,6-di-sulfonaphth-7-yl-1-ylamino | Eth-1,2-di-ylamino | 8-Hydroxy-3,6-di-sulfonaphth-7-yl-1-ylamino | 4-(Vinylsulfonyl)-phenyl | red (517) |
| 100 | 4-(Vinylsulfonyl)-phenyl | 8-Hydroxy-3,6-di-sulfonaphth-7-yl-1-ylamino | But-1,4-di-ylamino | 8-Hydroxy-3,6-di-sulfonaphth-7-yl-1-ylamino | 4-(Vinylsulfonyl)-phenyl | red (519) |
| 101 | 4-(Vinylsulfonyl)-phenyl | 8-Hydroxy-3,6-di-sulfonaphth-7-yl-1-ylamino | Hex-1,6-di-ylamino | 8-Hydroxy-3,6-di-sulfonaphth-7-yl-1-ylamino | 4-(Vinylsulfonyl)-phenyl | red (518) |
| 102 | 4-(Vinylsulfonyl)-phenyl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 4-(Vinylsulfonyl)-phenyl | red (520) |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| 103 | 4-(Vinylsulfonyl)-phenyl | 8-Hydroxy-3,6-disulfonaphth-7-yl-1-ylamino | Phen-1,3-di-ylamino | 8-Hydroxy-3,6-disulfonaphth-7-yl-1-ylamino | 4-(Vinylsulfonyl)-phenyl | red (519) |
| 104 | 4-(Vinylsulfonyl)-phenyl | 8-Hydroxy-3,6-disulfonaphth-7-yl-1-ylamino | Phen-1,2-di-ylamino | 8-Hydroxy-3,6-disulfonaphth-7-yl-1-ylamino | 4-(Vinylsulfonyl)-phenyl | red (522) |
| 105 | 4-(Vinylsulfonyl)-phenyl | 8-Hydroxy-3,6-disulfonaphth-7-yl-1-ylamino | Piperazin-1,4-ylene | 8-Hydroxy-3,6-disulfonaphth-7-yl-1-ylamino | 4-(Vinylsulfonyl)-phenyl | red (517) |
| 106 | 4-(Vinylsulfonyl)-phenyl | 8-Hydroxy-3,6-disulfonaphth-7-yl-1-ylamino | Cyclohex-1,4-di-ylamino | 8-Hydroxy-3,6-disulfonaphth-7-yl-1-ylamino | 4-(Vinylsulfonyl)-phenyl | red |
| 107 | 4-(Vinylsulfonyl)-phenyl | 8-Hydroxy-3,6-disulfonaphth-7-yl-1-ylamino | Phen-1-ylamino-4-(N-methyl)ylamino | 8-Hydroxy-3,6-disulfonaphth-7-yl-1-ylamino | 4-(Vinylsulfonyl)-phenyl | red |
| 108 | 4-(Vinylsulfonyl)-phenyl | 8-Hydroxy-3,6-disulfonaphth-7-yl-1-ylamino | 4-Sulfophen-1,3-di-ylamino | 8-Hydroxy-3,6-disulfonaphth-7-yl-1-ylamino | 4-(Vinylsulfonyl)-phenyl | red |
| 109 | 4-(Vinylsulfonyl)-phenyl | 8-Hydroxy-3,6-disulfonaphth-7-yl-1-ylamino | 3-Sulfophen-1,4-di-ylamino | 8-Hydroxy-3,6-disulfonaphth-7-yl-1-ylamino | 4-(Vinylsulfonyl)-phenyl | red |
| 110 | 4-(Vinylsulfonyl)-phenyl | 8-Hydroxy-3,6-disulfonaphth-7-yl-1-ylamino | N-Methylbenzylamino-4'-ylamino | 8-Hydroxy-3,6-disulfonaphth-7-yl-1-ylamino | 4-(Vinylsulfonyl)-phenyl | red |
| 111 | 4-(Vinylsulfonyl)-phenyl | 8-Hydroxy-3,6-disulfonaphth-7-yl-1-ylamino | 4-Methylphen-1,3-di-ylamino | 8-Hydroxy-3,6-disulfonaphth-7-yl-1-ylamino | 4-(Vinylsulfonyl)-phenyl | red |
| 112 | 4-(Vinylsulfonyl)-phenyl | 8-Hydroxy-3,6-disulfonaphth-7-yl-1-ylamino | 3-Methylphen-1,3-di-ylamino | 8-Hydroxy-3,6-disulfonaphth-7-yl-1-ylamino | 4-(Vinylsulfonyl)-phenyl | red |
| 113 | 4-(Vinylsulfonyl)-phenyl | 8-Hydroxy-3,6-disulfonaphth-7-yl-1-ylamino | 4-Methoxyphen-1,3-di-ylamino | 8-Hydroxy-3,6-disulfonaphth-7-yl-1-ylamino | 4-(Vinylsulfonyl)-phenyl | red |
| 114 | 4-(Vinylsulfonyl)-phenyl | 8-Hydroxy-3,6-disulfonaphth-7-yl-1-ylamino | Prop-1,2-di-ylamino | 8-Hydroxy-3,6-disulfonaphth-7-yl-1-ylamino | 4-(Vinylsulfonyl)-phenyl | red |
| 115 | 4-(Vinylsulfonyl)-phenyl | 8-Hydroxy-3,6-disulfonaphth-7-yl-1-ylamino | Cyclohex-1,3-di-ylamino | 8-Hydroxy-3,6-disulfonaphth-7-yl-1-ylamino | 4-(Vinylsulfonyl)-phenyl | red |
| 116 | 4-(Vinylsulfonyl)-phenyl | 8-Hydroxy-3,6-disulfonaphth-7-yl-1-ylamino | 1,1-Di-phencyclohexan-4'-ylamino-4"-ylamino | 8-Hydroxy-3,6-disulfonaphth-7-yl-1-ylamino | 4-(Vinylsulfonyl)-phenyl | red |
| 117 | 4-(Vinylsulfonyl)-phenyl | 8-Hydroxy-3,6-disulfonaphth-7-yl-1-ylamino | 3,3'-Dimethoxy-6,6'-disulfo-1,1'-diphenyl-4,4'-di-ylamino | 8-Hydroxy-3,6-disulfonaphth-7-yl-1-ylamino | 4-(Vinylsulfonyl)-phenyl | red |
| 118 | 4-(Vinylsulfonyl)-phenyl | 8-Hydroxy-3,6-disulfonaphth-7-yl-1-ylamino | Cyclohex-1,3-di-(methylamino) | 8-Hydroxy-3,6-disulfonaphth-7-yl-1-ylamino | 4-(Vinylsulfonyl)-phenyl | red |
| 119 | 4-(Vinylsulfonyl)-phenyl | 8-Hydroxy-3,6-disulfonaphth-7-yl-1-ylamino | 1-(Phenylamino)phen-4,4'-di-ylamino | 8-Hydroxy-3,6-disulfonaphth-7-yl-1-ylamino | 4-(Vinylsulfonyl)-phenyl | red |
| 120 | 4-(Vinylsulfonyl)-phenyl | 8-Hydroxy-3,6-disulfonaphth-7-yl-1-ylamino 4,4'-ylamino | 3,3'-Dimethyl-6,6'-disulfo-1,1'-diphenyl-4,4'-di-ylamino | 8-Hydroxy-3,6-disulfonaphth-7-yl-1-ylamino | 4-(Vinylsulfonyl)-phenyl | red |
| 121 | 4-(β-Sulfatoethylsulfonyl)phenyl | 8-Hydroxy-4,6-disulfonaphth-7-yl-1-ylamino | Eth-1,2-di-ylamino | 8-Hydroxy-4,6-disulfonaphth-7-yl-1-ylamino | 4-(β-Sulfatoethylsulfonyl)phenyl | red |
| 122 | 4-(β-Sulfatoethylsulfonyl)phenyl | 8-Hydroxy-4,6-disulfonaphth-7-yl-1-ylamino | But-1,4-di-ylamino | 8-Hydroxy-4,6-disulfonaphth-7-yl-1-ylamino | 4-(β-Sulfatoethylsulfonyl)phenyl | red |
| 123 | 4-(β-Sulfatoethylsulfonyl)phenyl | 8-Hydroxy-4,6-disulfonaphth-7-yl-1-ylamino | Hex-1,6-di-ylamino | 8-Hydroxy-4,6-disulfonaphth-7-yl-1-ylamino | 4-(β-Sulfatoethylsulfonyl)phenyl | red |
| 124 | 4-(β-Sulfatoethylsulfonyl)phenyl | 8-Hydroxy-4,6-disulfonaphth-7-yl-1-ylamino | Phen-1,4-di-ylamino | 8-Hydroxy-4,6-disulfonaphth-7-yl-1-ylamino | 4-(β-Sulfatoethylsulfonyl)phenyl | red |
| 125 | 4-(β-Sulfatoethylsulfonyl)phenyl | 8-Hydroxy-4,6-disulfonaphth-7-yl-1-ylamino | Phen-1,3-di-ylamino | 8-Hydroxy-4,6-disulfonaphth-7-yl-1-ylamino | 4-(β-Sulfatoethylsulfonyl)phenyl | red |
| 126 | 4-(β-Sulfatoethylsulfonyl)phenyl | 8-Hydroxy-4,6-disulfonaphth-7-yl-1-ylamino | Phen-1,2-di-ylamino | 8-Hydroxy-4,6-disulfonaphth-7-yl-1-ylamino | 4-(β-Sulfatoethylsulfonyl)phenyl | red |
| 127 | 4-(β-Sulfatoethylsulfonyl)phenyl | 8-Hydroxy-4,6-disulfonaphth-7-yl-1-ylamino | Piperazin-1,4-ylene | 8-Hydroxy-4,6-disulfonaphth-7-yl-1-ylamino | 4-(β-Sulfatoethylsulfonyl)phenyl | red |
| 128 | 4-(β-Sulfatoethylsulfonyl)phenyl | 8-Hydroxy-4,6-disulfonaphth-7-yl-1-ylamino | Cyclohex-1,4-di-ylamino | 8-Hydroxy-4,6-disulfonaphth-7-yl-1- | 4-(β-Sulfatoethylsulfonyl)phenyl | |

-continued

| Ex. | Radical D¹⁰- | Radical -K¹⁰-N(R¹⁰)- | Azo dyestuff of the formula (A)<br>Radical A° | Radical -N(R¹¹)-K¹¹- | Radical D¹¹- | Color shade |
|---|---|---|---|---|---|---|
| 129 | 4-(β-Sulfatoethyl-sulfonyl)phenyl | 8-Hydroxy-4,6-di-sulfonaphth-7-yl-1-ylamino | Phen-1-ylamino-4-(N-methyl)ylamino | 8-Hydroxy-4,6-di-sulfonaphth-7-yl-1-ylamino | 4-(β-Sulfatoethyl-sulfonyl)phenyl | red |
| 130 | 4-(β-Sulfatoethyl-sulfonyl)phenyl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 4-(β-Sulfatoethyl-sulfonyl)phenyl | red |
| 131 | 4-(β-Sulfatoethyl-sulfonyl)phenyl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 4-(β-Sulfatoethyl-sulfonyl)phenyl | red |
| 132 | 4-(β-Sulfatoethyl-sulfonyl)phenyl | 8-Hydroxy-4,6-di-sulfonaphth-7-yl-1-ylamino | N-Methylbenzylamino-4'-ylamino | 8-Hydroxy-4,6-di-sulfonaphth-7-yl-1-ylamino | 4-(β-Sulfatoethyl-sulfonyl)phenyl | red |
| 133 | 4-(β-Sulfatoethyl-sulfonyl)phenyl | 8-Hydroxy-4,6-di-sulfonaphth-7-yl-1-ylamino | 4-Methylphen-1,3-di-ylamino | 8-Hydroxy-4,6-di-sulfonaphth-7-yl-1-ylamino | 4-(β-Sulfatoethyl-sulfonyl)phenyl | red |
| 134 | 4-(β-Sulfatoethyl-sulfonyl)phenyl | 8-Hydroxy-4,6-di-sulfonaphth-7-yl-1-ylamino | 3-Methylphen-1,3-di-ylamino | 8-Hydroxy-4,6-di-sulfonaphth-7-yl-1-ylamino | 4-(β-Sulfatoethyl-sulfonyl)phenyl | red |
| 135 | 4-(β-Sulfatoethyl-sulfonyl)phenyl | 8-Hydroxy-4,6-di-sulfonaphth-7-yl-1-ylamino | 4-Methoxyphen-1,3-di-ylamino | 8-Hydroxy-4,6-di-sulfonaphth-7-yl-1-ylamino | 4-(β-Sulfatoethyl-sulfonyl)phenyl | red |
| 136 | 4-(β-Sulfatoethyl-sulfonyl)phenyl | 8-Hydroxy-4,6-di-sulfonaphth-7-yl-1-ylamino | Prop-1,2-di-ylamino | 8-Hydroxy-4,6-di-sulfonaphth-7-yl-1-ylamino | 4-(β-Sulfatoethyl-sulfonyl)phenyl | red |
| 137 | 4-(β-Sulfatoethyl-sulfonyl)phenyl | 8-Hydroxy-4,6-di-sulfonaphth-7-yl-1-ylamino | Cyclohex-1,3-di-ylamino | 8-Hydroxy-4,6-di-sulfonaphth-7-yl-1-ylamino | 4-(β-Sulfatoethyl-sulfonyl)phenyl | red |
| 138 | 4-(β-Sulfatoethyl-sulfonyl)phenyl | 8-Hydroxy-4,6-di-sulfonaphth-7-yl-1-ylamino | 1,1-Diphencyclo-hexan-4'-ylamino-4''-ylamino | 8-Hydroxy-4,6-di-sulfonaphth-7-yl-1-ylamino | 4-(β-Sulfatoethyl-sulfonyl)phenyl | red |
| 139 | 4-(β-Sulfatoethyl-sulfonyl)phenyl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 4-(β-Sulfatoethyl-sulfonyl)phenyl | red |
| 140 | 4-(β-Sulfatoethyl-sulfonyl)phenyl | 8-Hydroxy-4,6-di-sulfonaphth-7-yl-1-ylamino | Cyclohex-1,3-di-(methylamino) | 8-Hydroxy-4,6-di-sulfonaphth-7-yl-1-ylamino | 4-(β-Sulfatoethyl-sulfonyl)phenyl | red |
| 141 | 4-(β-Sulfatoethyl-sulfonyl)phenyl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 4-(β-Sulfatoethyl-sulfonyl)phenyl | red |
| 142 | 4-(β-Sulfatoethyl-sulfonyl)phenyl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 4-(β-Sulfatoethyl-sulfonyl)phenyl | red |
| 143 | 2,5-Dimethoxy-4-(β-sulfatoethyl-sulfonyl)phenyl | 8-Hydroxy-3,6-di-sulfonaphth-7-yl-1-ylamino | Eth-1,2-di-ylamino | 8-Hydroxy-3,6-di-sulfonaphth-7-yl-1-ylamino | 2,6-Dimethoxy-4-(β-sulfatoethyl-sulfonyl)phenyl | claret (537) |
| 144 | 2,5-Dimethoxy-4-(β-sulfatoethyl-sulfonyl)phenyl | 8-Hydroxy-3,6-di-sulfonaphth-7-yl-1-ylamino | Prop-1,3-di-ylamino | 8-Hydroxy-3,6-di-sulfonaphth-7-yl-1-ylamino | 2,6-Dimethoxy-4-(β-sulfatoethyl-sulfonyl)phenyl | claret |
| 145 | 2,5-Dimethoxy-4-(β-sulfatoethyl-sulfonyl)phenyl | 8-Hydroxy-3,6-di-sulfonaphth-7-yl-1-ylamino | But-1,4-di-ylamino | 8-Hydroxy-3,6-di-sulfonaphth-7-yl-1-ylamino | 2,6-Dimethoxy-4-(β-sulfatoethyl-sulfonyl)phenyl | claret |
| 146 | 2,5-Dimethoxy-4-(β-sulfatoethyl-sulfonyl)phenyl | 8-Hydroxy-3,6-di-sulfonaphth-7-yl-1-ylamino | Hex-1,6-di-ylamino | 8-Hydroxy-3,6-di-sulfonaphth-7-yl-1-ylamino | 2,6-Dimethoxy-4-(β-sulfatoethyl-sulfonyl)phenyl | claret |
| 147 | 2,5-Dimethoxy-4-(β-sulfatoethyl-sulfonyl)phenyl | 8-Hydroxy-3,6-di-sulfonaphth-7-yl-1-ylamino | Piperazin-1,4-ylene | 8-Hydroxy-3,6-di-sulfonaphth-7-yl-1-ylamino | 2,6-Dimethoxy-4-(β-sulfatoethyl-sulfonyl)phenyl | claret |
| 148 | 2,5-Dimethoxy-4-(β-sulfatoethyl-sulfonyl)phenyl | 8-Hydroxy-3,6-di-sulfonaphth-7-yl-1-ylamino | Cyclohex-1,4-di-ylamino | 8-Hydroxy-3,6-di-sulfonaphth-7-yl-1-ylamino | 2,6-Dimethoxy-4-(β-sulfatoethyl-sulfonyl)phenyl | claret |
| 149 | 2,5-Dimethoxy-4-(β-sulfatoethyl-sulfonyl)phenyl | 8-Hydroxy-3,6-di-sulfonaphth-7-yl-1-ylamino | Prop-1,2-di-ylamino | 8-Hydroxy-3,6-di-sulfonaphth-7-yl-1-ylamino | 2,6-Dimethoxy-4-(β-sulfatoethyl-sulfonyl)phenyl | claret |
| 150 | 2,5-Dimethoxy-4-(β-sulfatoethyl-sulfonyl)phenyl | 8-Hydroxy-3,6-di-sulfonaphth-7-yl-1-ylamino | Cyclohex-1,3-di-ylamino | 8-Hydroxy-3,6-di-sulfonaphth-7-yl-1-ylamino | 2,6-Dimethoxy-4-(β-sulfatoethyl-sulfonyl)phenyl | claret |
| 151 | 2-Methoxy-5-methyl-4-(β-sulfatoethyl-sulfonyl)phenyl | 8-Hydroxy-3,6-di-sulfonaphth-7-yl-1-ylamino | Eth-1,2-di-ylamino | 8-Hydroxy-3,6-di-sulfonaphth-7-yl-1-ylamino | 2-Methoxy-5-methyl-4-(β-sulfatoethyl-sulfonyl)phenyl | claret (526) |
| 152 | 2-Methoxy-5-methyl-4-(β-sulfatoethyl-sulfonyl)phenyl | 8-Hydroxy-3,6-di-sulfonaphth-7-yl-1-ylamino | Prop-1,3-di-ylamino | 8-Hydroxy-3,6-di-sulfonaphth-7-yl-1-ylamino | 2-Methoxy-5-methyl-4-(β-sulfatoethyl-sulfonyl)phenyl | claret |
| 153 | 2-Methoxy-5-methyl-4-(β- | 8-Hydroxy-3,6-di-sulfonaphth-7-yl-1-ylamino | But-1,4-di-ylamino | 8-Hydroxy-3,6-di-sulfonaphth-7-yl-1- | 2-Methoxy-5-methyl-4-(β- | claret |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| | sulfatoethyl-sulfonyl)phenyl | | | ylamino | sulfatoethyl-sulfonyl)phenyl | |
| 154 | 2-Methoxy-5-methyl-4-(β-sulfatoethyl-sulfonyl)phenyl | 8-Hydroxy-3,6-di-sulfonaphth-7-yl-1-ylamino | Hex-1,6-di-ylamino | 8-Hydroxy-3,6-di-sulfonaphth-7-yl-1-ylamino | 2-Methoxy-5-methyl-4-(β-sulfatoethyl-sulfonyl)phenyl | claret |
| 155 | 2-Methoxy-5-methyl-4-(β-sulfatoethyl-sulfonyl)phenyl | 8-Hydroxy-3,6-di-sulfonaphth-7-yl-1-ylamino | Piperazin-1,4-ylene | 8-Hydroxy-3,6-di-sulfonaphth-7-yl-1-ylamino | 2-Methoxy-5-methyl-4-(β-sulfatoethyl-sulfonyl)phenyl | claret |
| 156 | 2-Methoxy-5-methyl-4-(β-sulfatoethyl-sulfonyl)phenyl | 8-Hydroxy-3,6-di-sulfonaphth-7-yl-1-ylamino | Cyclohex-1,4-di-ylamino | 8-Hydroxy-3,6-di-sulfonaphth-7-yl-1-ylamino | 2-Methoxy-5-methyl-4-(β-sulfatoethyl-sulfonyl)phenyl | claret |
| 157 | 2-Methoxy-5-methyl-4-(β-sulfatoethyl-sulfonyl)phenyl | 8-Hydroxy-3,6-di-sulfonaphth-7-yl-1-ylamino | Prop-1,2-di-ylamino | 8-Hydroxy-3,6-di-sulfonaphth-7-yl-1-ylamino | 2-Methoxy-5-methyl-4-(β-sulfatoethyl-sulfonyl)phenyl | claret |
| 158 | 2-Methoxy-5-methyl-4-(β-sulfatoethyl-sulfonyl)phenyl | 8-Hydroxy-3,6-di-sulfonaphth-7-yl-1-ylamino | Cyclohex-1,3-di-ylamino | 8-Hydroxy-3,6-di-sulfonaphth-7-yl-1-ylamino | 2-Methoxy-5-methyl-4-(β-sulfatoethyl-sulfonyl)phenyl | claret |
| 159 | 2,5-Dimethoxy-4-(β-sulfatoethyl-sulfonyl)phenyl | 8-Hydroxy-4,6-di-sulfonaphth-7-yl-1-ylamino | Eth-1,2-di-ylamino | 8-Hydroxy-4,6-di-sulfonaphth-7-yl-1-ylamino | 2,5-Dimethoxy-4-(β-sulfatoethyl-sulfonyl)phenyl | claret |
| 160 | 2,5-Dimethoxy-4-(β-sulfatoethyl-sulfonyl)phenyl | 8-Hydroxy-4,6-di-sulfonaphth-7-yl-1-ylamino | Prop-1,3-di-ylamino | 8-Hydroxy-4,6-di-sulfonaphth-7-yl-1-ylamino | 2,5-Dimethoxy-4-(β-sulfatoethyl-sulfonyl)phenyl | claret |
| 161 | 2,5-Dimethoxy-4-(β-sulfatoethyl-sulfonyl)phenyl | 8-Hydroxy-4,6-di-sulfonaphth-7-yl-1-ylamino | But-1,4-di-ylamino | 8-Hydroxy-4,6-di-sulfonaphth-7-yl-1-ylamino | 2,5-Dimethoxy-4-(β-sulfatoethyl-sulfonyl)phenyl | claret |
| 162 | 2,5-Dimethoxy-4-(β-sulfatoethyl-sulfonyl)phenyl | 8-Hydroxy-4,6-di-sulfonaphth-7-yl-1-ylamino | Hex-1,6-di-ylamino | 8-Hydroxy-4,6-di-sulfonaphth-7-yl-1-ylamino | 2,5-Dimethoxy-4-(β-sulfatoethyl-sulfonyl)phenyl | claret |
| 163 | 2,5-Dimethoxy-4-(β-sulfatoethyl-sulfonyl)phenyl | 8-Hydroxy-4,6-di-sulfonaphth-7-yl-1-ylamino | Piperazin-1,4-ylene | 8-Hydroxy-4,6-di-sulfonaphth-7-yl-1-ylamino | 2,5-Dimethoxy-4-(β-sulfatoethyl-sulfonyl)phenyl | claret |
| 164 | 2,5-Dimethoxy-4-(β-sulfatoethyl-sulfonyl)phenyl | 8-Hydroxy-4,6-di-sulfonaphth-7-yl-1-ylamino | Cyclohex-1,4-di-ylamino | 8-Hydroxy-4,6-di-sulfonaphth-7-yl-1-ylamino | 2,5-Dimethoxy-4-(β-sulfatoethyl-sulfonyl)phenyl | claret |
| 165 | 2,5-Dimethoxy-4-(β-sulfatoethyl-sulfonyl)phenyl | 8-Hydroxy-4,6-di-sulfonaphth-7-yl-1-ylamino | Prop-1,2-di-ylamino | 8-Hydroxy-4,6-di-sulfonaphth-7-yl-1-ylamino | 2,5-Dimethoxy-4-(β-sulfatoethyl-sulfonyl)phenyl | claret |
| 166 | 2,5-Dimethoxy-4-(β-sulfatoethyl-sulfonyl)phenyl | 8-Hydroxy-4,6-di-sulfonaphth-7-yl-1-ylamino | Cyclohex-1,3-di-ylamino | 8-Hydroxy-4,6-di-sulfonaphth-7-yl-1-ylamino | 2,5-Dimethoxy-4-(β-sulfatoethyl-sulfonyl)phenyl | claret |
| 167 | 2-Methoxy-5-methyl-4-(β-sulfatoethyl-sulfonyl)phenyl | 8-Hydroxy-4,6-di-sulfonaphth-7-yl-1-ylamino | Eth-1,2-di-ylamino | 8-Hydroxy-4,6-di-sulfonaphth-7-yl-1-ylamino | 2-Methoxy-5-methyl-4-(β-sulfatoethyl-sulfonyl)phenyl | claret |
| 168 | 2-Methoxy-5-methyl-4-(β-sulfatoethyl-sulfonyl)phenyl | 8-Hydroxy-4,6-di-sulfonaphth-7-yl-1-ylamino | Prop-1,3-di-ylamino | 8-Hydroxy-4,6-di-sulfonaphth-7-yl-1-ylamino | 2-Methoxy-5-methyl-4-(β-sulfatoethyl-sulfonyl)phenyl | claret |
| 169 | 2-Methoxy-5-methyl-4-(β-sulfatoethyl-sulfonyl)phenyl | 8-Hydroxy-4,6-di-sulfonaphth-7-yl-1-ylamino | But-1,4-di-ylamino | 8-Hydroxy-4,6-di-sulfonaphth-7-yl-1-ylamino | 2-Methoxy-5-methyl-4-(β-sulfatoethyl-sulfonyl)phenyl | claret |
| 170 | 2-Methoxy-5-methyl-4-(β-sulfatoethyl-sulfonyl)phenyl | 8-Hydroxy-4,6-di-sulfonaphth-7-yl-1-ylamino | Hex-1,6-di-ylamino | 8-Hydroxy-4,6-di-sulfonaphth-7-yl-1-ylamino | 2-Methoxy-5-methyl-4-(β-sulfatoethyl-sulfonyl)phenyl | claret |
| 171 | 2-Methoxy-5-methyl-4-(β-sulfatoethyl-sulfonyl)phenyl | 8-Hydroxy-4,6-di-sulfonaphth-7-yl-1-ylamino | Piperazin-1,4-ylene | 8-Hydroxy-4,6-di-sulfonaphth-7-yl-1-ylamino | 2-Methoxy-5-methyl-4-(β-sulfatoethyl-sulfonyl)phenyl | claret |
| 172 | 2-Methoxy-5-methyl-4-(β-sulfatoethyl-sulfonyl)phenyl | 8-Hydroxy-4,6-di-sulfonaphth-7-yl-1-ylamino | Cyclohex-1,4-di-ylamino | 8-Hydroxy-4,6-di-sulfonaphth-7-yl-1-ylamino | 2-Methoxy-5-methyl-4-(β-sulfatoethyl-sulfonyl)phenyl | claret |
| 173 | 2-Methoxy-5-methyl-4-(β-sulfatoethyl-sulfonyl)phenyl | 8-Hydroxy-4,6-di-sulfonaphth-7-yl-1-ylamino | Prop-1,2-di-ylamino | 8-Hydroxy-4,6-di-sulfonaphth-7-yl-1-ylamino | 2-Methoxy-5-methyl-4-(β-sulfatoethyl-sulfonyl)phenyl | claret |
| 174 | 2-Methoxy-5-methyl-4-(β-sulfatoethyl- | 8-Hydroxy-4,6-di-sulfonaphth-7-yl-1-ylamino | Cyclohex-1,3-di-ylamino | 8-Hydroxy-4,6-di-sulfonaphth-7-yl-1-ylamino | 2-Methoxy-5-methyl-4-(β-sulfatoethyl- | claret |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| | sulfonyl)phenyl | | | | sulfonyl)phenyl | |
| 175 | 1-Sulfo-6-(β-sulfatoethyl-sulfonyl)naphth-2-yl | 8-Hydroxy-3,6-di-sulfonaphth-7-yl-1-ylamino | Phen-1-ylamino-4-(N-methyl)ylamino | 8-Hydroxy-3,6-di-sulfonaphth-7-yl-1-ylamino | 1-Sulfo-6-(β-sulfatoethyl-sulfonyl)naphth-2-yl | red (540) |
| 176 | 1-Sulfo-6-(β-sulfatoethyl-sulfonyl)naphth-2-yl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 1-Sulfo-6-(β-sulfatoethyl-sulfonyl)naphth-2-yl | red |
| 177 | 1-Sulfo-6-(β-sulfatoethyl-sulfonyl)naphth-2-yl | 8-Hydroxy-3,6-di-sulfonaphth-7-yl-1-ylamino | 3-Sulfophen-1,4-di-ylamino | 8-Hydroxy-3,6-di-sulfonaphth-7-yl-1-ylamino | 1-Sulfo-6-(β-sulfatoethyl-sulfonyl)naphth-2-yl | red |
| 178 | 1-Sulfo-6-(β-sulfatoethyl-sulfonyl)naphth-2-yl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 1-Sulfo-6-(β-sulfatoethyl-sulfonyl)naphth-2-yl | red |
| 179 | 1-Sulfo-6-(β-sulfatoethyl-sulfonyl)naphth-2-yl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 1-Sulfo-6-(β-sulfatoethyl-sulfonyl)naphth-2-yl | red |
| 180 | 1-Sulfo-6-(β-sulfatoethyl-sulfonyl)naphth-2-yl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 1-Sulfo-6-(β-sulfatoethyl-sulfonyl)naphth-2-yl | red |
| 181 | 1-Sulfo-6-(β-sulfatoethyl-sulfonyl)naphth-2-yl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 1-Sulfo-6-(β-sulfatoethyl-sulfonyl)naphth-2-yl | red |
| 182 | 1-Sulfo-6-(β-sulfatoethyl-sulfonyl)naphth-2-yl | 8-Hydroxy-3,6-di-sulfonaphth-7-yl-1-ylamino | 4-Methylphen-1,3-di-ylamino | 8-Hydroxy-3,6-di-sulfonaphth-7-yl-1-ylamino | 1-Sulfo-6-(β-sulfatoethyl-sulfonyl)naphth-2-yl | red |
| 183 | 1-Sulfo-6-(β-sulfatoethyl-sulfonyl)naphth-2-yl | 8-Hydroxy-3,6-di-sulfonaphth-7-yl-1-ylamino | 4-Methoxyphen-1,3-di-ylamino | 8-Hydroxy-3,6-di-sulfonaphth-7-yl-1-ylamino | 1-Sulfo-6-(β-sulfatoethyl-sulfonyl)naphth-2-yl | red |
| 184 | 1-Sulfo-6-(β-sulfatoethyl-sulfonyl)naphth-2-yl | 8-Hydroxy-3,6-di-sulfonaphth-7-yl-1-ylamino | 1,1-Diphencyclo-hexan-4'-ylamino-4"-ylamino | 8-Hydroxy-3,6-di-sulfonaphth-7-yl-1-ylamino | 1-Sulfo-6-(β-sulfatoethyl-sulfonyl)naphth-2-yl | red |
| 185 | 1-Sulfo-6-(β-sulfatoethyl-sulfonyl)naphth-2-yl | 8-Hydroxy-3,6-di-sulfonaphth-7-yl-1-ylamino | 1-(Phenylamino)phen-4,4'-di-ylamino | 8-Hydroxy-3,6-di-sulfonaphth-7-yl-1-ylamino | 1-Sulfo-6-(β-sulfatoethyl-sulfonyl)naphth-2-yl | red |
| 186 | 1-Sulfo-6-(β-sulfatoethyl-sulfonyl)naphth-2-yl | 8-Hydroxy-3,6-di-sulfonaphth-7-yl-1-ylamino | 3,3'-Dimethoxy-6,6'-disulfo-1,1'-diphenyhl-4,4'-di-ylamino | 8-Hydroxy-3,6-di-sulfonaphth-7-yl-1-ylamino | 1-Sulfo-6-(β-sulfatoethyl-sulfonyl)naphth-2-yl | red |
| 187 | 1-Sulfo-6-(β-sulfatoethyl-sulfonyl)naphth-2-yl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-1-ylamino | 1-Sulfo-6-(β-sulfatoethyl-sulfonyl)naphth-2-yl | red |
| 188 | 1-Sulfo-6-(β-sulfatoethyl-sulfonyl)naphth-2-yl | 8-Hydroxy-3,6-di-sulfonaphth-7-yl-1-ylamino | 4,6-Disulfophen-1,3-di-ylamino | 8-Hydroxy-3,6-di-sulfonaphth-7-yl-1-ylamino | 1-Sulfo-6-(β-sulfatoethyl-sulfonyl)naphth-2-yl | red |
| 189 | 1-Sulfo-6-(β-sulfatoethyl-sulfonyl)naphth-2-yl | 8-Hydroxy-4,6-di-sulfonaphth-7-yl-1-ylamino | Phen-1-ylamino-4-(N-methyl)amino | 8-Hydroxy-4,6-di-sulfonaphth-7-yl-1-ylamino | 1-Sulfo-6-(β-sulfatoethyl-sulfonyl)-naphth-2-yl | red (544) |
| 190 | 1-Sulfo-6-(β-sulfatoethyl-sulfonyl)naphth-2-yl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 1-Sulfo-6-(β-sulfatoethyl-sulfonyl)-naphth-2-yl | red |
| 191 | 1-Sulfo-6-(β-sulfatoethyl-sulfonyl)naphth-2-yl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 1-Sulfo-6-(β-sulfatoethyl-sulfonyl)-naphth-2-yl | red |
| 192 | 1-Sulfo-6-(β-sulfatoethyl-sulfonyl)naphth-2-yl | 8-Hydroxy-4,6-di-sulfonaphth-7-yl-1-ylamino | N-Methylbenzylamino-4'-ylamino | 8-Hydroxy-4,6-di-sulfonaphth-7-yl-1-ylamino | 1-Sulfo-6-(β-sulfatoethyl-sulfonyl)-naphth-2-yl | red |
| 193 | 1-Sulfo-6-(β-sulfatoethyl-sulfonyl)naphth-2-yl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 1-Sulfo-6-(β-sulfatoethyl-sulfonyl)-naphth-2-yl | red |

-continued

| | | | Azo dyestuff of the formula (A) | | | |
|---|---|---|---|---|---|---|
| Ex. | Radical $D^{10}$- | Radical -$K^{10}$-$N(R^{10})$- | Radical $A°$ | Radical -$N(R^{11})$-$K^{11}$- | Radical $D^{11}$- | Color shade |
| 194 | 1-Sulfo-6-(β-sulfatoethyl-sulfonyl)naphth-2-yl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 1-Sulfo-6-(β-sulfatoethyl-sulfonyl)-naphth-2-yl | red |
| 195 | 1-Sulfo-6-(β-sulfatoethyl-sulfonyl)naphth-2-yl | 8-Hydroxy-4,6-di-sulfonaphth-7-yl-1-ylamino | Phen-1,2-di-ylamino | 8-Hydroxy-4,6-di-sulfonaphth-7-yl-1-ylamino | 1-Sulfo-6-(β-sulfatoethyl-sulfonyl)-naphth-2-yl | red |
| 196 | 1-Sulfo-6-(β-sulfatoethyl-sulfonyl)naphth-2-yl | 8-Hydroxy-4,6-di-sulfonaphth-7-yl-1-ylamino | 4-Methylphen-1,3-di-ylamino | 8-Hydroxy-4,6-di-sulfonaphth-7-yl-1-ylamino | 1-Sulfo-6-(β-sulfatoethyl-sulfonyl)-naphth-2-yl | red |
| 197 | 1-Sulfo-6-(β-sulfatoethyl-sulfonyl)naphth-2-yl | 8-Hydroxy-4,6-di-sulfonaphth-7-yl-1-ylamino | 4-Methoxyphen-1,3-di-ylamino | 8-Hydroxy-4,6-di-sulfonaphth-7-yl-1-ylamino | 1-Sulfo-6-(β-sulfatoethyl-sulfonyl)-naphth-2-yl | red |
| 198 | 1-Sulfo-6-(β-sulfatoethyl-sulfonyl)naphth-2-yl | 8-Hydroxy-4,6-di-sulfonaphth-7-yl-1-ylamino | 1,1-Diphencyclo-hexan-4'-ylamino-4"-ylamino | 8-Hydroxy-4,6-di-sulfonaphth-7-yl-1-ylamino | 1-Sulfo-6-(β-sulfatoethyl-sulfonyl)-naphth-2-yl | red |
| 199 | 1-Sulfo-6-(β-sulfatoethyl-sulfonyl)naphth-2-yl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 1-Sulfo-6-(β-sulfatoethyl-sulfonyl)-naphth-2-yl | red |
| 200 | 1-Sulfo-6-(β-sulfatoethyl-sulfonyl)naphth-2-yl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 1-Sulfo-6-(β-sulfatoethyl-sulfonyl)-naphth-2-yl | red |
| 201 | 1-Sulfo-6-(β-sulfatoethyl-sulfonyl)naphth-2-yl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 1-Sulfo-6-(β-sulfatoethyl-sulfonyl)-naphth-2-yl | red |
| 202 | 1-Sulfo-6-(β-sulfatoethyl-sulfonyl)naphth-2-yl | 8-Hydroxy-4,6-di-sulfonaphth-7-yl-1-ylamino | 4,6-Disulfophen-1,3-ylamino | 8-Hydroxy-4,6-di-sulfonaphth-7-yl-1-ylamino | 1-Sulfo-6-(β-sulfatoethyl-sulfonyl)-naphth-2-yl | red |
| 203 | 8-(β-Sulfatoethyl-sulfonyl)naphth-2-yl | 8-Hydroxy-3,6-di-sulfonaphth-7-yl-1-ylamino | Phen-1-ylamino-4-(N-methyl)amino | 8-Hydroxy-3,6-di-sulfonaphth-7-yl-1-ylamino | 8-(β-Sulfatoethyl-sulfonyl)-naphth-2-yl | red (522) |
| 204 | 8-(β-Sulfatoethyl-sulfonyl)naphth-2-yl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 8-(β-Sulfatoethyl-sulfonyl)-naphth-2-yl | red |
| 205 | 8-(β-Sulfatoethyl-sulfonyl)naphth-2-yl | 8-Hydroxy-3,6-di-sulfonaphth-7-yl-1-ylamino | 3-Sulfophen-1,4-di-ylamino | 8-Hydroxy-3,6-di-sulfonaphth-7-yl-1-ylamino | 8-(β-Sulfatoethyl-sulfonyl)-naphth-2-yl | red |
| 206 | 8-(β-Sulfatoethyl-sulfonyl)naphth-2-yl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 8-(β-Sulfatoethyl-sulfonyl)-naphth-2-yl | red |
| 207 | 8-(β-Sulfatoethyl-sulfonyl)naphth-2-yl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 8-(β-Sulfatoethyl-sulfonyl)-naphth-2-yl | red |
| 208 | 8-(β-Sulfatoethyl-sulfonyl)naphth-2-yl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 8-(β-Sulfatoethyl-sulfonyl)-naphth-2-yl | red |
| 209 | 8-(β-Sulfatoethyl-sulfonyl)naphth-2-yl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 8-(β-Sulfatoethyl-sulfonyl)-naphth-2-yl | red |
| 210 | 8-(β-Sulfatoethyl-sulfonyl)naphth-2-yl | 8-Hydroxy-3,6-di-sulfonaphth-7-yl-1-ylamino | 4-Methylphen-1,3-di-ylamino | 8-Hydroxy-3,6-di-sulfonaphth-7-yl-1-ylamino | 8-(β-Sulfatoethyl-sulfonyl)-naphth-2-yl | red |
| 211 | 8-(β-Sulfatoethyl-sulfonyl)naphth-2-yl | 8-Hydroxy-3,6-di-sulfonaphth-7-yl-1-ylamino | 4-Methoxyphen-1,3-di-ylamino | 8-Hydroxy-3,6-di-sulfonaphth-7-yl-1-ylamino | 8-(β-Sulfatoethyl-sulfonyl)-naphth-2-yl | red |
| 212 | 8-(β-Sulfatoethyl-sulfonyl)naphth-2-yl | 8-Hydroxy-3,6-di-sulfonaphth-7-yl-1-ylamino | 1,1-Di-phen-cyclo-hexan-4'-ylamino-4"-ylamino | 8-Hydroxy-3,6-di-sulfonaphth-7-yl-1-ylamino | 8-(β-Sulfatoethyl-sulfonyl)-naphth-2-yl | red |
| 213 | 8-(β-Sulfatoethyl-sulfonyl)naphth-2-yl | 8-Hydroxy-3,6-di-sulfonaphth-7-yl-1-ylamino | 1-(Phenylamino)phen-4,4'-di-ylamino | 8-Hydroxy-3,6-di-sulfonaphth-7-yl-1-ylamino | 8-(β-Sulfatoethyl-sulfonyl)-naphth-2-yl | red |
| 214 | 8-(β-Sulfatoethyl-sulfonyl)naphth-2-yl | 8-Hydroxy-3,6-di-sulfonaphth-7-yl-1-ylamino | 3,3'-Dimethoxy-6,6'-disulfo-1,1'-diphenyl-4,4'-di-ylamino | 8-Hydroxy-3,6-di-sulfonaphth-7-yl-1-ylamino | 8-(β-Sulfatoethyl-sulfonyl)-naphth-2-yl | red |
| 215 | 8-(β-Sulfatoethyl-sulfonyl)naphth-2-yl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-1-ylamino | 8-(β-Sulfatoethyl-sulfonyl)naphth-2-yl | red |
| 216 | 8-(β-Sulfatoethyl-sulfonyl)-naphth- | 8-Hydroxy-3,6-di-sulfonaphth-7-yl-1-ylamino | 3,6-Disulfo-phen-1,3-di-ylamino | 8-Hydroxy-3,6-di-sulfonaphth-7-yl-1- | 8-(β-Sulfatoethyl-sulfonyl)-naphth- | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | | | | ylamino | 2-yl | |
| 217 | 8-(β-Sulfatoethyl-sulfonyl)-naphth-2-yl | 8-Hydroxy-4,6-di-sulfonaphth-7-yl-1-ylamino | Phen-1-ylamino-4-(N-methyl)-amino | 8-Hydroxy-4,6-di-sulfonaphth-7-yl-1-ylamino | 8-(β-Sulfatoethyl-sulfonyl)-naphth-2-yl | red (530) |
| 218 | 8-(β-Sulfatoethyl-sulfonyl)-naphth-2-yl | 8-Hydroxy-4,6-di-sulfonaphth-7-yl-1-ylamino | 4-Sulfo-phen-1,3-di-ylamino | 8-Hydroxy-4,6-di-sulfonaphth-7-yl-1-ylamino | 8-(β-Sulfatoethyl-sulfonyl)-naphth-2-yl | red |
| 219 | 8-(β-Sulfatoethyl-sulfonyl)-naphth-2-yl | 8-Hydroxy-4,6-di-sulfonaphth-7-yl-1-ylamino | 3-Sulfo-phen-1,4-di-ylamino | 8-Hydroxy-4,6-di-sulfonaphth-7-yl-1-ylamino | 8-(β-Sulfatoethyl-sulfonyl)-naphth-2-yl | red |
| 220 | 8-(β-Sulfatoethyl-sulfonyl)-naphth-2-yl | 8-Hydroxy-4,6-di-sulfonaphth-7-yl-1-ylamino | N-Methyl-benzyl-amino-4'-ylamino | 8-Hydroxy-4,6-di-sulfonaphth-7-yl-1-ylamino | 8-(β-Sulfatoethyl-sulfonyl)-naphth-2-yl | red |
| 221 | 8-(β-Sulfatoethyl-sulfonyl)-naphth-2-yl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 8-(β-Sulfatoethyl-sulfonyl)-naphth-2-yl | red |
| 222 | 8-(β-Sulfatoethyl-sulfonyl)-naphth-2-yl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 8-(β-Sulfatoethyl-sulfonyl)-naphth-2-yl | red |
| 223 | 8-(β-Sulfatoethyl-sulfonyl)-naphth-2-yl | 8-Hydroxy-4,6-di-sulfonaphth-7-yl-1-ylamino | Phen-1,2-di-ylamino | 8-Hydroxy-4,6-di-sulfonaphth-7-yl-1-ylamino | 8-(β-Sulfatoethyl-sulfonyl)-naphth-2-yl | red |
| 224 | 8-(β-Sulfatoethyl-sulfonyl)-naphth-2-yl | 8-Hydroxy-4,6-di-sulfonaphth-7-yl-1-ylamino | 4-Methyl-phen-1,3-di-ylamino | 8-Hydroxy-4,6-di-sulfonaphth-7-yl-1-ylamino | 8-(β-Sulfatoethyl-sulfonyl)-naphth-2-yl | red |
| 225 | 8-(β-Sulfatoethyl-sulfonyl)-naphth-2-yl | 8-Hydroxy-4,6-di-sulfonaphth-7-yl-1-ylamino | 4-Methoxy-phen-1,3-di-ylamino | 8-Hydroxy-4,6-di-sulfonaphth-7-yl-1-ylamino | 8-(β-Sulfatoethyl-sulfonyl)-naphth-2-yl | red |
| 226 | 8-(β-Sulfatoethyl-sulfonyl)-naphth-2-yl | 8-Hydroxy-4,6-di-sulfonaphth-7-yl-1-ylamino | 1,1-Di-phen-cyclo-hexan-4'-ylamino-4"-ylamino | 8-Hydroxy-4,6-di-sulfonaphth-7-yl-1-ylamino | 8-(β-Sulfatoethyl-sulfonyl)-naphth-2-yl | red |
| 227 | 8-(β-Sulfatoethyl-sulfonyl)-naphth-2-yl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 8-(β-Sulfatoethyl-sulfonyl)-naphth-2-yl | red |
| 228 | 8-(β-Sulfatoethyl-sulfonyl)-naphth-2-yl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 8-(β-Sulfatoethyl-sulfonyl)-naphth-2-yl | red |
| 229 | 8-(β-Sulfatoethyl-sulfonyl)-naphth-2-yl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 8-(β-Sulfatoethyl-sulfonyl)-naphth-2-yl | red |
| 230 | 8-(β-Sulfatoethyl-sulfonyl)-naphth-2-yl | 8-Hydroxy-4,6-di-sulfonaphth-7-yl-1-ylamino | 4,6-Disulfophen-1,3-di-ylamino | 8-Hydroxy-4,6-di-sulfonaphth-7-yl-1-ylamino | 8-(β-Sulfatoethyl-sulfonyl)-naphth-2-yl | red |
| 231 | 6-(β-Sulfatoethyl-sulfonyl)-naphth-2-yl | 8-Hydroxy-3,6-di-sulfonaphth-7-yl-1-ylamino | Phen-1-ylamino-4-(N-methyl)amino | 8-Hydroxy-3,6-di-sulfonaphth-7-yl-1-ylamino | 6-(β-Sulfatoethyl-sulfonyl)-naphth-2-yl | red (545) |
| 232 | 6-(β-Sulfatoethyl-sulfonyl)-naphth-2-yl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 6-(β-Sulfatoethyl-sulfonyl)-naphth-2-yl | red |
| 233 | 6-(β-Sulfatoethyl-sulfonyl)-naphth-2-yl | 8-Hydroxy-3,6-di-sulfonaphth-7-yl-1-ylamino | 3-Sulfophen-1,4-di-ylamino | 8-Hydroxy-3,6-di-sulfonaphth-7-yl-1-ylamino | 6-(β-Sulfatoethyl-sulfonyl)-naphth-2-yl | red |
| 234 | 6-(β-Sulfatoethyl-sulfonyl)-naphth-2-yl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 6-(β-Sulfatoethyl-sulfonyl)-naphth-2-yl | red |
| 235 | 6-(β-Sulfatoethyl-sulfonyl)-naphth-2-yl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 6-(β-Sulfatoethyl-sulfonyl)-naphth-2-yl | red |
| 236 | 6-(β-Sulfatoethyl-sulfonyl)-naphth-2-yl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 6-(β-Sulfatoethyl-sulfonyl)-naphth-2-yl | red |
| 237 | 6-(β-Sulfatoethyl-sulfonyl)-naphth-2-yl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 6-(β-Sulfatoethyl-sulfonyl)-naphth-2-yl | red |
| 238 | 6-(β-Sulfatoethyl-sulfonyl)-naphth-2-yl | 8-Hydroxy-3,6-di-sulfonaphth-7-yl-1-ylamino | 4-Methyl-phen-1,3-di-ylamino | 8-Hydroxy-3,6-di-sulfonaphth-7-yl-1-ylamino | 6-(β-Sulfatoethyl-sulfonyl)-naphth-2-yl | red |
| 239 | 6-(β-Sulfatoethyl-sulfonyl)-naphth-2-yl | 8-Hydroxy-3,6-di-sulfonaphth-7-yl-1-ylamino | 4-Methoxy-phen-1,3-di-ylamino | 8-Hydroxy-3,6-di-sulfonaphth-7-yl-1-ylamino | 6-(β-Sulfatoethyl-sulfonyl)-naphth-2-yl | red |
| 240 | 6-(β-Sulfatoethyl-sulfonyl)-naphth-2-yl | 8-Hydroxy-3,6-di-sulfonaphth-7-yl-1-ylamino | 1,1-Di-phen-cyclo-hexan-4'-ylamino-4"-ylamino | 8-Hydroxy-3,6-di-sulfonaphth-7-yl-1-ylamino | 6-(β-Sulfatoethyl-sulfonyl)-naphth-2-yl | red |
| 241 | 6-(β-Sulfatoethyl-sulfonyl)-naphth-2-yl | 8-Hydroxy-3,6-di-sulfonaphth-7-yl-1-ylamino | 1-(Phenylamino)phen-4,4'-di-ylamino | 8-Hydroxy-3,6-di-sulfonaphth-7-yl-1-ylamino | 6-(β-Sulfatoethyl-sulfonyl)-naphth-2-yl | red |
| 242 | 6-(β-Sulfatoethyl- | 8-Hydroxy-3,6-di- | 3,3'-Dimethoxy-6,6'- | 8-Hydroxy-3,6-di- | 6-(β-Sulfatoethyl- | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
|  | sulfonyl)-naphth-2-yl | sulfonaphth-7-yl-1-ylamino | disulfo-1,1'-diphenyl-4,4'-di-ylamino | sulfonaphth-7-yl-1-ylamino | sulfonyl)-naphth-2-yl |  |
| 243 | 6-(β-Sulfatoethyl-sulfonyl)-naphth-2-yl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-1-ylamino | 6-(β-Sulfatoethyl-sulfonyl)-naphth-2-yl | red |
| 244 | 6-(β-Sulfatoethyl-sulfonyl)-naphth-2-yl | 8-Hydroxy-3,6-di-sulfonaphth-7-yl-1-ylamino | 4,6-Disulfo-phen-1,3-di-ylamino | 8-Hydroxy-3,6-di-sulfonaphth-7-yl-1-ylamino | 6-(β-Sulfatoethyl-sulfonyl)-naphth-2-yl | red |
| 245 | 6-(β-Sulfatoethyl-sulfonyl)-naphth-2-yl | 8-Hydroxy-4,6-di-sulfonaphth-7-yl-1-ylamino | Phen-1-ylamino-4-(N-methyl)-ylamino | 8-Hydroxy-4,6-di-sulfonaphth-7-yl-1-ylamino | 6-(β-Sulfatoethyl-sulfonyl)-naphth-2-yl | red (525) |
| 246 | 6-(β-Sulfatoethyl-sulfonyl)-naphth-2-yl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 6-(β-Sulfatoethyl-sulfonyl)-naphth-2-yl | red |
| 247 | 6-(β-Sulfatoethyl-sulfonyl)-naphth-2-yl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 6-(β-Sulfatoethyl-sulfonyl)-naphth-2-yl | red |
| 248 | 6-(β-Sulfatoethyl-sulfonyl)-naphth-2-yl | 8-Hydroxy-4,6-di-sulfonaphth-7-yl-1-ylamino | N-Methylbenzylamino-4'-ylamino | 8-Hydroxy-4,6-di-sulfonaphth-7-yl-1-ylamino | 6-(β-Sulfatoethyl-sulfonyl)-naphth-2-yl | red |
| 249 | 6-(β-Sulfatoethyl-sulfonyl)-naphth-2-yl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 6-(β-Sulfatoethyl-sulfonyl)-naphth-2-yl | red |
| 250 | 6-(β-Sulfatoethyl-sulfonyl)-naphth-2-yl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 6-(β-Sulfatoethyl-sulfonyl)-naphth-2-yl | red |
| 251 | 6-(β-Sulfatoethyl-sulfonyl)-naphth-2-yl | 8-Hydroxy-4,6-di-sulfonaphth-7-yl-1-ylamino | Phen-1,2-di-ylamino | 8-Hydroxy-4,6-di-sulfonaphth-7-yl-1-ylamino | 6-(β-Sulfatoethyl-sulfonyl)-naphth-2-yl | red |
| 252 | 6-(β-Sulfatoethyl-sulfonyl)-naphth-2-yl | 8-Hydroxy-4,6-di-sulfonaphth-7-yl-1-ylamino | 4-Methyl-phen-1,3-di-ylamino | 8-Hydroxy-4,6-di-sulfonaphth-7-yl-1-ylamino | 6-(β-Sulfatoethyl-sulfonyl)-naphth-2-yl | red |
| 253 | 6-(β-Sulfatoethyl-sulfonyl)-naphth-2-yl | 8-Hydroxy-4,6-di-sulfonaphth-7-yl-1-ylamino | 4-Methoxy-phen-1,3-di-ylamino | 8-Hydroxy-4,6-di-sulfonaphth-7-yl-1-ylamino | 6-(β-Sulfatoethyl-sulfonyl)-naphth-2-yl | red |
| 254 | 6-(β-Sulfatoethyl-sulfonyl)-naphth-2-yl | 8-Hydroxy-4,6-di-sulfonaphth-7-yl-1-ylamino | 1,1-Di-phen-cyclo-hexan-4'-ylamino-4''-ylamino | 8-Hydroxy-4,6-di-sulfonaphth-7-yl-1-ylamino | 6-(β-Sulfatoethyl-sulfonyl)-naphth-2-yl | red |
| 255 | 6-(β-Sulfatoethyl-sulfonyl)-naphth-2-yl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 6-(β-Sulfatoethyl-sulfonyl)-naphth-2-yl | red |
| 256 | 6-(β-Sulfatoethyl-sulfonyl)-naphth-2-yl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 6-(β-Sulfatoethyl-sulfonyl)-naphth-2-yl | red |
| 257 | 6-(β-Sulfatoethyl-sulfonyl)-naphth-2-yl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 6-(β-Sulfatoethyl-sulfonyl)-naphth-2-yl | red |
| 258 | 6-(β-Sulfatoethyl-sulfonyl)-naphth-2-yl | 8-Hydroxy-4,6-di-sulfonaphth-7-yl-1-ylamino | 4,6-Disulfo-phen-1,3-di-ylamino | 8-Hydroxy-4,6-di-sulfonaphth-7-yl-1-ylamino | 6-(β-Sulfatoethyl-sulfonyl)-naphth-2-yl | red |
| 259 | 6-Sulfo-8-(β-sulfatoethyl-sulfonyl)-naphth-2-yl | 8-Hydroxy-4,6-di-sulfonaphth-7-yl-1-ylamino | Phen-1-ylamino-4-(N-methyl)-ylamino | 8-Hydroxy-4,6-di-sulfonaphth-7-yl-1-ylamino | 6-Sulfo-8-(β-sulfatoethyl-sulfonyl)-naphth-2-yl | red (546) |
| 260 | 6-Sulfo-8-(β-sulfatoethyl-sulfonyl)-naphth-2-yl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 6-Sulfo-8-(β-sulfatoethyl-sulfonyl)-naphth-2-yl | red |
| 261 | 6-Sulfo-8-(β-sulfatoethyl-sulfonyl)-naphth-2-yl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 6-Sulfo-8-(β-sulfatoethyl-sulfonyl)-naphth-2-yl | red |
| 262 | 6-Sulfo-8-(β-sulfatoethyl-sulfonyl)-naphth-2-yl | 8-Hydroxy-4,6-di-sulfonaphth-7-yl-1-ylamino | N-Methylbenzylamino-4'-ylamino | 8-Hydroxy-4,6-di-sulfonaphth-7-yl-1-ylamino | 6-Sulfo-8-(β-sulfatoethyl-sulfonyl)-naphth-2-yl | red |
| 263 | 6-Sulfo-8-(β-sulfatoethyl-sulfonyl)-naphth-2-yl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 6-Sulfo-8-(β-sulfatoethyl-sulfonyl)-naphth-2-yl | red |
| 264 | 6-Sulfo-8-(β-sulfatoethyl-sulfonyl)-naphth-2-yl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 6-Sulfo-8-(β-sulfatoethyl-sulfonyl)-naphth-2-yl | red |
| 265 | 6-Sulfo-8-(β-sulfatoethyl-sulfonyl)-naphth- | 8-Hydroxy-4,6-di-sulfonaphth-7-yl-1-ylamino | Phen-1,2-di-ylamino | 8-Hydroxy-4,6-di-sulfonaphth-7-yl-1-ylamino | 6-Sulfo-8-(β-sulfatoethyl-sulfonyl)-naphth- | red |

-continued

| Ex. | Radical D$^{10}$- | Radical -K$^{10}$-N(R$^{10}$)- | Azo dyestuff of the formula (A)<br>Radical A° | Radical -N(R$^{11}$)-K$^{11}$- | Radical D$^{11}$- | Color shade |
|---|---|---|---|---|---|---|
| 266 | 6-Sulfo-8-(β-sulfatoethyl-sulfonyl)-naphth-2-yl | 8-Hydroxy-4,6-di-sulfonaphth-7-yl-1-ylamino | 4-Methyl-phen-1,3-di-ylamino | 8-Hydroxy-4,6-di-sulfonaphth-7-yl-1-ylamino | 6-Sulfo-8-(β-sulfatoethyl-sulfonyl)-naphth-2-yl | red |
| 267 | 6-Sulfo-8-(β-sulfatoethyl-sulfonyl)-naphth-2-yl | 8-Hydroxy-4,6-di-sulfonaphth-7-yl-1-ylamino | 4-Methoxy-phen-1,3-di-ylamino | 8-Hydroxy-4,6-di-sulfonaphth-7-yl-1-ylamino | 6-Sulfo-8-(β-sulfatoethyl-sulfonyl)-naphth-2-yl | red |
| 268 | 6-Sulfo-8-(β-sulfatoethyl-sulfonyl)-naphth-2-yl | 8-Hydroxy-4,6-di-sulfonaphth-7-yl-1-ylamino | 1,1-Di-phen-cyclo-hexan-4'-ylamino-4''-ylamino | 8-Hydroxy-4,6-di-sulfonaphth-7-yl-1-ylamino | 6-Sulfo-8-(β-sulfatoethyl-sulfonyl)-naphth-2-yl | red |
| 269 | 6-Sulfo-8-(β-sulfatoethyl-sulfonyl)-naphth-2-yl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 6-Sulfo-8-(β-sulfatoethyl-sulfonyl)-naphth-2-yl | red |
| 270 | 6-Sulfo-8-(β-sulfatoethyl-sulfonyl)-naphth-2-yl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 6-Sulfo-8-(β-sulfatoethyl-sulfonyl)-naphth-2-yl | red |
| 271 | 6-Sulfo-8-(β-sulfatoethyl-sulfonyl)-naphth-2-yl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 6-Sulfo-8-(β-sulfatoethyl-sulfonyl)-naphth-2-yl | red |
| 272 | 6-Sulfo-8-(β-sulfatoethyl-sulfonyl)-naphth-2-yl | 8-Hydroxy-4,6-di-sulfonaphth-7-yl-1-ylamino | 4,6-Disulfo-phen-1,3-di-ylamino | 8-Hydroxy-4,6-di-sulfonaphth-7-yl-1-ylamino | 6-Sulfo-8-(β-sulfatoethyl-sulfonyl)-naphth-2-yl | red |
| 273 | 6-Sulfo-8-(β-sulfatoethyl-sulfonyl)-naphth-2-yl | 8-Hydroxy-3,6-di-sulfonaphth-7-yl-1-ylamino | Phen-1-ylamino-4-(N-methyl)-ylamino | 8-Hydroxy-3,6-di-sulfonaphth-7-yl-1-ylamino | 6-Sulfo-8-(β-sulfatoethyl-sulfonyl)-naphth-2-yl | red (553) |
| 274 | 6-Sulfo-8-(β-sulfatoethyl-sulfonyl)-naphth-2-yl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 6-Sulfo-8-(β-sulfatoethyl-sulfonyl)-naphth-2-yl | red |
| 275 | 6-Sulfo-8-(β-sulfatoethyl-sulfonyl)-naphth-2-yl | 8-Hydroxy-3,6-di-sulfonaphth-7-yl-1-ylamino | 3-Sulfophen-1,4-di-ylamino | 8-Hydroxy-3,6-di-sulfonaphth-7-yl-1-ylamino | 6-Sulfo-8-(β-sulfatoethyl-sulfonyl)-naphth-2-yl | red |
| 276 | 6-Sulfo-8-(β-sulfatoethyl-sulfonyl)-naphth-2-yl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 6-Sulfo-8-(β-sulfatoethyl-sulfonyl)-naphth-2-yl | red |
| 277 | 6-Sulfo-8-(β-sulfatoethyl-sulfonyl)-naphth-2-yl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 6-Sulfo-8-(β-sulfatoethyl-sulfonyl)-naphth-2-yl | red |
| 278 | 6-Sulfo-8-(β-sulfatoethyl-sulfonyl)-naphth-2-yl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 6-Sulfo-8-(β-sulfatoethyl-sulfonyl)-naphth-2-yl | red |
| 279 | 6-Sulfo-8-(β-sulfatoethyl-sulfonyl)-naphth-2-yl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 6-Sulfo-8-(β-sulfatoethyl-sulfonyl)-naphth-2-yl | red |
| 280 | 6-Sulfo-8-(β-sulfatoethyl-sulfonyl)-naphth-2-yl | 8-Hydroxy-3,6-di-sulfonaphth-7-yl-1-ylamino | 4-Methyl-phen-1,3-di-ylamino | 8-Hydroxy-3,6-di-sulfonaphth-7-yl-1-ylamino | 6-Sulfo-8-(β-sulfatoethyl-sulfonyl)-naphth-2-yl | red |
| 281 | 6-Sulfo-8-(β-sulfatoethyl-sulfonyl)-naphth-2-yl | 8-Hydroxy-3,6-di-sulfonaphth-7-yl-1-ylamino | 4-Methoxy-phen-1,3-di-ylamino | 8-Hydroxy-3,6-di-sulfonaphth-7-yl-1-ylamino | 6-Sulfo-8-(β-sulfatoethyl-sulfonyl)-naphth-2-yl | red |
| 282 | 6-Sulfo-8-(β-sulfatoethyl-sulfonyl)-naphth-2-yl | 8-Hydroxy-3,6-di-sulfonaphth-7-yl-1-ylamino | 1,1-Di-phen-cyclo-hexan-4'-ylamino-4''-ylamino | 8-Hydroxy-3,6-di-sulfonaphth-7-yl-1-ylamino | 6-Sulfo-8-(β-sulfatoethyl-sulfonyl)-naphth-2-yl | red |
| 283 | 6-Sulfo-8-(β-sulfatoethyl-sulfonyl)-naphth-2-yl | 8-Hydroxy-3,6-di-sulfonaphth-7-yl-1-ylamino | 1-(Phenylamino)phen-4,4'-di-ylamino | 8-Hydroxy-3,6-di-sulfonaphth-7-yl-1-ylamino | 6-Sulfo-8-(β-sulfatoethyl-sulfonyl)-naphth-2-yl | red |
| 284 | 6-Sulfo-8-(β-sulfatoethyl-sulfonyl)-naphth-2-yl | 8-Hydroxy-3,6-di-sulfonaphth-7-yl-1-ylamino | 3,3'-Dimethoxy-6,6'-disulfo-1,1'-diphenyl-4,4'-di-ylamino | 8-Hydroxy-3,6-di-sulfonaphth-7-yl-1-ylamino | 6-Sulfo-8-(β-sulfatoethyl-sulfonyl)-naphth-2-yl | red |

-continued

| | | | Azo dyestuff of the formula (A) | | | |
|---|---|---|---|---|---|---|
| Ex. | Radical D$^{10}$- | Radical -K$^{10}$-N(R$^{10}$)- | Radical A° | Radical -N(R$^{11}$)-K$^{11}$- | Radical D$^{11}$- | Color shade |
| 285 | 6-Sulfo-8-(β-sulfatoethyl-sulfonyl)-naphth-2-yl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-1-ylamino | 6-Sulfo-8-(β-sulfatoethyl-sulfonyl)-naphth-2-yl | red |
| 286 | 6-Sulfo-8-(β-sulfatoethyl-sulfonyl)-naphth-2-yl | 8-Hydroxy-3,6-di-sulfonaphth-7-yl-1-ylamino | 3,6-Disulfo-phen-1,3-di-ylamino | 8-Hydroxy-3,6-di-sulfonaphth-7-yl-1-ylamino | 6-Sulfo-8-(β-sulfatoethyl-sulfonyl)-naphth-2-yl | red |
| 287 | 1-Sulfo-5-(β-sulfatoethyl-sulfonyl)-naphth-2-yl | 8-Hydroxy-3,6-di-sulfonaphth-7-yl-1-ylamino | Phen-1-ylamino-4-(N-methyl)-ylamino | 8-Hydroxy-3,6-di-sulfonaphth-7-yl-1-ylamino | 1-Sulfo-5-(β-sulfatoethyl-sulfonyl)-naphth-2-yl | red (515) |
| 288 | 1-Sulfo-5-(β-sulfatoethyl-sulfonyl)-naphth-2-yl | 8-Hydroxy-3,6-di-sulfonaphth-7-yl-1-ylamino | 4-Sulfophen-1,3-di-ylamino | 8-Hydroxy-3,6-di-sulfonaphth-7-yl-1-ylamino | 1-Sulfo-5-(β-sulfatoethyl-sulfonyl)-naphth-2-yl | red |
| 289 | 1-Sulfo-5-(β-sulfatoethyl-sulfonyl)-naphth-2-yl | 8-Hydroxy-3,6-di-sulfonaphth-7-yl-1-ylamino | 3-Sulfophen-1,4-di-ylamino | 8-Hydroxy-3,6-di-sulfonaphth-7-yl-1-ylamino | 1-Sulfo-5-(β-sulfatoethyl-sulfonyl)-naphth-2-yl | red |
| 290 | 1-Sulfo-5-(β-sulfatoethyl-sulfonyl)-naphth-2-yl | 8-Hydroxy-3,6-di-sulfonaphth-7-yl-1-ylamino | N-Methylbenzylamino-4'-ylamino | 8-Hydroxy-3,6-di-sulfonaphth-7-yl-1-ylamino | 1-Sulfo-5-(β-sulfatoethyl-sulfonyl)-naphth-2-yl | red |
| 291 | 1-Sulfo-5-(β-sulfatoethyl-sulfonyl)-naphth-2-yl | 8-Hydroxy-3,6-di-sulfonaphth-7-yl-1-ylamino | Phen-1,4-di-ylamino | 8-Hydroxy-3,6-di-sulfonaphth-7-yl-1-ylamino | 1-Sulfo-5-(β-sulfatoethyl-sulfonyl)-naphth-2-yl | red |
| 292 | 1-Sulfo-5-(β-sulfatoethyl-sulfonyl)-naphth-2-yl | 8-Hydroxy-3,6-di-sulfonaphth-7-yl-1-ylamino | Phen-1,3-di-ylamino | 8-Hydroxy-3,6-di-sulfonaphth-7-yl-1-ylamino | 1-Sulfo-5-(β-sulfatoethyl-sulfonyl)-naphth-2-yl | red |
| 293 | 1-Sulfo-5-(β-sulfatoethyl-sulfonyl)-naphth-2-yl | 8-Hydroxy-3,6-di-sulfonaphth-7-yl-1-ylamino | Phen-1,2-di-ylamino | 8-Hydroxy-3,6-di-sulfonaphth-7-yl-1-ylamino | 1-Sulfo-5-(β-sulfatoethyl-sulfonyl)-naphth-2-yl | red |
| 294 | 1-Sulfo-5-(β-sulfatoethyl-sulfonyl)-naphth-2-yl | 8-Hydroxy-3,6-di-sulfonaphth-7-yl-1-ylamino | 4-Methyl-phen-1,3-di-ylamino | 8-Hydroxy-3,6-di-sulfonaphth-7-yl-1-ylamino | 1-Sulfo-5-(β-sulfatoethyl-sulfonyl)-naphth-2-yl | red |
| 295 | 1-Sulfo-5-(β-sulfatoethyl-sulfonyl)-naphth-2-yl | 8-Hydroxy-3,6-di-sulfonaphth-7-yl-1-ylamino | 4-Methoxy-phen-1,3-di-ylamino | 8-Hydroxy-3,6-di-sulfonaphth-7-yl-1-ylamino | 1-Sulfo-5-(β-sulfatoethyl-sulfonyl)-naphth-2-yl | red |
| 296 | 1-Sulfo-5-(β-sulfatoethyl-sulfonyl)-naphth-2-yl | 8-Hydroxy-3,6-di-sulfonaphth-7-yl-1-ylamino | 1,1-Di-phen-cyclo-hexan-4'-ylamino-4"-ylamino | 8-Hydroxy-3,6-di-sulfonaphth-7-yl-1-ylamino | 1-Sulfo-5-(β-sulfatoethyl-sulfonyl)-naphth-2-yl | red |
| 297 | 1-Sulfo-5-(β-sulfatoethyl-sulfonyl)-naphth-2-yl | 8-Hydroxy-3,6-di-sulfonaphth-7-yl-1-ylamino | 1-(Phenylamino)phen-4,4'-di-ylamino | 8-Hydroxy-3,6-di-sulfonaphth-7-yl-1-ylamino | 1-Sulfo-5-(β-sulfatoethyl-sulfonyl)-naphth-2-yl | red |
| 298 | 1-Sulfo-5-(β-sulfatoethyl-sulfonyl)-naphth-2-yl | 8-Hydroxy-3,6-di-sulfonaphth-7-yl-1-ylamino | 3,3'-Dimethoxy-6,6'-disulfo-1,1'-diphenyl-4,4'-di-ylamino | 8-Hydroxy-3,6-di-sulfonaphth-7-yl-1-ylamino | 1-Sulfo-5-(β-sulfatoethyl-sulfonyl)-naphth-2-yl | red |
| 299 | 1-Sulfo-5-(β-sulfatoethyl-sulfonyl)-naphth-2-yl | 8-Hydroxy-3,6-di-sulfonaphth-7-yl-1-ylamino | 3,3'-Dimethyl-6,6'-disulfo-1,1'-diphenyl-4,4'-di-ylamino | 8-Hydroxy-3,6-di-sulfonaphth-7-yl-1-ylamino | 1-Sulfo-5-(β-sulfatoethyl-sulfonyl)-naphth-2-yl | red |
| 300 | 1-Sulfo-5-(β-sulfatoethyl-sulfonyl)-naphth-2-yl | 8-Hydroxy-3,6-di-sulfonaphth-7-yl-1-ylamino | 3,6-Disulfo-phen-1,3-di-ylamino | 8-Hydroxy-3,6-di-sulfonaphth-7-yl-1-ylamino | 1-Sulfo-5-(β-sulfatoethyl-sulfonyl)-naphth-2-yl | red |
| 301 | 1-Sulfo-5-(β-sulfatoethyl-sulfonyl)-naphth-2-yl | 8-Hydroxy-4,6-di-sulfonaphth-7-yl-1-ylamino | Phen-1-ylamino-4-(N-methyl)-ylamino | 8-Hydroxy-4,6-di-sulfonaphth-7-yl-1-ylamino | 1-Sulfo-5-(β-sulfatoethyl-sulfonyl)-naphth-2-yl | red (509) |
| 302 | 1-Sulfo-5-(β-sulfatoethyl-sulfonyl)-naphth-2-yl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 1-Sulfo-5-(β-sulfatoethyl-sulfonyl)-naphth-2-yl | red |
| 303 | 1-Sulfo-5-(β-sulfatoethyl-sulfonyl)-naphth-2-yl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 1-Sulfo-5-(β-sulfatoethyl-sulfonyl)-naphth-2-yl | red |
| 304 | 1-Sulfo-5-(β- | 8-Hydroxy-4,6-di- | N-Methylbenzylamino- | 8-Hydroxy-4,6-di- | 1-Sulfo-5-(β- | red |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| | sulfatoethyl-sulfonyl)-naphth-2-yl | sulfonaphth-7-yl-1-ylamino | 4'-ylamino | sulfonaphth-7-yl-1-ylamino | sulfatoethyl-sulfonyl)-naphth-2-yl | |
| 305 | 1-Sulfo-5-(β-sulfatoethyl-sulfonyl)-naphth-2-yl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 1-Sulfo-5-(β-sulfatoethyl-sulfonyl)-naphth-2-yl | red |
| 306 | 1-Sulfo-5-(β-sulfatoethyl-sulfonyl)-naphth-2-yl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 1-Sulfo-5-(β-sulfatoethyl-sulfonyl)-naphth-2-yl | red |
| 307 | 1-Sulfo-5-(β-sulfatoethyl-sulfonyl)-naphth-2-yl | 8-Hydroxy-4,6-di-sulfonaphth-7-yl-1-ylamino | Phen-1,2-di-ylamino | 8-Hydroxy-4,6-di-sulfonaphth-7-yl-1-ylamino | 1-Sulfo-5-(β-sulfatoethyl-sulfonyl)-naphth-2-yl | red |
| 308 | 1-Sulfo-5-(β-sulfatoethyl-sulfonyl)-naphth-2-yl | 8-Hydroxy-4,6-di-sulfonaphth-7-yl-1-ylamino | 4-Methyl-phen-1,3-di-ylamino | 8-Hydroxy-4,6-di-sulfonaphth-7-yl-1-ylamino | 1-Sulfo-5-(β-sulfatoethyl-sulfonyl)-naphth-2-yl | red |
| 309 | 1-Sulfo-5-(β-sulfatoethyl-sulfonyl)-naphth-2-yl | 8-Hydroxy-4,6-di-sulfonaphth-7-yl-1-ylamino | 4-Methoxy-phen-1,3-di-ylamino | 8-Hydroxy-4,6-di-sulfonaphth-7-yl-1-ylamino | 1-Sulfo-5-(β-sulfatoethyl-sulfonyl)-naphth-2-yl | red |
| 310 | 1-Sulfo-5-(β-sulfatoethyl-sulfonyl)-naphth-2-yl | 8-Hydroxy-4,6-di-sulfonaphth-7-yl-1-ylamino | 1,1-Di-phen-cyclo-hexan-4'-ylamino-4"-ylamino | 8-Hydroxy-4,6-di-sulfonaphth-7-yl-1-ylamino | 1-Sulfo-5-(β-sulfatoethyl-sulfonyl)-naphth-2-yl | red |
| 311 | 1-Sulfo-5-(β-sulfatoethyl-sulfonyl)-naphth-2-yl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 1-Sulfo-5-(β-sulfatoethyl-sulfonyl)-naphth-2-yl | red |
| 312 | 1-Sulfo-5-(β-sulfatoethyl-sulfonyl)-naphth-2-yl | 8-Hydroxy-4,6-di-sulfonaphth-7-yl-1-ylamino | 3,3'-Dimethoxy-6,6'-disulfo-1,1'-diphenyl-4,4'-di-ylamino | 8-Hydroxy-4,6-di-sulfonaphth-7-yl-1-ylamino | 1-Sulfo-5-(β-sulfatoethyl-sulfonyl)-naphth-2-yl | red |
| 313 | 1-Sulfo-5-(β-sulfatoethyl-sulfonyl)-naphth-2-yl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 1-Sulfo-5-(β-sulfatoethyl-sulfonyl)-naphth-2-yl | red |
| 314 | 1-Sulfo-5-(β-sulfatoethyl-sulfonyl)-naphth-2-yl | 8-Hydroxy-4,6-di-sulfonaphth-7-yl-1-ylamino | 4,6-Disulfo-phen-1,3-di-ylamino | 8-Hydroxy-4,6-di-sulfonaphth-7-yl-1-ylamino | 1-Sulfo-5-(β-sulfatoethyl-sulfonyl)-naphth-2-yl | red |
| 315 | 5-(β-Sulfatoethyl-sulfonyl)-naphth-2-yl | 8-Hydroxy-4,6-di-sulfonaphth-7-yl-1-ylamino | Phen-1-ylamino-4-(N-methyl)-ylamino | 8-Hydroxy-4,6-di-sulfonaphth-7-yl-1-ylamino | 5-(β-Sulfatoethyl-sulfonyl)-naphth-2-yl | red (542) |
| 316 | 5-(β-Sulfatoethyl-sulfonyl)-naphth-2-yl | 8-Hydroxy-4,6-di-sulfonaphth-7-yl-1-ylamino | 4-Sulfophen-1,3-di-ylamino | 8-Hydroxy-4,6-di-sulfonaphth-7-yl-1-ylamino | 5-(β-Sulfatoethyl-sulfonyl)-naphth-2-yl | red |
| 317 | 5-(β-Sulfatoethyl-sulfonyl)-naphth-2-yl | 8-Hydroxy-4,6-di-sulfonaphth-7-yl-1-ylamino | 3-Sulfophen-1,4-di-ylamino | 8-Hydroxy-4,6-di-sulfonaphth-7-yl-1-ylamino | 5-(β-Sulfatoethyl-sulfonyl)-naphth-2-yl | red |
| 318 | 5-(β-Sulfatoethyl-sulfonyl)-naphth-2-yl | 8-Hydroxy-4,6-di-sulfonaphth-7-yl-1-ylamino | N-Methylbenzylamino-4'-ylamino | 8-Hydroxy-4,6-di-sulfonaphth-7-yl-1-ylamino | 5-(β-Sulfatoethyl-sulfonyl)-naphth-2-yl | red |
| 319 | 5-(β-Sulfatoethyl-sulfonyl)-naphth-2-yl | 8-Hydroxy-4,6-di-sulfonaphth-7-yl-1-ylamino | Phen-1,4-di-ylamino | 8-Hydroxy-4,6-di-sulfonaphth-7-yl-1-ylamino | 5-(β-Sulfatoethyl-sulfonyl)-naphth-2-yl | red |
| 320 | 5-(β-Sulfatoethyl-sulfonyl)-naphth-2-yl | 8-Hydroxy-4,6-di-sulfonaphth-7-yl-1-ylamino | Phen-1,3-di-ylamino | 8-Hydroxy-4,6-di-sulfonaphth-7-yl-1-ylamino | 5-(β-Sulfatoethyl-sulfonyl)-naphth-2-yl | red |
| 321 | 5-(β-Sulfatoethyl-sulfonyl)-naphth-2-yl | 8-Hydroxy-4,6-di-sulfonaphth-7-yl-1-ylamino | Phen-1,2-di-ylamino | 8-Hydroxy-4,6-di-sulfonaphth-7-yl-1-ylamino | 5-(β-Sulfatoethyl-sulfonyl)-naphth-2-yl | red |
| 322 | 5-(β-Sulfatoethyl-sulfonyl)-naphth-2-yl | 8-Hydroxy-4,6-di-sulfonaphth-7-yl-1-ylamino | 4-Methyl-phen-1,3-di-ylamino | 8-Hydroxy-4,6-di-sulfonaphth-7-yl-1-ylamino | 5-(β-Sulfatoethyl-sulfonyl)-naphth-2-yl | red |
| 323 | 5-(β-Sulfatoethyl-sulfonyl)-naphth-2-yl | 8-Hydroxy-4,6-di-sulfonaphth-7-yl-1-ylamino | 4-Methoxy-phen-1,3-di-ylamino | 8-Hydroxy-4,6-di-sulfonaphth-7-yl-1-ylamino | 5-(β-Sulfatoethyl-sulfonyl)-naphth-2-yl | red |
| 324 | 5-(β-Sulfatoethyl-sulfonyl)-naphth-2-yl | 8-Hydroxy-4,6-di-sulfonaphth-7-yl-1-ylamino | 1,1-Di-phen-cyclo-hexan-4'-ylamino-4"-ylamino | 8-Hydroxy-4,6-di-sulfonaphth-7-yl-1-ylamino | 5-(β-Sulfatoethyl-sulfonyl)-naphth-2-yl | red |
| 325 | 5-(β-Sulfatoethyl-sulfonyl)-naphth-2-yl | 8-Hydroxy-4,6-di-sulfonaphth-7-yl-1-ylamino | 1-(Phenylamino)phen-4,4'-di-ylamino | 8-Hydroxy-4,6-di-sulfonaphth-7-yl-1-ylamino | 5-(β-Sulfatoethyl-sulfonyl)-naphth-2-yl | red |
| 326 | 5-(β-Sulfatoethyl- | 8-Hydroxy-4,6-di- | 3,3'-Dimethoxy-6,6'- | 8-Hydroxy-4,6-di- | 5-(β-Sulfatoethyl- | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | sulfonyl)-naphth-2-yl | sulfonaphth-7-yl-1-ylamino | disulfo-1,1'-diphenyl-4,4'-di-ylamino | sulfonaphth-7-yl-1-ylamino | sulfonyl)-naphth-2-yl | |
| 327 | 5-(β-Sulfatoethyl-sulfonyl)-naphth-2-yl | 8-Hydroxy-4,6-di-sulfonaphth-7-yl-1-ylamino | 3,3'-Dimethyl-6,6'-disulfo-1,1'-diphenyl-4,4'-di-ylamino | 8-Hydroxy-4,6-di-sulfonaphth-7-yl-1-ylamino | 5-(β-Sulfatoethyl-sulfonyl)-naphth-2-yl | red |
| 328 | 5-(β-Sulfatoethyl-sulfonyl)-naphth-2-yl | 8-Hydroxy-4,6-di-sulfonaphth-7-yl-1-ylamino | 4,6-Disulfo-phen-1,3-di-ylamino | 8-Hydroxy-4,6-di-sulfonaphth-7-yl-1-ylamino | 5-(β-Sulfatoethyl-sulfonyl)-naphth-2-yl | red |
| 329 | 1-Sulfo-6-(β-sulfatoethyl-sulfonyl)-naphth-2-yl | 8-Hydroxy-3,6-disulfo-naphth-7-yl-1-ylamino | Eth-1,2-di-ylamino | 8-Hydroxy-3,6-disulfo-naphth-7-yl-1-ylamino | 1-Sulfo-6-(β-sulfatoethyl-sulfonyl)-naphth-2-yl | red (539) |
| 330 | 1-Sulfo-6-(β-sulfatoethyl-sulfonyl)-naphth-2-yl | 8-Hydroxy-3,6-disulfo-naphth-7-yl-1-ylamino | Prop-1,3-di-ylamino | 8-Hydroxy-3,6-disulfo-naphth-7-yl-1-ylamino | 1-Sulfo-6-(β-sulfatoethyl-sulfonyl)-naphth-2-yl | red |
| 331 | 1-Sulfo-6-(β-sulfatoethyl-sulfonyl)-naphth-2-yl | 8-Hydroxy-3,6-disulfo-naphth-7-yl-1-ylamino | But-1,4-di-ylamino | 8-Hydroxy-3,6-disulfo-naphth-7-yl-1-ylamino | 1-Sulfo-6-(β-sulfatoethyl-sulfonyl)-naphth-2-yl | red |
| 332 | 1-Sulfo-6-(β-sulfatoethyl-sulfonyl)-naphth-2-yl | 8-Hydroxy-3,6-disulfo-naphth-7-yl-1-ylamino | Hex-1,6-di-ylamino | 8-Hydroxy-3,6-disulfo-naphth-7-yl-1-ylamino | 1-Sulfo-6-(β-sulfatoethyl-sulfonyl)-naphth-2-yl | red |
| 333 | 1-Sulfo-6-(β-sulfatoethyl-sulfonyl)-naphth-2-yl | 8-Hydroxy-3,6-disulfo-naphth-7-yl-1-ylamino | Piperazin-1,4-ylen | 8-Hydroxy-3,6-disulfo-naphth-7-yl-1-ylamino | 1-Sulfo-6-(β-sulfatoethyl-sulfonyl)-naphth-2-yl | red |
| 334 | 1-Sulfo-6-(β-sulfatoethyl-sulfonyl)-naphth-2-yl | 8-Hydroxy-3,6-disulfo-naphth-7-yl-1-ylamino | Cyclohex-1,4-di-ylamino | 8-Hydroxy-3,6-disulfo-naphth-7-yl-1-ylamino | 1-Sulfo-6-(β-sulfatoethyl-sulfonyl)-naphth-2-yl | red (539) |
| 335 | 1-Sulfo-6-(β-sulfatoethyl-sulfonyl)-naphth-2-yl | 8-Hydroxy-3,6-disulfo-naphth-7-yl-1-ylamino | Prop-1,2-di-ylamino | 8-Hydroxy-3,6-disulfo-naphth-7-yl-1-ylamino | 1-Sulfo-6-(β-sulfatoethyl-sulfonyl)-naphth-2-yl | red |
| 336 | 1-Sulfo-6-(β-sulfatoethyl-sulfonyl)-naphth-2-yl | 8-Hydroxy-3,6-disulfo-naphth-7-yl-1-ylamino | Cyclohex-1,3-di-ylamino | 8-Hydroxy-3,6-disulfo-naphth-7-yl-1-ylamino | 1-Sulfo-6-(β-sulfatoethyl-sulfonyl)-naphth-2-yl | red |
| 337 | 1-Sulfo-6-(β-sulfatoethyl-sulfonyl)-naphth-2-yl | 8-Hydroxy-4,6-disulfo-naphth-7-yl-1-ylamino | Eth-1,2-di-ylamino | 8-Hydroxy-4,6-disulfo-naphth-7-yl-1-ylamino | 1-Sulfo-6-(β-sulfatoethyl-sulfonyl)-naphth-2-yl | red |
| 338 | 1-Sulfo-6-(β-sulfatoethyl-sulfonyl)-naphth-2-yl | 8-Hydroxy-4,6-disulfo-naphth-7-yl-1-ylamino | Prop-1,3-di-ylamino | 8-Hydroxy-4,6-disulfo-naphth-7-yl-1-ylamino | 1-Sulfo-6-(β-sulfatoethyl-sulfonyl)-naphth-2-yl | red |
| 339 | 1-Sulfo-6-(β-sulfatoethyl-sulfonyl)-naphth-2-yl | 8-Hydroxy-4,6-disulfo-naphth-7-yl-1-ylamino | But-1,4-di-ylamino | 8-Hydroxy-4,6-disulfo-naphth-7-yl-1-ylamino | 1-Sulfo-6-(β-sulfatoethyl-sulfonyl)-naphth-2-yl | red |
| 340 | 1-Sulfo-6-(β-sulfatoethyl-sulfonyl)-naphth-2-yl | 8-Hydroxy-4,6-disulfo-naphth-7-yl-1-ylamino | Hex-1,6-di-ylamino | 8-Hydroxy-4,6-disulfo-naphth-7-yl-1-ylamino | 1-Sulfo-6-(β-sulfatoethyl-sulfonyl)-naphth-2-yl | red |
| 341 | 1-Sulfo-6-(β-sulfatoethyl-sulfonyl)-naphth-2-yl | 8-Hydroxy-4,6-disulfo-naphth-7-yl-1-ylamino | Piperazin-1,4-ylen | 8-Hydroxy-4,6-disulfo-naphth-7-yl-1-ylamino | 1-Sulfo-6-(β-sulfatoethyl-sulfonyl)-naphth-2-yl | red |
| 342 | 1-Sulfo-6-(β-sulfatoethyl-sulfonyl)-naphth-2-yl | 8-Hydroxy-4,6-disulfo-naphth-7-yl-1-ylamino | Cyclohex-1,4-di-ylamino | 8-Hydroxy-4,6-disulfo-naphth-7-yl-1-ylamino | 1-Sulfo-6-(β-sulfatoethyl-sulfonyl)-naphth-2-yl | red |
| 343 | 1-Sulfo-6-(β-sulfatoethyl-sulfonyl)-naphth-2-yl | 8-Hydroxy-4,6-disulfo-naphth-7-yl-1-ylamino | Prop-1,2-di-ylamino | 8-Hydroxy-4,6-disulfo-naphth-7-yl-1-ylamino | 1-Sulfo-6-(β-sulfatoethyl-sulfonyl)-naphth-2-yl | red |
| 344 | 1-Sulfo-6-(β-sulfatoethyl-sulfonyl)-naphth-2-yl | 8-Hydroxy-4,6-disulfo-naphth-7-yl-1-ylamino | Cyclohex-1,3-di-ylamino | 8-Hydroxy-4,6-disulfo-naphth-7-yl-1-ylamino | 1-Sulfo-6-(β-sulfatoethyl-sulfonyl)-naphth-2-yl | red |
| 345 | 6-Sulfo-8-(β-sulfatoethyl-sulfonyl)-naphth-2-yl | 8-Hydroxy-3,6-disulfo-naphth-7-yl-1-ylamino | Eth-1,2-di-ylamino | 8-Hydroxy-3,6-disulfo-naphth-7-yl-1-ylamino | 6-Sulfo-8-(β-sulfatoethyl-sulfonyl)-naphth-2-yl | red (554) |
| 346 | 6-Sulfo-8-(β- | 8-Hydroxy-3,6-disulfo- | Prop-1,3-di-ylamino | 8-Hydroxy-3,6-disulfo- | 6-Sulfo-8-(β- | red |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| | sulfatoethyl-sulfonyl)-naphth-2-yl | naphth-7-yl-1-ylamino | | naphth-7-yl-1-ylamino | sulfatoethyl-sulfonyl)-naphth-2-yl | |
| 347 | 6-Sulfo-8-(β-sulfatoethyl-sulfonyl)-naphth-2-yl | 8-Hydroxy-3,6-disulfo-naphth-7-yl-1-ylamino | But-1,4-di-ylamino | 8-Hydroxy-3,6-disulfo-naphth-7-yl-1-ylamino | 6-Sulfo-8-(β-sulfatoethyl-sulfonyl)-naphth-2-yl | red |
| 348 | 6-Sulfo-8-(β-sulfatoethyl-sulfonyl)-naphth-2-yl | 8-Hydroxy-3,6-disulfo-naphth-7-yl-1-ylamino | Hex-1,6-di-ylamino | 8-Hydroxy-3,6-disulfo-naphth-7-yl-1-ylamino | 6-Sulfo-8-(β-sulfatoethyl-sulfonyl)-naphth-2-yl | red |
| 349 | 6-Sulfo-8-(β-sulfatoethyl-sulfonyl)-naphth-2-yl | 8-Hydroxy-3,6-disulfo-naphth-7-yl-1-ylamino | Piperazin-1,4-ylen | 8-Hydroxy-3,6-disulfo-naphth-7-yl-1-ylamino | 6-Sulfo-8-(β-sulfatoethyl-sulfonyl)-naphth-2-yl | red |
| 350 | 6-Sulfo-8-(β-sulfatoethyl-sulfonyl)-naphth-2-yl | 8-Hydroxy-3,6-disulfo-naphth-7-yl-1-ylamino | Cyclohex-1,4-di-ylamino | 8-Hydroxy-3,6-disulfo-naphth-7-yl-1-ylamino | 6-Sulfo-8-(β-sulfatoethyl-sulfonyl)-naphth-2-yl | red (539) |
| 351 | 6-Sulfo-8-(β-sulfatoethyl-sulfonyl)-naphth-2-yl | 8-Hydroxy-3,6-disulfo-naphth-7-yl-1-ylamino | Prop-1,2-di-ylamino | 8-Hydroxy-3,6-disulfo-naphth-7-yl-1-ylamino | 6-Sulfo-8-(β-sulfatoethyl-sulfonyl)-naphth-2-yl | red |
| 352 | 6-Sulfo-8-(β-sulfatoethyl-sulfonyl)-naphth-2-yl | 8-Hydroxy-3,6-disulfo-naphth-7-yl-1-ylamino | Cyclohex-1,3-di-ylamino | 8-Hydroxy-3,6-disulfo-naphth-7-yl-1-ylamino | 6-Sulfo-8-(β-sulfatoethyl-sulfonyl)-naphth-2-yl | red |
| 353 | 6-Sulfo-8-(β-sulfatoethyl-sulfonyl)-naphth-2-yl | 8-Hydroxy-4,6-disulfo-naphth-7-yl-1-ylamino | Eth-1,2-di-ylamino | 8-Hydroxy-4,6-disulfo-naphth-7-yl-1-ylamino | 6-Sulfo-8-(β-sulfatoethyl-sulfonyl)-naphth-2-yl | red |
| 354 | 6-Sulfo-8-(β-sulfatoethyl-sulfonyl)-naphth-2-yl | 8-Hydroxy-4,6-disulfo-naphth-7-yl-1-ylamino | Prop-1,3-di-ylamino | 8-Hydroxy-4,6-disulfo-naphth-7-yl-1-ylamino | 6-Sulfo-8-(β-sulfatoethyl-sulfonyl)-naphth-2-yl | red |
| 355 | 6-Sulfo-8-(β-sulfatoethyl-sulfonyl)-naphth-2-yl | 8-Hydroxy-4,6-disulfo-naphth-7-yl-1-ylamino | But-1,4-di-ylamino | 8-Hydroxy-4,6-disulfo-naphth-7-yl-1-ylamino | 6-Sulfo-8-(β-sulfatoethyl-sulfonyl)-naphth-2-yl | red |
| 356 | 6-Sulfo-8-(β-sulfatoethyl-sulfonyl)-naphth-2-yl | 8-Hydroxy-4,6-disulfo-naphth-7-yl-1-ylamino | Hex-1,6-di-ylamino | 8-Hydroxy-4,6-disulfo-naphth-7-yl-1-ylamino | 6-Sulfo-8-(β-sulfatoethyl-sulfonyl)-naphth-2-yl | red |
| 357 | 6-Sulfo-8-(β-sulfatoethyl-sulfonyl)-naphth-2-yl | 8-Hydroxy-4,6-disulfo-naphth-7-yl-1-ylamino | Piperazin-1,4-ylen | 8-Hydroxy-4,6-disulfo-naphth-7-yl-1-ylamino | 6-Sulfo-8-(β-sulfatoethyl-sulfonyl)-naphth-2-yl | red |
| 358 | 6-Sulfo-8-(β-sulfatoethyl-sulfonyl)-naphth-2-yl | 8-Hydroxy-4,6-disulfo-naphth-7-yl-1-ylamino | Cyclohex-1,4-di-ylamino | 8-Hydroxy-4,6-disulfo-naphth-7-yl-1-ylamino | 6-Sulfo-8-(β-sulfatoethyl-sulfonyl)-naphth-2-yl | red |
| 359 | 6-Sulfo-8-(β-sulfatoethyl-sulfonyl)-naphth-2-yl | 8-Hydroxy-4,6-disulfo-naphth-7-yl-1-ylamino | Prop-1,2-di-ylamino | 8-Hydroxy-4,6-disulfo-naphth-7-yl-1-ylamino | 6-Sulfo-8-(β-sulfatoethyl-sulfonyl)-naphth-2-yl | red |
| 360 | 6-Sulfo-8-(β-sulfatoethyl-sulfonyl)-naphth-2-yl | 8-Hydroxy-4,6-disulfo-naphth-7-yl-1-ylamino | Cyclohex-1,3-di-ylamino | 8-Hydroxy-4,6-disulfo-naphth-7-yl-1-ylamino | 6-Sulfo-8-(β-sulfatoethyl-sulfonyl)-naphth-2-yl | red |
| 361 | 6-(β-Sulfatoethyl-sulfonyl)-naphth-2-yl | 8-Hydroxy-3,6-disulfo-naphth-7-yl-1-ylamino | Eth-1,2-di-ylamino | 8-Hydroxy-3,6-disulfo-naphth-7-yl-1-ylamino | 6-(β-Sulfatoethyl-sulfonyl)-naphth-2-yl | red (542) |
| 362 | 6-(β-Sulfatoethyl-sulfonyl)-naphth-2-yl | 8-Hydroxy-3,6-disulfo-naphth-7-yl-1-ylamino | Prop-1,3-di-ylamino | 8-Hydroxy-3,6-disulfo-naphth-7-yl-1-ylamino | 6-(β-Sulfatoethyl-sulfonyl)-naphth-2-yl | red |
| 363 | 6-(β-Sulfatoethyl-sulfonyl)-naphth-2-yl | 8-Hydroxy-3,6-disulfo-naphth-7-yl-1-ylamino | But-1,4-di-ylamino | 8-Hydroxy-3,6-disulfo-naphth-7-yl-1-ylamino | 6-(β-Sulfatoethyl-sulfonyl)-naphth-2-yl | red |
| 364 | 6-(β-Sulfatoethyl-sulfonyl)-naphth-2-yl | 8-Hydroxy-3,6-disulfo-naphth-7-yl-1-ylamino | Hex-1,6-di-ylamino | 8-Hydroxy-3,6-disulfo-naphth-7-yl-1-ylamino | 6-(β-Sulfatoethyl-sulfonyl)-naphth-2-yl | red |
| 365 | 6-(β-Sulfatoethyl-sulfonyl)-naphth-2-yl | 8-Hydroxy-3,6-disulfo-naphth-7-yl-1-ylamino | Piperazin-1,4-ylen | 8-Hydroxy-3,6-disulfo-naphth-7-yl-1-ylamino | 6-(β-Sulfatoethyl-sulfonyl)-naphth-2-yl | red |
| 366 | 6-(β-Sulfatoethyl-sulfonyl)-naphth-2-yl | 8-Hydroxy-3,6-disulfo-naphth-7-yl-1-ylamino | Cyclohex-1,4-di-ylamino | 8-Hydroxy-3,6-disulfo-naphth-7-yl-1-ylamino | 6-(β-Sulfatoethyl-sulfonyl)-naphth-2-yl | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| 367 | 6-(β-Sulfatoethyl-sulfonyl)-naphth-2-yl | 8-Hydroxy-3,6-disulfo-naphth-7-yl-1-ylamino | Prop-1,2-di-ylamino | 8-Hydroxy-3,6-disulfo-naphth-7-yl-1-ylamino | 6-(β-Sulfatoethyl-sulfonyl)-naphth-2-yl | red |
| 368 | 6-(β-Sulfatoethyl-sulfonyl)-naphth-2-yl | 8-Hydroxy-3,6-disulfo-naphth-7-yl-1-ylamino | Cyclohex-1,3-di-ylamino | 8-Hydroxy-3,6-disulfo-naphth-7-yl-1-ylamino | 6-(β-Sulfatoethyl-sulfonyl)-naphth-2-yl | red |
| 369 | 6-(β-Sulfatoethyl-sulfonyl)-naphth-2-yl | 8-Hydroxy-4,6-disulfo-naphth-7-yl-1-ylamino | Eth-1,2-di-ylamino | 8-Hydroxy-4,6-disulfo-naphth-7-yl-1-ylamino | 6-(β-Sulfatoethyl-sulfonyl)-naphth-2-yl | red |
| 370 | 6-(β-Sulfatoethyl-sulfonyl)-naphth-2-yl | 8-Hydroxy-4,6-disulfo-naphth-7-yl-1-ylamino | Prop-1,3-di-ylamino | 8-Hydroxy-4,6-disulfo-naphth-7-yl-1-ylamino | 6-(β-Sulfatoethyl-sulfonyl)-naphth-2-yl | red |
| 371 | 6-(β-Sulfatoethyl-sulfonyl)-naphth-2-yl | 8-Hydroxy-4,6-disulfo-naphth-7-yl-1-ylamino | But-1,4-di-ylamino | 8-Hydroxy-4,6-disulfo-naphth-7-yl-1-ylamino | 6-(β-Sulfatoethyl-sulfonyl)-naphth-2-yl | red |
| 372 | 6-(β-Sulfatoethyl-sulfonyl)-naphth-2-yl | 8-Hydroxy-4,6-disulfo-naphth-7-yl-1-ylamino | Hex-1,6-di-ylamino | 8-Hydroxy-4,6-disulfo-naphth-7-yl-1-ylamino | 6-(β-Sulfatoethyl-sulfonyl)-naphth-2-yl | red |
| 373 | 6-(β-Sulfatoethyl-sulfonyl)-naphth-2-yl | 8-Hydroxy-4,6-disulfo-naphth-7-yl-1-ylamino | Piperazin-1,4-ylen | 8-Hydroxy-4,6-disulfo-naphth-7-yl-1-ylamino | 6-(β-Sulfatoethyl-sulfonyl)-naphth-2-yl | red |
| 374 | 6-(β-Sulfatoethyl-sulfonyl)-naphth-2-yl | 8-Hydroxy-4,6-disulfo-naphth-7-yl-1-ylamino | Cyclohex-1,4-di-ylamino | 8-Hydroxy-4,6-disulfo-naphth-7-yl-1-ylamino | 6-(β-Sulfatoethyl-sulfonyl)-naphth-2-yl | red |
| 375 | 6-(β-Sulfatoethyl-sulfonyl)-naphth-2-yl | 8-Hydroxy-4,6-disulfo-naphth-7-yl-1-ylamino | Prop-1,2-di-ylamino | 8-Hydroxy-4,6-disulfo-naphth-7-yl-1-ylamino | 6-(β-Sulfatoethyl-sulfonyl)-naphth-2-yl | red |
| 376 | 6-(β-Sulfatoethyl-sulfonyl)-naphth-2-yl | 8-Hydroxy-4,6-disulfo-naphth-7-yl-1-ylamino | Cyclohex-1,3-di-ylamino | 8-Hydroxy-4,6-disulfo-naphth-7-yl-1-ylamino | 6-(β-Sulfatoethyl-sulfonyl)-naphth-2-yl | red |
| 377 | 8-(β-Sulfatoethyl-sulfonyl)-naphth-2-yl | 8-Hydroxy-3,6-disulfo-naphth-7-yl-1-ylamino | Eth-1,2-di-ylamino | 8-Hydroxy-3,6-disulfo-naphth-7-yl-1-ylamino | 8-(β-Sulfatoethyl-sulfonyl)-naphth-2-yl | red (557) |
| 378 | 8-(β-Sulfatoethyl-sulfonyl)-naphth-2-yl | 8-Hydroxy-3,6-disulfo-naphth-7-yl-1-ylamino | Prop-1,3-di-ylamino | 8-Hydroxy-3,6-disulfo-naphth-7-yl-1-ylamino | 8-(β-Sulfatoethyl-sulfonyl)-naphth-2-yl | red |
| 379 | 8-(β-Sulfatoethyl-sulfonyl)-naphth-2-yl | 8-Hydroxy-3,6-disulfo-naphth-7-yl-1-ylamino | But-1,4-di-ylamino | 8-Hydroxy-3,6-disulfo-naphth-7-yl-1-ylamino | 8-(β-Sulfatoethyl-sulfonyl)-naphth-2-yl | red |
| 380 | 8-(β-Sulfatoethyl-sulfonyl)-naphth-2-yl | 8-Hydroxy-3,6-disulfo-naphth-7-yl-1-ylamino | Hex-1,6-di-ylamino | 8-Hydroxy-3,6-disulfo-naphth-7-yl-1-ylamino | 8-(β-Sulfatoethyl-sulfonyl)-naphth-2-yl | red |
| 381 | 8-(β-Sulfatoethyl-sulfonyl)-naphth-2-yl | 8-Hydroxy-3,6-disulfo-naphth-7-yl-1-ylamino | Piperazin-1,4-ylen | 8-Hydroxy-3,6-disulfo-naphth-7-yl-1-ylamino | 8-(β-Sulfatoethyl-sulfonyl)-naphth-2-yl | red |
| 382 | 8-(β-Sulfatoethyl-sulfonyl)-naphth-2-yl | 8-Hydroxy-3,6-disulfo-naphth-7-yl-1-ylamino | Cyclohex-1,4-di-ylamino | 8-Hydroxy-3,6-disulfo-naphth-7-yl-1-ylamino | 8-(β-Sulfatoethyl-sulfonyl)-naphth-2-yl | red |
| 383 | 8-(β-Sulfatoethyl-sulfonyl)-naphth-2-yl | 8-Hydroxy-3,6-disulfo-naphth-7-yl-1-ylamino | Prop-1,2-di-ylamino | 8-Hydroxy-3,6-disulfo-naphth-7-yl-1-ylamino | 8-(β-Sulfatoethyl-sulfonyl)-naphth-2-yl | red |
| 384 | 8-(β-Sulfatoethyl-sulfonyl)-naphth-2-yl | 8-Hydroxy-3,6-disulfo-naphth-7-yl-1-ylamino | Cyclohex-1,3-di-ylamino | 8-Hydroxy-3,6-disulfo-naphth-7-yl-1-ylamino | 8-(β-Sulfatoethyl-sulfonyl)-naphth-2-yl | red |
| 385 | 8-(β-Sulfatoethyl-sulfonyl)-naphth-2-yl | 8-Hydroxy-4,6-disulfo-naphth-7-yl-1-ylamino | Eth-1,2-di-ylamino | 8-Hydroxy-4,6-disulfo-naphth-7-yl-1-ylamino | 8-(β-Sulfatoethyl-sulfonyl)-naphth-2-yl | red |
| 386 | 8-(β-Sulfatoethyl-sulfonyl)-naphth-2-yl | 8-Hydroxy-4,6-disulfo-naphth-7-yl-1-ylamino | Prop-1,3-di-ylamino | 8-Hydroxy-4,6-disulfo-naphth-7-yl-1-ylamino | 8-(β-Sulfatoethyl-sulfonyl)-naphth-2-yl | red |
| 387 | 8-(β-Sulfatoethyl-sulfonyl)-naphth-2-yl | 8-Hydroxy-4,6-disulfo-naphth-7-yl-1-ylamino | But-1,4-di-ylamino | 8-Hydroxy-4,6-disulfo-naphth-7-yl-1-ylamino | 8-(β-Sulfatoethyl-sulfonyl)-naphth-2-yl | red |
| 388 | 8-(β-Sulfatoethyl-sulfonyl)-naphth-2-yl | 8-Hydroxy-4,6-disulfo-naphth-7-yl-1-ylamino | Hex-1,6-di-ylamino | 8-Hydroxy-4,6-disulfo-naphth-7-yl-1-ylamino | 8-(β-Sulfatoethyl-sulfonyl)-naphth-2-yl | red |
| 389 | 8-(β-Sulfatoethyl-sulfonyl)-naphth-2-yl | 8-Hydroxy-4,6-disulfo-naphth-7-yl-1-ylamino | Piperazin-1,4-ylen | 8-Hydroxy-4,6-disulfo-naphth-7-yl-1-ylamino | 8-(β-Sulfatoethyl-sulfonyl)-naphth-2-yl | red |
| 390 | 8-(β-Sulfatoethyl-sulfonyl)-naphth-2-yl | 8-Hydroxy-4,6-disulfo-naphth-7-yl-1-ylamino | Cyclohex-1,4-di-ylamino | 8-Hydroxy-4,6-disulfo-naphth-7-yl-1-ylamino | 8-(β-Sulfatoethyl-sulfonyl)-naphth-2-yl | red |
| 391 | 8-(β-Sulfatoethyl-sulfonyl)-naphth-2-yl | 8-Hydroxy-4,6-disulfo-naphth-7-yl-1-ylamino | Prop-1,2-di-ylamino | 8-Hydroxy-4,6-disulfo-naphth-7-yl-1-ylamino | 8-(β-Sulfatoethyl-sulfonyl)-naphth-2-yl | red |
| 392 | 8-(β-Sulfatoethyl-sulfonyl)-naphth- | 8-Hydroxy-4,6-disulfo-naphth-7-yl-1-ylamino | Cyclohex-1,3-di-ylamino | 8-Hydroxy-4,6-disulfo-naphth-7-yl-1-ylamino | 8-(β-Sulfatoethyl-sulfonyl)-naphth- | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| 393 | 1-Sulfo-5-(β-sulfatoethyl-sulfonyl)-naphth-2-yl | 8-Hydroxy-3,6-disulfo-naphth-7-yl-1-ylamino | Eth-1,2-di-ylamino | 8-Hydroxy-3,6-disulfo-naphth-7-yl-1-ylamino | 1-Sulfo-5-(β-sulfatoethyl-sulfonyl)-naphth-2-yl | red (538) |
| 394 | 1-Sulfo-5-(β-sulfatoethyl-sulfonyl)-naphth-2-yl | 8-Hydroxy-3,6-disulfo-naphth-7-yl-1-ylamino | Prop-1,3-di-ylamino | 8-Hydroxy-3,6-disulfo-naphth-7-yl-1-ylamino | 1-Sulfo-5-(β-sulfatoethyl-sulfonyl)-naphth-2-yl | red |
| 395 | 1-Sulfo-5-(β-sulfatoethyl-sulfonyl)-naphth-2-yl | 8-Hydroxy-3,6-disulfo-naphth-7-yl-1-ylamino | But-1,4-di-ylamino | 8-Hydroxy-3,6-disulfo-naphth-7-yl-1-ylamino | 1-Sulfo-5-(β-sulfatoethyl-sulfonyl)-naphth-2-yl | red |
| 396 | 1-Sulfo-5-(β-sulfatoethyl-sulfonyl)-naphth-2-yl | 8-Hydroxy-3,6-disulfo-naphth-7-yl-1-ylamino | Hex-1,6-di-ylamino | 8-Hydroxy-3,6-disulfo-naphth-7-yl-1-ylamino | 1-Sulfo-5-(β-sulfatoethyl-sulfonyl)-naphth-2-yl | red |
| 397 | 1-Sulfo-5-(β-sulfatoethyl-sulfonyl)-naphth-2-yl | 8-Hydroxy-3,6-disulfo-naphth-7-yl-1-ylamino | Piperazin-1,4-ylen | 8-Hydroxy-3,6-disulfo-naphth-7-yl-1-ylamino | 1-Sulfo-5-(β-sulfatoethyl-sulfonyl)-naphth-2-yl | red |
| 398 | 1-Sulfo-5-(β-sulfatoethyl-sulfonyl)-naphth-2-yl | 8-Hydroxy-3,6-disulfo-naphth-7-yl-1-ylamino | Cyclohex-1,4-di-ylamino | 8-Hydroxy-3,6-disulfo-naphth-7-yl-1-ylamino | 1-Sulfo-5-(β-sulfatoethyl-sulfonyl)-naphth-2-yl | red |
| 399 | 1-Sulfo-5-(β-sulfatoethyl-sulfonyl)-naphth-2-yl | 8-Hydroxy-3,6-disulfo-naphth-7-yl-1-ylamino | Prop-1,2-di-ylamino | 8-Hydroxy-3,6-disulfo-naphth-7-yl-1-ylamino | 1-Sulfo-5-(β-sulfatoethyl-sulfonyl)-naphth-2-yl | red |
| 400 | 1-Sulfo-5-(β-sulfatoethyl-sulfonyl)-naphth-2-yl | 8-Hydroxy-3,6-disulfo-naphth-7-yl-1-ylamino | Cyclohex-1,3-di-ylamino | 8-Hydroxy-3,6-disulfo-naphth-7-yl-1-ylamino | 1-Sulfo-5-(β-sulfatoethyl-sulfonyl)-naphth-2-yl | red |
| 401 | 1-Sulfo-5-(β-sulfatoethyl-sulfonyl)-naphth-2-yl | 8-Hydroxy-4,6-disulfo-naphth-7-yl-1-ylamino | Eth-1,2-di-ylamino | 8-Hydroxy-4,6-disulfo-naphth-7-yl-1-ylamino | 1-Sulfo-5-(β-sulfatoethyl-sulfonyl)-naphth-2-yl | red |
| 402 | 1-Sulfo-5-(β-sulfatoethyl-sulfonyl)-naphth-2-yl | 8-Hydroxy-4,6-disulfo-naphth-7-yl-1-ylamino | Prop-1,3-di-ylamino | 8-Hydroxy-4,6-disulfo-naphth-7-yl-1-ylamino | 1-Sulfo-5-(β-sulfatoethyl-sulfonyl)-naphth-2-yl | red |
| 403 | 1-Sulfo-5-(β-sulfatoethyl-sulfonyl)-naphth-2-yl | 8-Hydroxy-4,6-disulfo-naphth-7-yl-1-ylamino | But-1,4-di-ylamino | 8-Hydroxy-4,6-disulfo-naphth-7-yl-1-ylamino | 1-Sulfo-5-(β-sulfatoethyl-sulfonyl)-naphth-2-yl | red |
| 404 | 1-Sulfo-5-(β-sulfatoethyl-sulfonyl)-naphth-2-yl | 8-Hydroxy-4,6-disulfo-naphth-7-yl-1-ylamino | Hex-1,6-di-ylamino | 8-Hydroxy-4,6-disulfo-naphth-7-yl-1-ylamino | 1-Sulfo-5-(β-sulfatoethyl-sulfonyl)-naphth-2-yl | red |
| 405 | 1-Sulfo-5-(β-sulfatoethyl-sulfonyl)-naphth-2-yl | 8-Hydroxy-4,6-disulfo-naphth-7-yl-1-ylamino | Piperazin-1,4-ylen | 8-Hydroxy-4,6-disulfo-naphth-7-yl-1-ylamino | 1-Sulfo-5-(β-sulfatoethyl-sulfonyl)-naphth-2-yl | red |
| 406 | 1-Sulfo-5-(β-sulfatoethyl-sulfonyl)-naphth-2-yl | 8-Hydroxy-4,6-disulfo-naphth-7-yl-1-ylamino | Cyclohex-1,4-di-ylamino | 8-Hydroxy-4,6-disulfo-naphth-7-yl-1-ylamino | 1-Sulfo-5-(β-sulfatoethyl-sulfonyl)-naphth-2-yl | red |
| 407 | 1-Sulfo-5-(β-sulfatoethyl-sulfonyl)-naphth-2-yl | 8-Hydroxy-4,6-disulfo-naphth-7-yl-1-ylamino | Prop-1,2-di-ylamino | 8-Hydroxy-4,6-disulfo-naphth-7-yl-1-ylamino | 1-Sulfo-5-(β-sulfatoethyl-sulfonyl)-naphth-2-yl | red |
| 408 | 1-Sulfo-5-(β-sulfatoethyl-sulfonyl)-naphth-2-yl | 8-Hydroxy-4,6-disulfo-naphth-7-yl-1-ylamino | Cyclohex-1,3-di-ylamino | 8-Hydroxy-4,6-disulfo-naphth-7-yl-1-ylamino | 1-Sulfo-5-(β-sulfatoethyl-sulfonyl)-naphth-2-yl | red |
| 409 | 5-(β-Sulfatoethyl-sulfonyl)-naphth-2-yl | 8-Hydroxy-3,6-disulfo-naphth-7-yl-1-ylamino | Eth-1,2-di-ylamino | 8-Hydroxy-3,6-disulfo-naphth-7-yl-1-ylamino | 5-(β-Sulfatoethyl-sulfonyl)-naphth-2-yl | red (557) |
| 410 | 5-(β-Sulfatoethyl-sulfonyl)-naphth-2-yl | 8-Hydroxy-3,6-disulfo-naphth-7-yl-1-ylamino | Prop-1,3-di-ylamino | 8-Hydroxy-3,6-disulfo-naphth-7-yl-1-ylamino | 5-(β-Sulfatoethyl-sulfonyl)-naphth-2-yl | red |
| 411 | 5-(β-Sulfatoethyl-sulfonyl)-naphth-2-yl | 8-Hydroxy-3,6-disulfo-naphth-7-yl-1-ylamino | But-1,4-di-ylamino | 8-Hydroxy-3,6-disulfo-naphth-7-yl-1-ylamino | 5-(β-Sulfatoethyl-sulfonyl)-naphth-2-yl | red |
| 412 | 5-(β-Sulfatoethyl-sulfonyl)-naphth-2-yl | 8-Hydroxy-3,6-disulfo-naphth-7-yl-1-ylamino | Hex-1,6-di-ylamino | 8-Hydroxy-3,6-disulfo-naphth-7-yl-1-ylamino | 5-(β-Sulfatoethyl-sulfonyl)-naphth-2-yl | red |

-continued

| Ex. | Radical $D^{10}$- | Radical -$K^{10}$-$N(R^{10})$- | Azo dyestuff of the formula (A) Radical A° | Radical -$N(R^{11})$-$K^{11}$- | Radical $D^{11}$- | Color shade |
|---|---|---|---|---|---|---|
| 413 | 5-(β-Sulfatoethyl-sulfonyl)-naphth-2-yl | 8-Hydroxy-3,6-disulfo-naphth-7-yl-1-ylamino | Piperazin-1,4-ylen | 8-Hydroxy-3,6-disulfo-naphth-7-yl-1-ylamino | 5-(β-Sulfatoethyl-sulfonyl)-naphth-2-yl | red |
| 414 | 5-(β-Sulfatoethyl-sulfonyl)-naphth-2-yl | 8-Hydroxy-3,6-disulfo-naphth-7-yl-1-ylamino | Cyclohex-1,4-di-ylamino | 8-Hydroxy-3,6-disulfo-naphth-7-yl-1-ylamino | 5-(β-Sulfatoethyl-sulfonyl)-naphth-2-yl | red |
| 415 | 5-(β-Sulfatoethyl-sulfonyl)-naphth-2-yl | 8-Hydroxy-3,6-disulfo-naphth-7-yl-1-ylamino | Prop-1,2-di-ylamino | 8-Hydroxy-3,6-disulfo-naphth-7-yl-1-ylamino | 5-(β-Sulfatoethyl-sulfonyl)-naphth-2-yl | red |
| 416 | 5-(β-Sulfatoethyl-sulfonyl)-naphth-2-yl | 8-Hydroxy-3,6-disulfo-naphth-7-yl-1-ylamino | Cyclohex-1,3-di-ylamino | 8-Hydroxy-3,6-disulfo-naphth-7-yl-1-ylamino | 5-(β-Sulfatoethyl-sulfonyl)-naphth-2-yl | red |
| 417 | 5-(β-Sulfatoethyl-sulfonyl)-naphth-2-yl | 8-Hydroxy-4,6-disulfo-naphth-7-yl-1-ylamino | Eth-1,2-di-ylamino | 8-Hydroxy-4,6-disulfo-naphth-7-yl-1-ylamino | 5-(β-Sulfatoethyl-sulfonyl)-naphth-2-yl | red (532) |
| 418 | 5-(β-Sulfatoethyl-sulfonyl)-naphth-2-yl | 8-Hydroxy-4,6-disulfo-naphth-7-yl-1-ylamino | Prop-1,3-di-ylamino | 8-Hydroxy-4,6-disulfo-naphth-7-yl-1-ylamino | 5-(β-Sulfatoethyl-sulfonyl)-naphth-2-yl | red |
| 419 | 5-(β-Sulfatoethyl-sulfonyl)-naphth-2-yl | 8-Hydroxy-4,6-disulfo-naphth-7-yl-1-ylamino | But-1,4-di-ylamino | 8-Hydroxy-4,6-disulfo-naphth-7-yl-1-ylamino | 5-(β-Sulfatoethyl-sulfonyl)-naphth-2-yl | red |
| 420 | 5-(β-Sulfatoethyl-sulfonyl)-naphth-2-yl | 8-Hydroxy-4,6-disulfo-naphth-7-yl-1-ylamino | Hex-1,6-di-ylamino | 8-Hydroxy-4,6-disulfo-naphth-7-yl-1-ylamino | 5-(β-Sulfatoethyl-sulfonyl)-naphth-2-yl | red |
| 421 | 5-(β-Sulfatoethyl-sulfonyl)-naphth-2-yl | 8-Hydroxy-4,6-disulfo-naphth-7-yl-1-ylamino | Piperazin-1,4-ylen | 8-Hydroxy-4,6-disulfo-naphth-7-yl-1-ylamino | 5-(β-Sulfatoethyl-sulfonyl)-naphth-2-yl | red |
| 422 | 5-(β-Sulfatoethyl-sulfonyl)-naphth-2-yl | 8-Hydroxy-4,6-disulfo-naphth-7-yl-1-ylamino | Cyclohex-1,4-di-ylamino | 8-Hydroxy-4,6-disulfo-naphth-7-yl-1-ylamino | 5-(β-Sulfatoethyl-sulfonyl)-naphth-2-yl | red |
| 423 | 5-(β-Sulfatoethyl-sulfonyl)-naphth-2-yl | 8-Hydroxy-4,6-disulfo-naphth-7-yl-1-ylamino | Prop-1,2-di-ylamino | 8-Hydroxy-4,6-disulfo-naphth-7-yl-1-ylamino | 5-(β-Sulfatoethyl-sulfonyl)-naphth-2-yl | red |
| 424 | 5-(β-Sulfatoethyl-sulfonyl)-naphth-2-yl | 8-Hydroxy-4,6-disulfo-naphth-7-yl-1-ylamino | Cyclohex-1,3-di-ylamino | 8-Hydroxy-4,6-disulfo-naphth-7-yl-1-ylamino | 5-(β-Sulfatoethyl-sulfonyl)-naphth-2-yl | red |
| 425 | 4-(β-Sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 4-(β-Sulfatoethyl-sulfonyl)-phenyl | orange (475) |
| 426 | 4-(β-Sulfatoethyl-sulfonyl)-phenyl | 8-Hydroxy-6-sulfo-naphth-7-yl-3-ylamino | But-1,4-di-ylamino | 8-Hydroxy-6-sulfo-naphth-7-yl-3-ylamino | 4-(β-Sulfatoethyl-sulfonyl)-phenyl | orange |
| 427 | 4-(β-Sulfatoethyl-sulfonyl)-phenyl | 8-Hydroxy-6-sulfo-naphth-7-yl-3-ylamino | Hex-1,6-di-ylamino | 8-Hydroxy-6-sulfo-naphth-7-yl-3-ylamino | 4-(β-Sulfatoethyl-sulfonyl)-phenyl | orange |
| 428 | 4-(β-Sulfatoethyl-sulfonyl)-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 4-(β-Sulfatoethyl-sulfonyl)-phenyl | orange |
| 429 | 4-(β-Sulfatoethyl-sulfonyl)-phenyl | 8-Hydroxy-6-sulfo-naphth-7-yl-3-ylamino | Cyclohex-1,3-di-ylamino | 8-Hydroxy-6-sulfo-naphth-7-yl-3-ylamino | 4-(β-Sulfatoethyl-sulfonyl)-phenyl | orange |
| 430 | 4-(β-Sulfatoethyl-sulfonyl)-phenyl | 8-Hydroxy-6-sulfo-naphth-7-yl-3-ylamino | Prop-1,2-di-ylamino | 8-Hydroxy-6-sulfo-naphth-7-yl-3-ylamino | 4-(β-Sulfatoethyl-sulfonyl)-phenyl | orange |
| 431 | 4-(β-Sulfatoethyl-sulfonyl)-phenyl | 8-Hydroxy-6-sulfo-naphth-7-yl-3-ylamino | Cyclohex-1,3-di-(methylamino) | 8-Hydroxy-6-sulfo-naphth-7-yl-3-ylamino | 4-(β-Sulfatoethyl-sulfonyl)-phenyl | orange |
| 432 | 4-(β-Sulfatoethyl-sulfonyl)-phenyl | 8-Hydroxy-6-sulfo-naphth-7-yl-3-ylamino | Phen-1-ylamino-4-(N-methyl)-ylamino | 8-Hydroxy-6-sulfo-naphth-7-yl-3-ylamino | 4-(β-Sulfatoethyl-sulfonyl)-phenyl | orange |
| 433 | 4-(β-Sulfatoethyl-sulfonyl)-phenyl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 4-(β-Sulfatoethyl-sulfonyl)-phenyl | orange |
| 434 | 4-(β-Sulfatoethyl-sulfonyl)-phenyl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 4-(β-Sulfatoethyl-sulfonyl)-phenyl | orange |
| 435 | 4-(β-Sulfatoethyl-sulfonyl)-phenyl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 4-(β-Sulfatoethyl-sulfonyl)-phenyl | orange |
| 436 | 4-(β-Sulfatoethyl-sulfonyl)-phenyl | 8-Hydroxy-6-sulfo-naphth-7-yl-3-ylamino | Phen-1,4-di-ylamino | 8-Hydroxy-6-sulfo-naphth-7-yl-3-ylamino | 4-(β-Sulfatoethyl-sulfonyl)-phenyl | orange |
| 437 | 4-(β-Sulfatoethyl-sulfonyl)-phenyl | 8-Hydroxy-6-sulfo-naphth-7-yl-3-ylamino | Phen-1,3-di-ylamino | 8-Hydroxy-6-sulfo-naphth-7-yl-3-ylamino | 4-(β-Sulfatoethyl-sulfonyl)-phenyl | orange |
| 438 | 4-(β-Sulfatoethyl-sulfonyl)-phenyl | 8-Hydroxy-6-sulfo-naphth-7-yl-3-ylamino | Phen-1,2-di-ylamino | 8-Hydroxy-6-sulfo-naphth-7-yl-3-ylamino | 4-(β-Sulfatoethyl-sulfonyl)-phenyl | orange |
| 439 | 4-(β-Sulfatoethyl-sulfonyl)-phenyl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 4-(β-Sulfatoethyl-sulfonyl)-phenyl | orange |
| 440 | 4-(β-Sulfatoethyl-sulfonyl)-phenyl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 4-(β-Sulfatoethyl-sulfonyl)-phenyl | orange |
| 441 | 4-(β-Sulfatoethyl-sulfonyl)-phenyl | 8-Hydroxy-6-sulfo-naphth-7-yl-3-ylamino | 1,1-Di-phen-cyclohexan-4'-ylamino-4''-ylamino | 8-Hydroxy-6-sulfo-naphth-7-yl-3-ylamino | 4-(β-Sulfatoethyl-sulfonyl)-phenyl | orange |
| 442 | 4-(β-Sulfatoethyl-sulfonyl)-phenyl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 4-(β-Sulfatoethyl-sulfonyl)-phenyl | orange |
| 443 | 4-(β-Sulfatoethyl-sulfonyl)-phenyl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 4-(β-Sulfatoethyl-sulfonyl)-phenyl | orange |
| 444 | 4-(β-Sulfatoethyl- | 8-Hydroxy-6-sulfo-naphth- | 3,3'-Dimethyl-6,6'- | 8-Hydroxy-6-sulfo- | 4-(β-Sulfatoethyl- | orange |

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| | sulfonyl)-phenyl | 7-yl-3-ylamino | disulfo-1,1'-diphenyl-4,4'-di-ylamino | naphth-7-yl-3-ylamino | sulfonyl)-phenyl | |
| 445 | 2-Sulfo-4-(β-sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 2-Sulfo-4-(β-sulfatoethyl-sulfonyl)-ethyl | yellowish-orange (463) |
| 446 | 2-Sulfo-4-(β-sulfatoethyl-sulfonyl)-phenyl | 8-Hydroxy-6-sulfo-naphth-7-yl-3-ylamino | Prop-1,3-di-ylamino | 8-Hydroxy-6-sulfo-naphth-7-yl-3-ylamino | 2-Sulfo-4-(β-sulfatoethyl-sulfonyl)-ethyl | yellowish-orange |
| 447 | 2-Sulfo-4-(β-sulfatoethyl-sulfonyl)-phenyl | 8-Hydroxy-6-sulfo-naphth-7-yl-3-ylamino | But-1,4-di-ylamino | 8-Hydroxy-6-sulfo-naphth-7-yl-3-ylamino | 2-Sulfo-4-(β-sulfatoethyl-sulfonyl)-ethyl | yellowish-orange |
| 448 | 2-Sulfo-4-(β-sulfatoethyl-sulfonyl)-phenyl | 8-Hydroxy-6-sulfo-naphth-7-yl-3-ylamino | Hex-1,6-di-ylamino | 8-Hydroxy-6-sulfo-naphth-7-yl-3-ylamino | 2-Sulfo-4-(β-sulfatoethyl-sulfonyl)-ethyl | yellowish-orange |
| 448 | 2-Sulfo-4-(β-sulfatoethyl-sulfonyl)-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 2-Sulfo-4-(β-sulfatoethyl-sulfonyl)-ethyl | yellowish-orange |
| 450 | 2-Sulfo-4-(β-sulfatoethyl-sulfonyl)-phenyl | 8-Hydroxy-6-sulfo-naphth-7-yl-3-ylamino | Cyclohex-1,3-di-ylamino | 8-Hydroxy-6-sulfo-naphth-7-yl-3-ylamino | 2-Sulfo-4-(β-sulfatoethyl-sulfonyl)-ethyl | yellowish-orange |
| 451 | 2-Sulfo-4-(β-sulfatoethyl-sulfonyl)-phenyl | 8-Hydroxy-6-sulfo-naphth-7-yl-3-ylamino | Prop-1,2-di-ylamino | 8-Hydroxy-6-sulfo-naphth-7-yl-3-ylamino | 2-Sulfo-4-(β-sulfatoethyl-sulfonyl)-ethyl | yellowish-orange |
| 452 | 2-Sulfo-4-(β-sulfatoethyl-sulfonyl)-phenyl | 8-Hydroxy-6-sulfo-naphth-7-yl-3-ylamino | Cyclohex-1,3-di-(methylamino) | 8-Hydroxy-6-sulfo-naphth-7-yl-3-ylamino | 2-Sulfo-4-(β-sulfatoethyl-sulfonyl)-ethyl | yellowish-orange |
| 453 | 2-Sulfo-4-(β-sulfatoethyl-sulfonyl)-phenyl | 8-Hydroxy-6-sulfo-naphth-7-yl-3-ylamino | Phen-1-ylamino-4-(N-methyl)-ylamino | 8-Hydroxy-6-sulfo-naphth-7-yl-3-ylamino | 2-Sulfo-4-(β-sulfatoethyl-sulfonyl)-ethyl | yellowish-orange |
| 454 | 2-Sulfo-4-(β-sulfatoethyl-sulfonyl)-phenyl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 2-Sulfo-4-(β-sulfatoethyl-sulfonyl)-ethyl | yellowish-orange |
| 455 | 2-Sulfo-4-(β-sulfatoethyl-sulfonyl)-phenyl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 2-Sulfo-4-(β-sulfatoethyl-sulfonyl)-ethyl | yellowish-orange |
| 456 | 2-Sulfo-4-(β-sulfatoethyl-sulfonyl)-phenyl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 2-Sulfo-4-(β-sulfatoethyl-sulfonyl)-ethyl | yellowish-orange |
| 457 | 2-Sulfo-4-(β-sulfatoethyl-sulfonyl)-phenyl | 8-Hydroxy-6-sulfo-naphth-7-yl-3-ylamino | Phen-1,4-di-ylamino | 8-Hydroxy-6-sulfo-naphth-7-yl-3-ylamino | 2-Sulfo-4-(β-sulfatoethyl-sulfonyl)-ethyl | yellowish-orange |
| 458 | 2-Sulfo-4-(β-sulfatoethyl-sulfonyl)-phenyl | 8-Hydroxy-6-sulfo-naphth-7-yl-3-ylamino | Phen-1,3-di-ylamino | 8-Hydroxy-6-sulfo-naphth-7-yl-3-ylamino | 2-Sulfo-4-(β-sulfatoethyl-sulfonyl)-ethyl | yellowish-orange |
| 459 | 2-Sulfo-4-(β-sulfatoethyl-sulfonyl)-phenyl | 8-Hydroxy-6-sulfo-naphth-7-yl-3-ylamino | Phen-1,2-di-ylamino | 8-Hydroxy-6-sulfo-naphth-7-yl-3-ylamino | 2-Sulfo-4-(β-sulfatoethyl-sulfonyl)-ethyl | yellowish-orange |
| 460 | 2-Sulfo-4-(β-sulfatoethyl-sulfonyl)-phenyl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 2-Sulfo-4-(β-sulfatoethyl-sulfonyl)-ethyl | yellowish-orange |
| 461 | 2-Sulfo-4-(β-sulfatoethyl-sulfonyl)-phenyl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 2-Sulfo-4-(β-sulfatoethyl-sulfonyl)-ethyl | yellowish-orange |
| 462 | 2-Sulfo-4-(β-sulfatoethyl-sulfonyl)-phenyl | 8-Hydroxy-6-sulfo-naphth-7-yl-3-ylamino | 1,1-Di-phen-cyclohexan-4'-ylamino-4"-ylamino | 8-Hydroxy-6-sulfo-naphth-7-yl-3-ylamino | 2-Sulfo-4-(β-sulfatoethyl-sulfonyl)-ethyl | yellowish-orange |
| 463 | 2-Sulfo-4-(β-sulfatoethyl-sulfonyl)-phenyl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 2-Sulfo-4-(β-sulfatoethyl-sulfonyl)-ethyl | yellowish-orange |
| 464 | 2-Sulfo-4-(β-sulfatoethyl-sulfonyl)-phenyl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 2-Sulfo-4-(β-sulfatoethyl-sulfonyl)-ethyl | yellowish-orange |
| 465 | 2-Sulfo-4-(β-sulfatoethyl-sulfonyl)-phenyl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 2-Sulfo-4-(β-sulfatoethyl-sulfonyl)-ethyl | yellowish-orange |
| 466 | 2-Methoxy-5-methyl-4-(β-sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 2-Methoxy-5-methyl-4-(β-sulfonyl)-ethyl | reddish-orange |
| 467 | 2-Methoxy-5-methyl-4-(β-sulfatoethyl-sulfonyl)-phenyl | 8-Hydroxy-6-sulfo-naphth-7-yl-3-ylamino | Prop-1,3-di-ylamino | 8-Hydroxy-6-sulfo-naphth-7-yl-3-ylamino | 2-Methoxy-5-methyl-4-(β-sulfonyl)-ethyl | reddish-orange |
| 468 | 2-Methoxy-5-methyl-4-(β-sulfatoethyl-sulfonyl)-phenyl | 8-Hydroxy-6-sulfo-naphth-7-yl-3-ylamino | But-1,4-di-ylamino | 8-Hydroxy-6-sulfo-naphth-7-yl-3-ylamino | 2-Methoxy-5-methyl-4-(β-sulfonyl)-ethyl | reddish-orange |

-continued

| Ex. | Radical $D^{10}$- | Radical -$K^{10}$-N($R^{10}$)- | Azo dyestuff of the formula (A) Radical $A^\circ$ | Radical -N($R^{11}$)-$K^{11}$- | Radical $D^{11}$- | Color shade |
|---|---|---|---|---|---|---|
| 469 | 2-Methoxy-5-methyl-4-(β-sulfatoethyl-sulfonyl)-phenyl | 8-Hydroxy-6-sulfo-naphth-7-yl-3-ylamino | Hex-1,6-di-ylamino | 8-Hydroxy-6-sulfo-naphth-7-yl-3-ylamino | 2-Methoxy-5-methyl-4-(β-sulfonyl)-ethyl | reddish-orange |
| 470 | 2-Methoxy-5-methyl-4-(β-sulfatoethyl-sulfonyl)-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 2-Methoxy-5-methyl-4-(β-sulfonyl)-ethyl | reddish-orange |
| 471 | 2-Methoxy-5-methyl-4-(β-sulfatoethyl-sulfonyl)-phenyl | 8-Hydroxy-6-sulfo-naphth-7-yl-3-ylamino | Cyclohex-1,3-di-ylamino | 8-Hydroxy-6-sulfo-naphth-7-yl-3-ylamino | 2-Methoxy-5-methyl-4-(β-sulfonyl)-ethyl | reddish-orange |
| 472 | 2-Methoxy-5-methyl-4-(β-sulfatoethyl-sulfonyl)-phenyl | 8-Hydroxy-6-sulfo-naphth-7-yl-3-ylamino | Prop-1,2-di-ylamino | 8-Hydroxy-6-sulfo-naphth-7-yl-3-ylamino | 2-Methoxy-5-methyl-4-(β-sulfonyl)-ethyl | reddish-orange |
| 473 | 2-Methoxy-5-methyl-4-(β-sulfatoethyl-sulfonyl)-phenyl | 8-Hydroxy-6-sulfo-naphth-7-yl-3-ylamino | Eth-1,2-di-ylamino (methylamino) | Cyclohex-1,3-di-naphth-7-yl-3-ylamino | 2-Methoxy-5-methyl-4-(β-sulfonyl)-ethyl | reddish-orange |
| 474 | 2-Methoxy-5-methyl-4-(β-sulfatoethyl-sulfonyl)-phenyl | 8-Hydroxy-6-sulfo-naphth-7-yl-3-ylamino | Phen-1-ylamino-4-(N-methyl)-ylamino | 8-Hydroxy-6-sulfo-naphth-7-yl-3-ylamino | 2-Methoxy-5-methyl-4-(β-sulfonyl)-ethyl | reddish-orange |
| 475 | 2-Methoxy-5-methyl-4-(β-sulfatoethyl-sulfonyl)-phenyl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 2-Methoxy-5-methyl-4-(β-sulfonyl)-ethyl | reddish-orange |
| 476 | 2-Methoxy-5-methyl-4-(β-sulfatoethyl-sulfonyl)-phenyl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 2-Methoxy-5-methyl-4-(β-sulfonyl)-ethyl | reddish-orange |
| 477 | 2-Methoxy-5-methyl-4-(β-sulfatoethyl-sulfonyl)-phenyl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 2-Methoxy-5-methyl-4-(β-sulfonyl)-ethyl | reddish-orange |
| 478 | 2-Methoxy-5-methyl-4-(β-sulfatoethyl-sulfonyl)-phenyl | 8-Hydroxy-6-sulfo-naphth-7-yl-3-ylamino | Phen-1,4-di-ylamino | 8-Hydroxy-6-sulfo-naphth-7-yl-3-ylamino | 2-Methoxy-5-methyl-4-(β-sulfonyl)-ethyl | reddish-orange |
| 479 | 2-Methoxy-5-methyl-4-(β-sulfatoethyl-sulfonyl)-phenyl | 8-Hydroxy-6-sulfo-naphth-7-yl-3-ylamino | Phen-1,3-di-ylamino | 8-Hydroxy-6-sulfo-naphth-7-yl-3-ylamino | 2-Methoxy-5-methyl-4-(β-sulfonyl)-ethyl | reddish-orange |
| 480 | 2-Methoxy-5-methyl-4-(β-sulfatoethyl-sulfonyl)-phenyl | 8-Hydroxy-6-sulfo-naphth-7-yl-3-ylamino | Phen-1,2-di-ylamino | 8-Hydroxy-6-sulfo-naphth-7-yl-3-ylamino | 2-Methoxy-5-methyl-4-(β-sulfonyl)-ethyl | reddish-orange |
| 481 | 2-Methoxy-5-methyl-4-(β-sulfatoethyl-sulfonyl)-phenyl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 2-Methoxy-5-methyl-4-(β-sulfonyl)-ethyl | reddish-orange |
| 482 | 2-Methoxy-5-methyl-4-(β-sulfatoethyl-sulfonyl)-phenyl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 2-Methoxy-5-methyl-4-(β-sulfonyl)-ethyl | reddish-orange |
| 483 | 2-Methoxy-5-methyl-4-(β-sulfatoethyl-sulfonyl)-phenyl | 8-Hydroxy-6-sulfo-naphth-7-yl-3-ylamino | 1,1-Di-phen-cyclohexan-4'-ylamino-4''-ylamino | 8-Hydroxy-6-sulfo-naphth-7-yl-3-ylamino | 2-Methoxy-5-methyl-4-(β-sulfonyl)-ethyl | reddish-orange |
| 484 | 2-Methoxy-5-methyl-4-(β-sulfatoethyl-sulfonyl)-phenyl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 2-Methoxy-5-methyl-4-(β-sulfonyl)-ethyl | reddish-orange |
| 485 | 2-Methoxy-5-methyl-4-(β-sulfatoethyl-sulfonyl)-phenyl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 2-Methoxy-5-methyl-4-(β-sulfonyl)-ethyl | reddish-orange |
| 486 | 2-Methoxy-5-methyl-4-(β-sulfatoethyl-sulfonyl)-phenyl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 2-Methoxy-5-methyl-4-(β-sulfonyl)-ethyl | reddish-orange |
| 487 | 4-Vinylsulfonyl-phenyl | 8-Hydroxy-6-sulfo-naphth-7-yl-3-ylamino | Eth-1,2-di-ylamino | 8-Hydroxy-6-sulfo-naphth-7-yl-3-ylamino | 4-Vinylsulfonyl-phenyl | orange (478) |
| 488 | 4-Vinylsulfonyl-phenyl | 8-Hydroxy-6-sulfo-naphth-7-yl-3-ylamino | Prop-1,3-di-ylamino | 8-Hydroxy-6-sulfo-naphth-7-yl-3-ylamino | 4-Vinylsulfonyl-phenyl | orange |
| 489 | 4-Vinylsulfonyl- | 8-Hydroxy-6-sulfo-naphth- | But-1,4-di-ylamino | 8-Hydroxy-6-sulfo- | 4-Vinylsulfonyl- | orange |

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | | 7-yl-3-ylamino | | naphth-7-yl-3-ylamino | phenyl | |
| 490 | 4-Vinylsulfonyl-phenyl | 8-Hydroxy-6-sulfo-naphth-7-yl-3-ylamino | Hex-1,6-di-ylamino | 8-Hydroxy-6-sulfo-naphth-7-yl-3-ylamino | 4-Vinylsulfonyl-phenyl | orange |
| 491 | 4-Vinylsulfonyl-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 4-Vinylsulfonyl-phenyl | orange |
| 492 | 4-Vinylsulfonyl-phenyl | 8-Hydroxy-6-sulfo-naphth-7-yl-3-ylamino | Cyclohex-1,3-di-ylamino | 8-Hydroxy-6-sulfo-naphth-7-yl-3-ylamino | 4-Vinylsulfonyl-phenyl | orange |
| 493 | 4-Vinylsulfonyl-phenyl | 8-Hydroxy-6-sulfo-naphth-7-yl-3-ylamino | Prop-1,2-di-ylamino | 8-Hydroxy-6-sulfo-naphth-7-yl-3-ylamino | 4-Vinylsulfonyl-phenyl | orange |
| 494 | 4-Vinylsulfonyl-phenyl | 8-Hydroxy-6-sulfo-naphth-7-yl-3-ylamino | Cyclohex-1,3-di-(methylamino) | 8-Hydroxy-6-sulfo-naphth-7-yl-3-ylamino | 4-Vinylsulfonyl-phenyl | orange |
| 495 | 4-Vinylsulfonyl-phenyl | 8-Hydroxy-6-sulfo-naphth-7-yl-3-ylamino | Phen-1-ylamino-4-(N-methyl)-ylamino | 8-Hydroxy-6-sulfo-naphth-7-yl-3-ylamino | 4-Vinylsulfonyl-phenyl | orange |
| 496 | 4-Vinylsulfonyl-phenyl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 4-Vinylsulfonyl-phenyl | orange |
| 497 | 4-Vinylsulfonyl-phenyl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 4-Vinylsulfonyl-phenyl | orange |
| 498 | 4-Vinylsulfonyl-phenyl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 4-Vinylsulfonyl-phenyl | orange |
| 499 | 4-Vinylsulfonyl-phenyl | 8-Hydroxy-6-sulfo-naphth-7-yl-3-ylamino | Phen-1,4-di-ylamino | 8-Hydroxy-6-sulfo-naphth-7-yl-3-ylamino | 4-Vinylsulfonyl-phenyl | orange |
| 500 | 4-Vinylsulfonyl-phenyl | 8-Hydroxy-6-sulfo-naphth-7-yl-3-ylamino | Phen-1,3-di-ylamino | 8-Hydroxy-6-sulfo-naphth-7-yl-3-ylamino | 4-Vinylsulfonyl-phenyl | orange |
| 501 | 4-Vinylsulfonyl-phenyl | 8-Hydroxy-6-sulfo-naphth-7-yl-3-ylamino | Phen-1,2-di-ylamino | 8-Hydroxy-6-sulfo-naphth-7-yl-3-ylamino | 4-Vinylsulfonyl-phenyl | orange |
| 502 | 4-Vinylsulfonyl-phenyl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 4-Vinylsulfonyl-phenyl | orange |
| 503 | 4-Vinylsulfonyl-phenyl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 4-Vinylsulfonyl-phenyl | orange |
| 504 | 4-Vinylsulfonyl-phenyl | 8-Hydroxy-6-sulfo-naphth-7-yl-3-ylamino | 1,1-Di-phen-cyclohexan-4'-ylamino-4"-ylamino | 8-Hydroxy-6-sulfo-naphth-7-yl-3-ylamino | 4-Vinylsulfonyl-phenyl | orange |
| 505 | 4-Vinylsulfonyl-phenyl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 4-Vinylsulfonyl-phenyl | orange |
| 506 | 4-Vinylsulfonyl-phenyl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 4-Vinylsulfonyl-phenyl | orange |
| 507 | 4-Vinylsulfonyl-phenyl | 8-Hydroxy-6-sulfo-naphth-7-yl-3-ylamino | 3,3'-Dimetnhyl-6,6'-disulfo-1,1'-diphenyl-4,4'-di-ylamino | 8-Hydroxy-6-sulfo-naphth-7-yl-3-ylamino | 4-Vinylsulfonyl-phenyl | orange |
| 508 | 4-(β-Sulfato-ethylsulphonyl)-phenyl | 8-Hydroxy-6-sulfo-naphth-7-yl-2-ylamino | Eth-1,2-di-ylamino | 8-Hydroxy-6-sulfo-naphth-7-yl-2-ylamino | 4-(β-Sulfato-ethylsulfonyl)-phenyl | orange-brown |
| 509 | 4-(β-Sulfato-ethylsulphonyl)-phenyl | 8-Hydroxy-6-sulfo-naphth-7-yl-2-ylamino | Prop-1,3-di-ylamino | 8-Hydroxy-6-sulfo-naphth-7-yl-2-ylamino | 4-(β-Sulfato-ethylsulfonyl)-phenyl | orange-brown |
| 510 | 4-(β-Sulfato-ethylsulphonyl)-phenyl | 8-Hydroxy-6-sulfo-naphth-7-yl-2-ylamino | But-1,4-di-ylamino | 8-Hydroxy-6-sulfo-naphth-7-yl-2-ylamino | 4-(β-Sulfato-ethylsulfonyl)-phenyl | orange-brown |
| 511 | 4-(β-Sulfato-ethylsulphonyl)-phenyl | 8-Hydroxy-6-sulfo-naphth-7-yl-2-ylamino | Hex-1,6-di-ylamino | 8-Hydroxy-6-sulfo-naphth-7-yl-2-ylamino | 4-(β-Sulfato-ethylsulfonyl)-phenyl | orange-brown |
| 512 | 4-(β-Sulfato-ethylsulphonyl)-phenyl | 8-Hydroxy-6-sulfo-naphth-7-yl-2-ylamino | Cyclohex-1,4-di-ylamino | 8-Hydroxy-6-sulfo-naphth-7-yl-2-ylamino | 4-(β-Sulfato-ethylsulfonyl)-phenyl | orange-brown |
| 513 | 4-(β-Sulfato-ethylsulphonyl)-phenyl | 8-Hydroxy-6-sulfo-naphth-7-yl-2-ylamino | Cyclohex-1,3-di-ylamino | 8-Hydroxy-6-sulfo-naphth-7-yl-2-ylamino | 4-(β-Sulfato-ethylsulfonyl)-phenyl | orange-brown |
| 514 | 4-(β-Sulfato-ethylsulphonyl)-phenyl | 8-Hydroxy-6-sulfo-naphth-7-yl-2-ylamino | Prop-1,2-di-ylamino | 8-Hydroxy-6-sulfo-naphth-7-yl-2-ylamino | 4-(β-Sulfato-ethylsulfonyl)-phenyl | orange-brown |
| 515 | 4-(β-Sulfato-ethylsulphonyl)-phenyl | 8-Hydroxy-6-sulfo-naphth-7-yl-2-ylamino | Cyclohex-1,3-di-(methylamino) | 8-Hydroxy-6-sulfo-naphth-7-yl-2-ylamino | 4-(β-Sulfato-ethylsulfonyl)-phenyl | orange-brown |
| 516 | 4-(β-Sulfato-ethylsulphonyl)-phenyl | 8-Hydroxy-6-sulfo-naphth-7-yl-2-ylamino | Phen-1-ylamino-4-(N-methyl)-ylamino | 8-Hydroxy-6-sulfo-naphth-7-yl-2-ylamino | 4-(β-Sulfato-ethylsulfonyl)-phenyl | orange-brown |
| 517 | 4-(β-Sulfato-ethylsulphonyl)-phenyl | 8-Hydroxy-6-sulfo-naphth-7-yl-2-ylamino | 4-Sulfo-phen-1,3-di-ylamino | 8-Hydroxy-6-sulfo-naphth-7-yl-2-ylamino | 4-(β-Sulfato-ethylsulfonyl)-phenyl | orange-brown |
| 518 | 4-(β-Sulfato-ethylsulphonyl)-phenyl | 8-Hydroxy-6-sulfo-naphth-7-yl-2-ylamino | 3-Sulfo-phen-1,4-di-ylamino | 8-Hydroxy-6-sulfo-naphth-7-yl-2-ylamino | 4-(β-Sulfato-ethylsulfonyl)-phenyl | orange-brown |
| 519 | 4-(β-Sulfato-ethylsulphonyl)-phenyl | 8-Hydroxy-6-sulfo-naphth-7-yl-2-ylamino | N-Methyl-benzylamino-4'-ylamino | 8-Hydroxy-6-sulfo-naphth-7-yl-2-ylamino | 4-(β-Sulfato-ethylsulfonyl)-phenyl | orange-brown |
| 520 | 4-(β-Sulfato- | 8-Hydroxy-6-sulfo-naphth- | Phen-1,4-di-ylamino | 8-Hydroxy-6-sulfo- | 4-(β-Sulfato- | orange- |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | ethylsulphonyl)-phenyl | 7-yl-2-ylamino | | naphth-7-yl-2-ylamino | ethylsulfonyl)-phenyl | brown |
| 521 | 4-(β-Sulfato-ethylsulphonyl)-phenyl | 8-Hydroxy-6-sulfo-naphth-7-yl-2-ylamino | Phen-1,3-di-ylamino | 8-Hydroxy-6-sulfo-naphth-7-yl-2-ylamino | 4-(β-Sulfato-ethylsulfonyl)-phenyl | orange-brown |
| 522 | 4-(β-Sulfato-ethylsulphonyl)-phenyl | 8-Hydroxy-6-sulfo-naphth-7-yl-2-ylamino | Phen-1,2-di-ylamino | 8-Hydroxy-6-sulfo-naphth-7-yl-2-ylamino | 4-(β-Sulfato-ethylsulfonyl)-phenyl | orange-brown |
| 523 | 4-(β-Sulfato-ethylsulphonyl)-phenyl | 8-Hydroxy-6-sulfo-naphth-7-yl-2-ylamino | 3-Methyl-phen-1,4-di-ylamino | 8-Hydroxy-6-sulfo-naphth-7-yl-2-ylamino | 4-(β-Sulfato-ethylsulfonyl)-phenyl | orange-brown |
| 524 | 4-(β-Sulfato-ethylsulphonyl)-phenyl | 8-Hydroxy-6-sulfo-naphth-7-yl-2-ylamino | 4-Methoxy-phen-1,3-di-ylamino | 8-Hydroxy-6-sulfo-naphth-7-yl-2-ylamino | 4-(β-Sulfato-ethylsulfonyl)-phenyl | orange-brown |
| 525 | 4-(β-Sulfato-ethylsulphonyl)-phenyl | 8-Hydroxy-6-sulfo-naphth-7-yl-2-ylamino | 1,1-Di-phen-cyclohexan-4'-ylamino-4''-ylamino | 8-Hydroxy-6-sulfo-naphth-7-yl-2-ylamino | 4-(β-Sulfato-ethylsulfonyl)-phenyl | orange-brown |
| 526 | 4-(β-Sulfato-ethylsulphonyl)-phenyl | 8-Hydroxy-6-sulfo-naphth-7-yl-2-ylamino | 1-(Phenylamino)-phen-4,4'-di-ylamino | 8-Hydroxy-6-sulfo-naphth-7-yl-2-ylamino | 4-(β-Sulfato-ethylsulfonyl)-phenyl | orange-brown |
| 527 | 4-(β-Sulfato-ethylsulphonyl)-phenyl | 8-Hydroxy-6-sulfo-naphth-7-yl-2-ylamino | 3,3'-Dimethoxy-6,6'-disulfo-1,1'-diphenyl-4,4'-di-ylamino | 8-Hydroxy-6-sulfo-naphth-7-yl-2-ylamino | 4-(β-Sulfato-ethylsulfonyl)-phenyl | orange-brown |
| 528 | 4-(β-Sulfato-ethylsulphonyl)-phenyl | 8-Hydroxy-6-sulfo-naphth-7-yl-2-ylamino | 3,3'-Dimethyl-6,6'-disulfo-1,1'-diphenyl-4,4'-di-ylamino | 8-Hydroxy-6-sulfo-naphth-7-yl-2-ylamino | 4-(β-Sulfato-ethylsulfonyl)-phenyl | orange-brown |
| 529 | 3-(β-Sulfato-ethylsulphonyl)-phenyl | 8-Hydroxy-4,6-disulfo-naphth-7-yl-8-ylamino | Eth-1,2-di-ylamino | 8-Hydroxy-4,6-disulfo-naphth-7-yl-2-ylamino | 3-(β-Sulfato-ethylsulfonyl)-phenyl | red (510) |
| 530 | 3-(β-Sulfato-ethylsulphonyl)-phenyl | 8-Hydroxy-4,6-disulfo-naphth-7-yl-8-ylamino | Prop-1,3-di-ylamino | 8-Hydroxy-4,6-disulfo-naphth-7-yl-2-ylamino | 3-(β-Sulfato-ethylsulfonyl)-phenyl | red |
| 531 | 3-(β-Sulfato-ethylsulphonyl)-phenyl | 8-Hydroxy-4,6-disulfo-naphth-7-yl-8-ylamino | But-1,4-di-ylamino | 8-Hydroxy-4,6-disulfo-naphth-7-yl-2-ylamino | 3-(β-Sulfato-ethylsulfonyl)-phenyl | red |
| 532 | 3-(β-Sulfato-ethylsulphonyl)-phenyl | 8-Hydroxy-4,6-disulfo-naphth-7-yl-8-ylamino | Hex-1,6-di-ylamino | 8-Hydroxy-4,6-disulfo-naphth-7-yl-2-ylamino | 3-(β-Sulfato-ethylsulfonyl)-phenyl | red |
| 533 | 3-(β-Sulfato-ethylsulphonyl)-phenyl | 8-Hydroxy-4,6-disulfo-naphth-7-yl-8-ylamino | Cyclohex-1,4-di-ylamino | 8-Hydroxy-4,6-disulfo-naphth-7-yl-2-ylamino | 3-(β-Sulfato-ethylsulfonyl)-phenyl | red |
| 534 | 3-(β-Sulfato-ethylsulphonyl)-phenyl | 8-Hydroxy-4,6-disulfo-naphth-7-yl-8-ylamino | Cyclohex-1,3-di-ylamino | 8-Hydroxy-4,6-disulfo-naphth-7-yl-2-ylamino | 3-(β-Sulfato-ethylsulfonyl)-phenyl | red |
| 535 | 3-(β-Sulfato-ethylsulphonyl)-phenyl | 8-Hydroxy-4,6-disulfo-naphth-7-yl-8-ylamino | Prop-1,2-di-ylamino | 8-Hydroxy-4,6-disulfo-naphth-7-yl-2-ylamino | 3-(β-Sulfato-ethylsulfonyl)-phenyl | red |
| 536 | 3-(β-Sulfato-ethylsulphonyl)-phenyl | 8-Hydroxy-4,6-disulfo-naphth-7-yl-8-ylamino | Cyclohex-1,3-di-(methylamino) | 8-Hydroxy-4,6-disulfo-naphth-7-yl-2-ylamino | 3-(β-Sulfato-ethylsulfonyl)-phenyl | red |
| 537 | 3-(β-Sulfato-ethylsulphonyl)-phenyl | 8-Hydroxy-4,6-disulfo-naphth-7-yl-8-ylamino | Phen-1-ylamino-3-(N-methyl)-ylamino | 8-Hydroxy-4,6-disulfo-naphth-7-yl-2-ylamino | 3-(β-Sulfato-ethylsulfonyl)-phenyl | red |
| 538 | 3-(β-Sulfato-ethylsulphonyl)-phenyl | 8-Hydroxy-4,6-disulfo-naphth-7-yl-8-ylamino | 4-Sulfo-phen-1,3-di-ylamino | 8-Hydroxy-4,6-disulfo-naphth-7-yl-2-ylamino | 3-(β-Sulfato-ethylsulfonyl)-phenyl | red |
| 539 | 3-(β-Sulfato-ethylsulphonyl)-phenyl | 8-Hydroxy-4,6-disulfo-naphth-7-yl-8-ylamino | 3-Sulfo-phen-1,4-di-ylamino | 8-Hydroxy-4,6-disulfo-naphth-7-yl-2-ylamino | 3-(β-Sulfato-ethylsulfonyl)-phenyl | red |
| 540 | 3-(β-Sulfato-ethylsulphonyl)-phenyl | 8-Hydroxy-4,6-disulfo-naphth-7-yl-8-ylamino | N-Methyl-benzylamino-4'-ylamino | 8-Hydroxy-4,6-disulfo-naphth-7-yl-2-ylamino | 3-(β-Sulfato-ethylsulfonyl)-phenyl | red |
| 541 | 3-(β-Sulfato-ethylsulphonyl)-phenyl | 8-Hydroxy-4,6-disulfo-naphth-7-yl-8-ylamino | Phen-1,4-di-ylamino | 8-Hydroxy-4,6-disulfo-naphth-7-yl-2-ylamino | 3-(β-Sulfato-ethylsulfonyl)-phenyl | red |
| 542 | 3-(β-Sulfato-ethylsulphonyl)-phenyl | 8-Hydroxy-4,6-disulfo-naphth-7-yl-8-ylamino | Phen-1,3-di-ylamino | 8-Hydroxy-4,6-disulfo-naphth-7-yl-2-ylamino | 3-(β-Sulfato-ethylsulfonyl)-phenyl | red |
| 543 | 3-(β-Sulfato-ethylsulphonyl)-phenyl | 8-Hydroxy-4,6-disulfo-naphth-7-yl-8-ylamino | Phen-1,2-di-ylamino | 8-Hydroxy-4,6-disulfo-naphth-7-yl-2-ylamino | 3-(β-Sulfato-ethylsulfonyl)-phenyl | red |
| 544 | 3-(β-Sulfato-ethylsulphonyl)-phenyl | 8-Hydroxy-4,6-disulfo-naphth-7-yl-8-ylamino | 3-Methyl-phen-1,4-di-ylamino | 8-Hydroxy-4,6-disulfo-naphth-7-yl-2-ylamino | 3-(β-Sulfato-ethylsulfonyl)-phenyl | red |
| 545 | 3-(β-Sulfato-ethylsulphonyl)-phenyl | 8-Hydroxy-4,6-disulfo-naphth-7-yl-8-ylamino | 4-Methoxy-phen-1,3-di-ylamino | 8-Hydroxy-4,6-disulfo-naphth-7-yl-2-ylamino | 3-(β-Sulfato-ethylsulfonyl)-phenyl | red |

-continued

| | | | Azo dyestuff of the formula (A) | | | |
|---|---|---|---|---|---|---|
| Ex. | Radical $D^{10}$- | Radical -$K^{10}$-$N(R^{10})$- | Radical A° | Radical -$N(R^{11})$-$K^{11}$- | Radical $D^{11}$- | Color shade |
| 546 | 3-(β-Sulfato-ethylsulphonyl)-phenyl | 8-Hydroxy-4,6-disulfo-naphth-7-yl-8-ylamino | 1,1-Di-phen-cyclohexan-4'-ylamino-4"-ylamino | 8-Hydroxy-4,6-disulfo-naphth-7-yl-2-ylamino | 3-(β-Sulfato-ethylsulfonyl)-phenyl | red |
| 547 | 3-(β-Sulfato-ethylsulphonyl)-phenyl | 8-Hydroxy-4,6-disulfo-naphth-7-yl-8-ylamino | 1-(Phenylamino)-phen-4,4'-di-ylamino | 8-Hydroxy-4,6-disulfo-naphth-7-yl-2-ylamino | 3-(β-Sulfato-ethylsulfonyl)-phenyl | red |
| 548 | 3-(β-Sulfato-ethylsulphonyl)-phenyl | 8-Hydroxy-4,6-disulfo-naphth-7-yl-8-ylamino | 3,3'-Dimethoxy-6,6'-disulfo-1,1'-diphenyl-4,4'-di-ylamino | 8-Hydroxy-4,6-disulfo-naphth-7-yl-2-ylamino | 3-(β-Sulfato-ethylsulfonyl)-phenyl | red |
| 549 | 3-(β-Sulfato-ethylsulphonyl)-phenyl | 8-Hydroxy-4,6-disulfo-naphth-7-yl-8-ylamino | 3,3'-Dimethyl-6,6'-disulfo-1,1'-diphenyl-4,4'-di-ylamino | 8-Hydroxy-4,6-disulfo-naphth-7-yl-2-ylamino | 3-(β-Sulfato-ethylsulfonyl)-phenyl | red |
| 550 | 2-Sulfo-4-(β-sulfatoethyl-sulfonyl)-phenyl | 8-Hydroxy-4,6-disulfo-naphth-7-yl-8-ylamino | Eth-1,2-di-ylamino | 8-Hydroxy-4,6-disulfo-naphth-7-yl-2-ylamino | 2-Sulfo-4-(β-sulfatoethyl-sulfonyl)-phenyl | red (502) |
| 551 | 2-Sulfo-4-(β-sulfatoethyl-sulfonyl)-phenyl | 8-Hydroxy-4,6-disulfo-naphth-7-yl-8-ylamino | Prop-1,3-di-ylamino | 8-Hydroxy-4,6-disulfo-naphth-7-yl-2-ylamino | 2-Sulfo-4-(β-sulfatoethyl-sulfonyl)-phenyl | red |
| 552 | 2-Sulfo-4-(β-sulfatoethyl-sulfonyl)-phenyl | 8-Hydroxy-4,6-disulfo-naphth-7-yl-8-ylamino | But-1,4-di-ylamino | 8-Hydroxy-4,6-disulfo-naphth-7-yl-2-ylamino | 2-Sulfo-4-(β-sulfatoethyl-sulfonyl)-phenyl | red |
| 553 | 2-Sulfo-4-(β-sulfatoethyl-sulfonyl)-phenyl | 8-Hydroxy-4,6-disulfo-naphth-7-yl-8-ylamino | Hex-1,6-di-ylamino | 8-Hydroxy-4,6-disulfo-naphth-7-yl-2-ylamino | 2-Sulfo-4-(β-sulfatoethyl-sulfonyl)-phenyl | red |
| 554 | 2-Sulfo-4-(β-sulfatoethyl-sulfonyl)-phenyl | 8-Hydroxy-4,6-disulfo-naphth-7-yl-8-ylamino | Cyclohex-1,4-di-ylamino | 8-Hydroxy-4,6-disulfo-naphth-7-yl-2-ylamino | 2-Sulfo-4-(β-sulfatoethyl-sulfonyl)-phenyl | red |
| 555 | 2-Sulfo-4-(β-sulfatoethyl-sulfonyl)-phenyl | 8-Hydroxy-4,6-disulfo-naphth-7-yl-8-ylamino | Cyclohex-1,3-di-ylamino | 8-Hydroxy-4,6-disulfo-naphth-7-yl-2-ylamino | 2-Sulfo-4-(β-sulfatoethyl-sulfonyl)-phenyl | red |
| 556 | 2-Sulfo-4-(β-sulfatoethyl-sulfonyl)-phenyl | 8-Hydroxy-4,6-disulfo-naphth-7-yl-8-ylamino | Prop-1,2-di-ylamino | 8-Hydroxy-4,6-disulfo-naphth-7-yl-2-ylamino | 2-Sulfo-4-(β-sulfatoethyl-sulfonyl)-phenyl | red |
| 557 | 2-Sulfo-4-(β-sulfatoethyl-sulfonyl)-phenyl | 8-Hydroxy-4,6-disulfo-naphth-7-yl-8-ylamino | Cyclohex-1,3-di-(methylamino) | 8-Hydroxy-4,6-disulfo-naphth-7-yl-2-ylamino | 2-Sulfo-4-(β-sulfatoethyl-sulfonyl)-phenyl | red |
| 558 | 2-Sulfo-4-(β-sulfatoethyl-sulfonyl)-phenyl | 8-Hydroxy-4,6-disulfo-naphth-7-yl-8-ylamino | Phen-1-ylamino-4-(N-methyl)-ylamino | 8-Hydroxy-4,6-disulfo-naphth-7-yl-2-ylamino | 2-Sulfo-4-(β-sulfatoethyl-sulfonyl)-phenyl | red |
| 559 | 2-Sulfo-4-(β-sulfatoethyl-sulfonyl)-phenyl | 8-Hydroxy-4,6-disulfo-naphth-7-yl-8-ylamino | 4-Sulfo-phen-1,3-di-ylamino | 8-Hydroxy-4,6-disulfo-naphth-7-yl-2-ylamino | 2-Sulfo-4-(β-sulfatoethyl-sulfonyl)-phenyl | red |
| 560 | 2-Sulfo-4-(β-sulfatoethyl-sulfonyl)-phenyl | 8-Hydroxy-4,6-disulfo-naphth-7-yl-8-ylamino | 3-Sulfo-phen-1,4-di-ylamino | 8-Hydroxy-4,6-disulfo-naphth-7-yl-2-ylamino | 2-Sulfo-4-(β-sulfatoethyl-sulfonyl)-phenyl | red |
| 561 | 2-Sulfo-4-(β-sulfatoethyl-sulfonyl)-phenyl | 8-Hydroxy-4,6-disulfo-naphth-7-yl-8-ylamino | N-Methyl-benzylamino-4'-ylamino | 8-Hydroxy-4,6-disulfo-naphth-7-yl-2-ylamino | 2-Sulfo-4-(β-sulfatoethyl-sulfonyl)-phenyl | red |
| 562 | 2-Sulfo-4-(β-sulfatoethyl-sulfonyl)-phenyl | 8-Hydroxy-4,6-disulfo-naphth-7-yl-8-ylamino | Phen-1,4-di-ylamino | 8-Hydroxy-4,6-disulfo-naphth-7-yl-2-ylamino | 2-Sulfo-4-(β-sulfatoethyl-sulfonyl)-phenyl | red |
| 563 | 2-Sulfo-4-(β-sulfatoethyl-sulfonyl)-phenyl | 8-Hydroxy-4,6-disulfo-naphth-7-yl-8-ylamino | Phen-1,3-di-ylamino | 8-Hydroxy-4,6-disulfo-naphth-7-yl-2-ylamino | 2-Sulfo-4-(β-sulfatoethyl-sulfonyl)-phenyl | red |
| 564 | 2-Sulfo-4-(β-sulfatoethyl-sulfonyl)-phenyl | 8-Hydroxy-4,6-disulfo-naphth-7-yl-8-ylamino | Phen-1,2-di-ylamino | 8-Hydroxy-4,6-disulfo-naphth-7-yl-2-ylamino | 2-Sulfo-4-(β-sulfatoethyl-sulfonyl)-phenyl | red |
| 565 | 2-Sulfo-4-(β-sulfatoethyl-sulfonyl)-phenyl | 8-Hydroxy-4,6-disulfo-naphth-7-yl-8-ylamino | 3-Methyl-phen-1,4-di-ylamino | 8-Hydroxy-4,6-disulfo-naphth-7-yl-2-ylamino | 2-Sulfo-4-(β-sulfatoethyl-sulfonyl)-phenyl | red |
| 566 | 2-Sulfo-4-(β-sulfatoethyl-sulfonyl)-phenyl | 8-Hydroxy-4,6-disulfo-naphth-7-yl-8-ylamino | 4-Methoxy-phen-1,3-di-ylamino | 8-Hydroxy-4,6-disulfo-naphth-7-yl-2-ylamino | 2-Sulfo-4-(β-sulfatoethyl-sulfonyl)-phenyl | red |
| 567 | 2-Sulfo-4-(β-sulfatoethyl-sulfonyl)-phenyl | 8-Hydroxy-4,6-disulfo-naphth-7-yl-8-ylamino | 1,1-Di-phen-cyclohexan-4'-ylamino-4"-ylamino | 8-Hydroxy-4,6-disulfo-naphth-7-yl-2-ylamino | 2-Sulfo-4-(β-sulfatoethyl-sulfonyl)-phenyl | red |
| 568 | 2-Sulfo-4-(β-sulfatoethyl-sulfonyl)-phenyl | 8-Hydroxy-4,6-disulfo-naphth-7-yl-8-ylamino | 1-(Phenylamino)-phen-4,4'-di-ylamino | 8-Hydroxy-4,6-disulfo-naphth-7-yl-2-ylamino | 2-Sulfo-4-(β-sulfatoethyl-sulfonyl)-phenyl | red |
| 569 | 2-Sulfo-4-(β-sulfatoethyl-sulfonyl)-phenyl | 8-Hydroxy-4,6-disulfo-naphth-7-yl-8-ylamino | 3,3'-Dimethoxy-6,6'-disulfo-1,1'-diphenyl-4,4'-di-ylamino | 8-Hydroxy-4,6-disulfo-naphth-7-yl-2-ylamino | 2-Sulfo-4-(β-sulfatoethyl-sulfonyl)-phenyl | red |
| 570 | 2-Sulfo-4-(β-sulfatoethyl-sulfonyl)-phenyl | 8-Hydroxy-4,6-disulfo-naphth-7-yl-8-ylamino | 3,3'-Dimethyl-6,6'-disulfo-1,1'-diphenyl-4,4'-di-ylamino | 8-Hydroxy-4,6-disulfo-naphth-7-yl-2-ylamino | 2-Sulfo-4-(β-sulfatoethyl-sulfonyl)-phenyl | red |
| 571 | 2-Methoxy-5-(β-sulfatoethyl- | 8-Hydroxy-4,6-disulfo-naphth-7-yl-8-ylamino | Eth-1,2-di-ylamino | 8-Hydroxy-4,6-disulfo-naphth-7-yl-8-ylamino | 2-Methoxy-5-(β-sulfatoethyl- | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | sulfonyl)-phenyl | | | | sulfonyl)-phenyl | |
| 572 | 2-Methoxy-5-(β-sulfatoethyl-sulfonyl)-phenyl | 8-Hydroxy-4,6-disulfo-naphth-7-yl-8-ylamino | Prop-1,3-di-ylamino | 8-Hydroxy-4,6-disulfo-naphth-7-yl-8-ylamino | 2-Methoxy-5-(β-sulfatoethyl-sulfonyl)-phenyl | red |
| 573 | 2-Methoxy-5-(β-sulfatoethyl-sulfonyl)-phenyl | 8-Hydroxy-4,6-disulfo-naphth-7-yl-8-ylamino | But-1,4-di-ylamino | 8-Hydroxy-4,6-disulfo-naphth-7-yl-8-ylamino | 2-Methoxy-5-(β-sulfatoethyl-sulfonyl)-phenyl | red |
| 574 | 2-Methoxy-5-(β-sulfatoethyl-sulfonyl)-phenyl | 8-Hydroxy-4,6-disulfo-naphth-7-yl-8-ylamino | Hex-1,6-di-ylamino | 8-Hydroxy-4,6-disulfo-naphth-7-yl-8-ylamino | 2-Methoxy-5-(β-sulfatoethyl-sulfonyl)-phenyl | red |
| 575 | 2-Methoxy-5-(β-sulfatoethyl-sulfonyl)-phenyl | 8-Hydroxy-4,6-disulfo-naphth-7-yl-8-ylamino | Cyclohex-1,4-di-ylamino | 8-Hydroxy-4,6-disulfo-naphth-7-yl-8-ylamino | 2-Methoxy-5-(β-sulfatoethyl-sulfonyl)-phenyl | red |
| 576 | 2-Methoxy-5-(β-sulfatoethyl-sulfonyl)-phenyl | 8-Hydroxy-4,6-disulfo-naphth-7-yl-8-ylamino | Cyclohex-1,3-di-ylamino | 8-Hydroxy-4,6-disulfo-naphth-7-yl-8-ylamino | 2-Methoxy-5-(β-sulfatoethyl-sulfonyl)-phenyl | red |
| 577 | 2-Methoxy-5-(β-sulfatoethyl-sulfonyl)-phenyl | 8-Hydroxy-4,6-disulfo-naphth-7-yl-8-ylamino | Prop-1,2-di-ylamino | 8-Hydroxy-4,6-disulfo-naphth-7-yl-8-ylamino | 2-Methoxy-5-(β-sulfatoethyl-sulfonyl)-phenyl | red |
| 578 | 2-Methoxy-5-(β-sulfatoethyl-sulfonyl)-phenyl | 8-Hydroxy-4,6-disulfo-naphth-7-yl-8-ylamino | Cyclohex-1,3-di-(methylamino) | 8-Hydroxy-4,6-disulfo-naphth-7-yl-8-ylamino | 2-Methoxy-5-(β-sulfatoethyl-sulfonyl)-phenyl | red |
| 579 | 2-Methoxy-5-(β-sulfatoethyl-sulfonyl)-phenyl | 8-Hydroxy-4,6-disulfo-naphth-7-yl-8-ylamino | Phen-1-ylamino-4-(N-methyl)-ylamino | 8-Hydroxy-4,6-disulfo-naphth-7-yl-8-ylamino | 2-Methoxy-5-(β-sulfatoethyl-sulfonyl)-phenyl | red |
| 580 | 2-Methoxy-5-(β-sulfatoethyl-sulfonyl)-phenyl | 8-Hydroxy-4,6-disulfo-naphth-7-yl-8-ylamino | 4-Sulfo-phen-1,3-di-ylamino | 8-Hydroxy-4,6-disulfo-naphth-7-yl-8-ylamino | 2-Methoxy-5-(β-sulfatoethyl-sulfonyl)-phenyl | red |
| 581 | 2-Methoxy-5-(β-sulfatoethyl-sulfonyl)-phenyl | 8-Hydroxy-4,6-disulfo-naphth-7-yl-8-ylamino | 3-Sulfo-phen-1,4-di-ylamino | 8-Hydroxy-4,6-disulfo-naphth-7-yl-8-ylamino | 2-Methoxy-5-(β-sulfatoethyl-sulfonyl)-phenyl | red |
| 582 | 2-Methoxy-5-(β-sulfatoethyl-sulfonyl)-phenyl | 8-Hydroxy-4,6-disulfo-naphth-7-yl-8-ylamino | N-Methyl-benzylamino-4'-ylamino | 8-Hydroxy-4,6-disulfo-naphth-7-yl-8-ylamino | 2-Methoxy-5-(β-sulfatoethyl-sulfonyl)-phenyl | red |
| 583 | 2-Methoxy-5-(β-sulfatoethyl-sulfonyl)-phenyl | 8-Hydroxy-4,6-disulfo-naphth-7-yl-8-ylamino | Phen-1,4-di-ylamino | 8-Hydroxy-4,6-disulfo-naphth-7-yl-8-ylamino | 2-Methoxy-5-(β-sulfatoethyl-sulfonyl)-phenyl | red |
| 584 | 2-Methoxy-5-(β-sulfatoethyl-sulfonyl)-phenyl | 8-Hydroxy-4,6-disulfo-naphth-7-yl-8-ylamino | Phen-1,3-di-ylamino | 8-Hydroxy-4,6-disulfo-naphth-7-yl-8-ylamino | 2-Methoxy-5-(β-sulfatoethyl-sulfonyl)-phenyl | red |
| 585 | 2-Methoxy-5-(β-sulfatoethyl-sulfonyl)-phenyl | 8-Hydroxy-4,6-disulfo-naphth-7-yl-8-ylamino | Phen-1,2-di-ylamino | 8-Hydroxy-4,6-disulfo-naphth-7-yl-8-ylamino | 2-Methoxy-5-(β-sulfatoethyl-sulfonyl)-phenyl | red |
| 586 | 2-Methoxy-5-(β-sulfatoethyl-sulfonyl)-phenyl | 8-Hydroxy-4,6-disulfo-naphth-7-yl-8-ylamino | 3-Methyl-phen-1,4-di-ylamino | 8-Hydroxy-4,6-disulfo-naphth-7-yl-8-ylamino | 2-Methoxy-5-(β-sulfatoethyl-sulfonyl)-phenyl | red |
| 587 | 2-Methoxy-5-(β-sulfatoethyl-sulfonyl)-phenyl | 8-Hydroxy-4,6-disulfo-naphth-7-yl-8-ylamino | 4-Methoxy-phen-1,3-di-ylamino | 8-Hydroxy-4,6-disulfo-naphth-7-yl-8-ylamino | 2-Methoxy-5-(β-sulfatoethyl-sulfonyl)-phenyl | red |
| 588 | 2-Methoxy-5-(β-sulfatoethyl-sulfonyl)-phenyl | 8-Hydroxy-4,6-disulfo-naphth-7-yl-8-ylamino | 1,1-Di-phen-cyclohexan-4'-ylamino-4"-ylamino | 8-Hydroxy-4,6-disulfo-naphth-7-yl-8-ylamino | 2-Methoxy-5-(β-sulfatoethyl-sulfonyl)-phenyl | red |
| 589 | 2-Methoxy-5-(β-sulfatoethyl-sulfonyl)-phenyl | 8-Hydroxy-4,6-disulfo-naphth-7-yl-8-ylamino | 1-(Phenylamino)-phen-4,4'-di-ylamino | 8-Hydroxy-4,6-disulfo-naphth-7-yl-8-ylamino | 2-Methoxy-5-(β-sulfatoethyl-sulfonyl)-phenyl | red |
| 590 | 2-Methoxy-5-(β-sulfatoethyl-sulfonyl)-phenyl | 8-Hydroxy-4,6-disulfo-naphth-7-yl-8-ylamino | 3,3'-Dimethoxy-6,6'-disulfo-1,1'-diphenyl-4,4'-di-ylamino | 8-Hydroxy-4,6-disulfo-naphth-7-yl-8-ylamino | 2-Methoxy-5-(β-sulfatoethyl-sulfonyl)-phenyl | red |
| 591 | 2-Methoxy-5-(β-sulfatoethyl-sulfonyl)-phenyl | 8-Hydroxy-4,6-disulfo-naphth-7-yl-8-ylamino | 3,3'-Dimethyl-6,6'-disulfo-1,1'-diphenyl-4,4'-di-ylamino | 8-Hydroxy-4,6-disulfo-naphth-7-yl-8-ylamino | 2-Methoxy-5-(β-sulfatoethyl-sulfonyl)-phenyl | red |
| 592 | 4-Vinylsulfonyl-phenyl | 8-Hydroxy-4,6-disulfo-naphth-7-yl-8-ylamino | Eth-1,2-di-ylamino | 8-Hydroxy-4,6-disulfo-naphth-7-yl-8-ylamino | 4-Vinylsulfonyl-phenyl | red (507) |
| 593 | 4-Vinylsulfonyl-phenyl | 8-Hydroxy-4,6-disulfo-naphth-7-yl-8-ylamino | Prop-1,3-di-ylamino | 8-Hydroxy-4,6-disulfo-naphth-7-yl-8-ylamino | 4-Vinylsulfonyl-phenyl | red |
| 594 | 4-Vinylsulfonyl-phenyl | 8-Hydroxy-4,6-disulfo-naphth-7-yl-8-ylamino | But-1,4-di-ylamino | 8-Hydroxy-4,6-disulfo-naphth-7-yl-8-ylamino | 4-Vinylsulfonyl-phenyl | red |
| 595 | 4-Vinylsulfonyl-phenyl | 8-Hydroxy-4,6-disulfo-naphth-7-yl-8-ylamino | Hex-1,6-di-ylamino | 8-Hydroxy-4,6-disulfo-naphth-7-yl-8-ylamino | 4-Vinylsulfonyl-phenyl | red |
| 596 | 4-Vinylsulfonyl-phenyl | 8-Hydroxy-4,6-disulfo-naphth-7-yl-8-ylamino | Cyclohex-1,4-di-ylamino | 8-Hydroxy-4,6-disulfo-naphth-7-yl-8-ylamino | 4-Vinylsulfonyl-phenyl | red |
| 597 | 4-Vinylsulfonyl-phenyl | 8-Hydroxy-4,6-disulfo-naphth-7-yl-8-ylamino | Cyclohex-1,3-di-ylamino | 8-Hydroxy-4,6-disulfo-naphth-7-yl-8-ylamino | 4-Vinylsulfonyl-phenyl | red |
| 598 | 4-Vinylsulfonyl-phenyl | 8-Hydroxy-4,6-disulfo-naphth-7-yl-8-ylamino | Prop-1,2-di-ylamino | 8-Hydroxy-4,6-disulfo-naphth-7-yl-8-ylamino | 4-Vinylsulfonyl-phenyl | red |
| 599 | 4-Vinylsulfonyl-phenyl | 8-Hydroxy-4,6-disulfo-naphth-7-yl-8-ylamino | Cyclohex-1,3-di-(methylamino) | 8-Hydroxy-4,6-disulfo-naphth-7-yl-8-ylamino | 4-Vinylsulfonyl-phenyl | red |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| 600 | 4-Vinylsulfonyl-phenyl | 8-Hydroxy-4,6-disulfo-naphth-7-yl-8-ylamino | Phen-1-ylamino-4-(N-methyl)-ylamino | 8-Hydroxy-4,6-disulfo-naphth-7-yl-8-ylamino | 4-Vinylsulfonyl-phenyl | red |
| 601 | 4-Vinylsulfonyl-phenyl | 8-Hydroxy-4,6-disulfo-naphth-7-yl-8-ylamino | 4-Sulfo-phen-1,3-di-ylamino | 8-Hydroxy-4,6-disulfo-naphth-7-yl-8-ylamino | 4-Vinylsulfonyl-phenyl | red |
| 602 | 4-Vinylsulfonyl-phenyl | 8-Hydroxy-4,6-disulfo-naphth-7-yl-8-ylamino | 3-Sulfo-phen-1,4-di-ylamino | 8-Hydroxy-4,6-disulfo-naphth-7-yl-8-ylamino | 4-Vinylsulfonyl-phenyl | red |
| 603 | 4-Vinylsulfonyl-phenyl | 8-Hydroxy-4,6-disulfo-naphth-7-yl-8-ylamino | N-Methyl-benzylamino-4'-ylamino | 8-Hydroxy-4,6-disulfo-naphth-7-yl-8-ylamino | 4-Vinylsulfonyl-phenyl | red |
| 604 | 4-Vinylsulfonyl-phenyl | 8-Hydroxy-4,6-disulfo-naphth-7-yl-8-ylamino | Phen-1,4-di-ylamino | 8-Hydroxy-4,6-disulfo-naphth-7-yl-8-ylamino | 4-Vinylsulfonyl-phenyl | red |
| 605 | 4-Vinylsulfonyl-phenyl | 8-Hydroxy-4,6-disulfo-naphth-7-yl-8-ylamino | Phen-1,3-di-ylamino | 8-Hydroxy-4,6-disulfo-naphth-7-yl-8-ylamino | 4-Vinylsulfonyl-phenyl | red |
| 606 | 4-Vinylsulfonyl-phenyl | 8-Hydroxy-4,6-disulfo-naphth-7-yl-8-ylamino | Phen-1,2-di-ylamino | 8-Hydroxy-4,6-disulfo-naphth-7-yl-8-ylamino | 4-Vinylsulfonyl-phenyl | red |
| 607 | 4-Vinylsulfonyl-phenyl | 8-Hydroxy-4,6-disulfo-naphth-7-yl-8-ylamino | 3-Methyl-phen-1,4-di-ylamino | 8-Hydroxy-4,6-disulfo-naphth-7-yl-8-ylamino | 4-Vinylsulfonyl-phenyl | red |
| 608 | 4-Vinylsulfonyl-phenyl | 8-Hydroxy-4,6-disulfo-naphth-7-yl-8-ylamino | 4-Methoxy-phen-1,3-di-ylamino | 8-Hydroxy-4,6-disulfo-naphth-7-yl-8-ylamino | 4-Vinylsulfonyl-phenyl | red |
| 609 | 4-Vinylsulfonyl-phenyl | 8-Hydroxy-4,6-disulfo-naphth-7-yl-8-ylamino | 1,1-Di-phen-cyclohexan-4'-ylamino-4"-ylamino | 8-Hydroxy-4,6-disulfo-naphth-7-yl-8-ylamino | 4-Vinylsulfonyl-phenyl | red |
| 610 | 4-Vinylsulfonyl-phenyl | 8-Hydroxy-4,6-disulfo-naphth-7-yl-8-ylamino | 1-(Phenylamino)-phen-4,4'-di-ylamino | 8-Hydroxy-4,6-disulfo-naphth-7-yl-8-ylamino | 4-Vinylsulfonyl-phenyl | red |
| 611 | 4-Vinylsulfonyl-phenyl | 8-Hydroxy-4,6-disulfo-naphth-7-yl-8-ylamino | 3,3'-Dimethoxy-6,6'-disulfo-1,1'-diphenyl-4,4'-di-ylamino | 8-Hydroxy-4,6-disulfo-naphth-7-yl-8-ylamino | 4-Vinylsulfonyl-phenyl | red |
| 612 | 4-Vinylsulfonyl-phenyl | 8-Hydroxy-4,6-disulfo-naphth-7-yl-8-ylamino | 3,3'-Dimethyl-6,6'-disulfo-1,1'-diphenyl-4,4'-di-ylamino | 8-Hydroxy-4,6-disulfo-naphth-7-yl-8-ylamino | 4-Vinylsulfonyl-phenyl | red |
| 613 | 2,5-Dimethoxy-4-(β-sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 2,5-Dimethoxy-4-(β-sulfatoethyl-sulfonyl)-phenyl | red brown |
| 614 | 2,5-Dimethoxy-4-(β-sulfatoethyl-sulfonyl)-phenyl | 8-Hydroxy-6-sulfo-naphth-7-yl-3-ylamino | Prop-1,3-di-ylamino | 8-Hydroxy-6-sulfo-naphth-7-yl-3-ylamino | 2,5-Dimethoxy-4-(β-sulfatoethyl-sulfonyl)-phenyl | red-brown |
| 615 | 2,5-Dimethoxy-4-(β-sulfatoethyl-sulfonyl)-phenyl | 8-Hydroxy-6-sulfo-naphth-7-yl-3-ylamino | But-1,4-di-ylamino | 8-Hydroxy-6-sulfo-naphth-7-yl-3-ylamino | 2,5-Dimethoxy-4-(β-sulfatoethyl-sulfonyl)-phenyl | red-brown |
| 616 | 2,5-Dimethoxy-4-(β-sulfatoethyl-sulfonyl)-phenyl | 8-Hydroxy-6-sulfo-naphth-7-yl-3-ylamino | Hex-1,6-di-ylamino | 8-Hydroxy-6-sulfo-naphth-7-yl-3-ylamino | 2,5-Dimethoxy-4-(β-sulfatoethyl-sulfonyl)-phenyl | red-brown |
| 617 | 2,5-Dimethoxy-4-(β-sulfatoethyl-sulfonyl)-phenyl | 8-Hydroxy-6-sulfo-naphth-7-yl-3-ylamino | Piperazin-1,4-ylen | 8-Hydroxy-6-sulfo-naphth-7-yl-3-ylamino | 2,5-Dimethoxy-4-(β-sulfatoethyl-sulfonyl)-phenyl | red-brown |
| 618 | 2,5-Dimethoxy-4-(β-sulfatoethyl-sulfonyl)-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 2,5-Dimethoxy-4-(β-sulfatoethyl-sulfonyl)-phenyl | red-brown |
| 619 | 2,5-Dimethoxy-4-(β-sulfatoethyl-sulfonyl)-phenyl | 8-Hydroxy-6-sulfo-naphth-7-yl-3-ylamino | Prop-1,2-di-ylamino | 8-Hydroxy-6-sulfo-naphth-7-yl-3-ylamino | 2,5-Dimethoxy-4-(β-sulfatoethyl-sulfonyl)-phenyl | red-brown |
| 620 | 2,5-Dimethoxy-4-(β-sulfatoethyl-sulfonyl)-phenyl | 8-Hydroxy-6-sulfo-naphth-7-yl-3-ylamino | Cyclohex-1,3-di-ylamino | 8-Hydroxy-6-sulfo-naphth-7-yl-3-ylamino | 2,5-Dimethoxy-4-(β-sulfatoethyl-sulfonyl)-phenyl | red-brown |
| 621 | 2-Methoxy-5-methyl-4-(β-sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 2-Methoxy-5-methyl-4-(β-sulfatoethyl-sulfonyl)-phenyl | red |
| 622 | 2-Methoxy-5-methyl-4-(β-sulfatoethyl-sulfonyl)-phenyl | 8-Hydroxy-6-sulfo-naphth-7-yl-3-ylamino | Prop-1,3-di-ylamino | 8-Hydroxy-6-sulfo-naphth-7-yl-3-ylamino | 2-Methoxy-5-methyl-4-(β-sulfatoethyl-sulfonyl)-phenyl | red |
| 623 | 2-Methoxy-5-methyl-4-(β-sulfatoethyl-sulfonyl)-phenyl | 8-Hydroxy-6-sulfo-naphth-7-yl-3-ylamino | But-1,4-di-ylamino | 8-Hydroxy-6-sulfo-naphth-7-yl-3-ylamino | 2-Methoxy-5-methyl-4-(β-sulfatoethyl-sulfonyl)-phenyl | red |
| 624 | 2-Methoxy-5-methyl-4-(β-sulfatoethyl-sulfonyl)-phenyl | 8-Hydroxy-6-sulfo-naphth-7-yl-3-ylamino | Piperazin-1,4-ylen | 8-Hydroxy-6-sulfo-naphth-7-yl-3-ylamino | 2-Methoxy-5-methyl-4-(β-sulfatoethyl-sulfonyl)-phenyl | red |
| 625 | 2-Methoxy-5-methyl-4-(β-sulfatoethyl-sulfonyl)-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 2-Methoxy-5-methyl-4-(β-sulfatoethyl-sulfonyl)-phenyl | red |
| 626 | 2-Methoxy-5-methyl-4-(β-sulfatoethyl-sulfonyl)-phenyl | 8-Hydroxy-6-sulfo-naphth-7-yl-3-ylamino | Prop-1,2-di-ylamino | 8-Hydroxy-6-sulfo-naphth-7-yl-3-ylamino | 2-Methoxy-5-methyl-4-(β-sulfatoethyl-sulfonyl)-phenyl | red |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| 627 | 2-Methoxy-5-methyl-4-(β-sulfatoethyl-sulfonyl)-phenyl | 8-Hydroxy-6-sulfo-naphth-7-yl-3-ylamino | Cyclohex-1,3-di-ylamino | 8-Hydroxy-6-sulfo-naphth-7-yl-3-ylamino | 2-Methoxy-5-methyl-4-(β-sulfatoethyl-sulfonyl)-phenyl | red |
| 628 | 2-Methoxy-5-methyl-4-(β-sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 2-Methoxy-5-methyl-4-(β-sulfatoethyl-sulfonyl)-phenyl | red |
| 629 | 1-Sulfo-6-(β-sulfatoethyl-sulfonyl)-naphth-2-yl | 8-Hydroxy-6-sulfo-naphth-7-yl-3-ylamino | Eth-1,2-di-ylamino | 8-Hydroxy-6-sulfo-naphth-7-yl-3-ylamino | 1-Sulfo-6-(β-sulfatoethyl-sulfonyl)-naphth-2-yl | orange (482) |
| 630 | 1-Sulfo-6-(β-sulfatoethyl-sulfonyl)-naphth-2-yl | 8-Hydroxy-6-sulfo-naphth-7-yl-3-ylamino | Prop-1,3-di-ylamino | 8-Hydroxy-6-sulfo-naphth-7-yl-3-ylamino | 1-Sulfo-6-(β-sulfatoethyl-sulfonyl)-naphth-2-yl | orange |
| 631 | 1-Sulfo-6-(β-sulfatoethyl-sulfonyl)-naphth-2-yl | 8-Hydroxy-6-sulfo-naphth-7-yl-3-ylamino | But-1,4-di-ylamino | 8-Hydroxy-6-sulfo-naphth-7-yl-3-ylamino | 1-Sulfo-6-(β-sulfatoethyl-sulfonyl)-naphth-2-yl | orange |
| 632 | 1-Sulfo-6-(β-sulfatoethyl-sulfonyl)-naphth-2-yl | 8-Hydroxy-6-sulfo-naphth-7-yl-3-ylamino | Hex-1,6-di-ylamino | 8-Hydroxy-6-sulfo-naphth-7-yl-3-ylamino | 1-Sulfo-6-(β-sulfatoethyl-sulfonyl)-naphth-2-yl | orange |
| 633 | 1-Sulfo-6-(β-sulfatoethyl-sulfonyl)-naphth-2-yl | 8-Hydroxy-6-sulfo-naphth-7-yl-3-ylamino | Piperazine-1,4-ylen | 8-Hydroxy-6-sulfo-naphth-7-yl-3-ylamino | 1-Sulfo-6-(β-sulfatoethyl-sulfonyl)-naphth-2-yl | orange |
| 634 | 1-Sulfo-6-(β-sulfatoethyl-sulfonyl)-naphth-2-yl | 8-Hydroxy-6-sulfo-naphth-7-yl-3-ylamino | Cyclohex-1,4-di-ylamino | 8-Hydroxy-6-sulfo-naphth-7-yl-3-ylamino | 1-Sulfo-6-(β-sulfatoethyl-sulfonyl)-naphth-2-yl | orange |
| 635 | 1-Sulfo-6-(β-sulfatoethyl-sulfonyl)-naphth-2-yl | 8-Hydroxy-6-sulfo-naphth-7-yl-3-ylamino | Prop-1,2-di-ylamino | 8-Hydroxy-6-sulfo-naphth-7-yl-3-ylamino | 1-Sulfo-6-(β-sulfatoethyl-sulfonyl)-naphth-2-yl | orange |
| 636 | 1-Sulfo-6-(β-sulfatoethyl-sulfonyl)-naphth-2-yl | 8-Hydroxy-6-sulfo-naphth-7-yl-3-ylamino | Cyclohex-1,3-di-ylamino | 8-Hydroxy-6-sulfo-naphth-7-yl-3-ylamino | 1-Sulfo-6-(β-sulfatoethyl-sulfonyl)-naphth-2-yl | orange |
| 637 | 6-(β-Sulfatoethyl-sulfonyl)-naphth-2-yl | 8-Hydroxy-6-sulfo-naphth-7-yl-3-ylamino | Eth-1,2-di-ylamino | 8-Hydroxy-6-sulfo-naphth-7-3-ylamino | 6-(β-Sulfatoethyl-sulfonyl)-naphth-2-yl | orange (487) |
| 638 | 6-(β-Sulfatoethyl-sulfonyl)-naphth-2-yl | 8-Hydroxy-6-sulfo-naphth-7-yl-3-ylamino | Prop-1,3-di-ylamino | 8-Hydroxy-6-sulfo-naphth-7-3-ylamino | 6-(β-Sulfatoethyl-sulfonyl)-naphth-2-yl | orange |
| 639 | 6-(β-Sulfatoethyl-sulfonyl)-naphth-2-yl | 8-Hydroxy-6-sulfo-naphth-7-yl-3-ylamino | But-1,4-di-ylamino | 8-Hydroxy-6-sulfo-naphth-7-3-ylamino | 6-(β-Sulfatoethyl-sulfonyl)-naphth-2-yl | orange |
| 640 | 6-(β-Sulfatoethyl-sulfonyl)-naphth-2-yl | 8-Hydroxy-6-sulfo-naphth-7-yl-3-ylamino | Hex-1,6-di-ylamino | 8-Hydroxy-6-sulfo-naphth-7-3-ylamino | 6-(β-Sulfatoethyl-sulfonyl)-naphth-2-yl | orange |
| 641 | 6-(β-Sulfatoethyl-sulfonyl)-naphth-2-yl | 8-Hydroxy-6-sulfo-naphth-7-yl-3-ylamino | Piperazin-1,4-ylen | 8-Hydroxy-6-sulfo-naphth-7-3-ylamino | 6-(β-Sulfatoethyl-sulfonyl)-naphth-2-yl | orange |
| 642 | 6-(β-Sulfatoethyl-sulfonyl)-naphth-2-yl | 8-Hydroxy-6-sulfo-naphth-7-yl-3-ylamino | Cyclohex-1,4-di-ylamino | 8-Hydroxy-6-sulfo-naphth-7-3-ylamino | 6-(β-Sulfatoethyl-sulfonyl)-naphth-2-yl | orange |
| 643 | 6-(β-Sulfatoethyl-sulfonyl)-naphth-2-yl | 8-Hydroxy-6-sulfo-naphth-7-yl-3-ylamino | Prop-1,2-di-ylamino | 8-Hydroxy-6-sulfo-naphth-7-3-ylamino | 6-(β-Sulfatoethyl-sulfonyl)-naphth-2-yl | orange |
| 644 | 6-(β-Sulfatoethyl-sulfonyl)-naphth-2-yl | 8-Hydroxy-6-sulfo-naphth-7-yl-3-ylamino | Cyclohex-1,3-di-ylamino | 8-Hydroxy-6-sulfo-naphth-7-3-ylamino | 6-(β-Sulfatoethyl-sulfonyl)-naphth-2-yl | orange |
| 645 | 1-Sulfo-6-(β-sulfatoethyl-sulfonyl)-naphth-2-yl | 8-Hydroxy-6-sulfo-naphth-7-yl-3-ylamino | 4-Sulfo-phen-1,3-di-ylamino | 8-Hydroxy-6-sulfo-naphth-7-3-ylamino | 1-Sulfo-6-(β-sulfatoethyl-sulfonyl)-naphth-2-yl | orange (488) |
| 646 | 1-Sulfo-6-(β-sulfatoethyl-sulfonyl)-naphth-2-yl | 8-Hydroxy-6-sulfo-naphth-7-yl-3-ylamino | 3-Sulfo-phen-1,4-di-ylamino | 8-Hydroxy-6-sulfo-naphth-7-3-ylamino | 1-Sulfo-6-(β-sulfatoethyl-sulfonyl)-naphth-2-yl | orange |
| 647 | 1-Sulfo-6-(β-sulfatoethyl-sulfonyl)-naphth-2-yl | 8-Hydroxy-6-sulfo-naphth-7-yl-3-ylamino | N-Methyl-benzylamino-4'-ylamino | 8-Hydroxy-6-sulfo-naphth-7-3-ylamino | 1-Sulfo-6-(β-sulfatoethyl-sulfonyl)-naphth-2-yl | orange |
| 648 | 1-Sulfo-6-(β- | 8-Hydroxy-6-sulfo-naphth- | Phen-1,4-di-ylamino | 8-Hydroxy-6-sulfo- | 1-Sulfo-6-(β- | orange |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | sulfatoethyl-sulfonyl)-naphth-2-yl | 7-yl-3-ylamino | | naphth-7-yl-3-ylamino | sulfatoethyl-sulfonyl)-naphth-2-yl | |
| 649 | 1-Sulfo-6-(β-sulfatoethyl-sulfonyl)-naphth-2-yl | 8-Hydroxy-6-sulfo-naphth-7-yl-3-ylamino | Phen-1,3-di-ylamino | 8-Hydroxy-6-sulfo-naphth-7-yl-3-ylamino | 1-Sulfo-6-(β-sulfatoethyl-sulfonyl)-naphth-2-yl | orange |
| 650 | 1-Sulfo-6-(β-sulfatoethyl-sulfonyl)-naphth-2-yl | 8-Hydroxy-6-sulfo-naphth-7-yl-3-ylamino | Phen-1,2-di-ylamino | 8-Hydroxy-6-sulfo-naphth-7-yl-3-ylamino | 1-Sulfo-6-(β-sulfatoethyl-sulfonyl)-naphth-2-yl | orange |
| 651 | 1-Sulfo-6-(β-sulfatoethyl-sulfonyl)-naphth-2-yl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 1-Sulfo-6-(β-sulfatoethyl-sulfonyl)-naphth-2-yl | orange |
| 652 | 1-Sulfo-6-(β-sulfatoethyl-sulfonyl)-naphth-2-yl | 8-Hydroxy-6-sulfo-naphth-7-yl-3-ylamino | 4-Methyl-phen-1,3-di-ylamino | 8-Hydroxy-6-sulfo-naphth-7-yl-3-ylamino | 1-Sulfo-6-(β-sulfatoethyl-sulfonyl)-naphth-2-yl | orange |
| 653 | 1-Sulfo-6-(β-sulfatoethyl-sulfonyl)-naphth-2-yl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 1-Sulfo-6-(β-sulfatoethyl-sulfonyl)-naphth-2-yl | orange |
| 654 | 1-Sulfo-6-(β-sulfatoethyl-sulfonyl)-naphth-2-yl | 8-Hydroxy-6-sulfo-naphth-7-yl-3-ylamino | 1,1-Di-phen-cyclohexan-4'-ylamino-4"-ylamino | 8-Hydroxy-6-sulfo-naphth-7-yl-3-ylamino | 1-Sulfo-6-(β-sulfatoethyl-sulfonyl)-naphth-2-yl | orange |
| 655 | 1-Sulfo-6-(β-sulfatoethyl-sulfonyl)-naphth-2-yl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 1-Sulfo-6-(β-sulfatoethyl-sulfonyl)-naphth-2-yl | orange |
| 656 | 1-Sulfo-6-(β-sulfatoethyl-sulfonyl)-naphth-2-yl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 1-Sulfo-6-(β-sulfatoethyl-sulfonyl)-naphth-2-yl | orange |
| 657 | 1-Sulfo-6-(β-sulfatoethyl-sulfonyl)-naphth-2-yl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 1-Sulfo-6-(β-sulfatoethyl-sulfonyl)-naphth-2-yl | orange |
| 658 | 6-(β-Sulfatoethyl-sulfonyl)-naphth-2-yl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 6-(β-Sulfatoethyl-sulfonyl)-naphth-2-yl | orange (492) |
| 659 | 6-(β-Sulfatoethyl-sulfonyl)-naphth-2-yl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 6-(β-Sulfatoethyl-sulfonyl)-naphth-2-yl | orange |
| 660 | 6-(β-Sulfatoethyl-sulfonyl)-naphth-2-yl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 6-(β-Sulfatoethyl-sulfonyl)-naphth-2-yl | orange |
| 661 | 6-(β-Sulfatoethyl-sulfonyl)-naphth-2-yl | 8-Hydroxy-6-sulfo-naphth-7-yl-3-ylamino | Phen-1,4-di-ylamino | 8-Hydroxy-6-sulfo-naphth-7-yl-3-ylamino | 6-(β-Sulfatoethyl-sulfonyl)-naphth-2-yl | orange |
| 662 | 6-(β-Sulfatoethyl-sulfonyl)-naphth-2-yl | 8-Hydroxy-6-sulfo-naphth-7-yl-3-ylamino | Phen-1,3-di-ylamino | 8-Hydroxy-6-sulfo-naphth-7-yl-3-ylamino | 6-(β-Sulfatoethyl-sulfonyl)-naphth-2-yl | orange |
| 663 | 6-(β-Sulfatoethyl-sulfonyl)-naphth-2-yl | 8-Hydroxy-6-sulfo-naphth-7-yl-3-ylamino | Phen-1,2-di-ylamino | 8-Hydroxy-6-sulfo-naphth-7-yl-3-ylamino | 6-(β-Sulfatoethyl-sulfonyl)-naphth-2-yl | orange |
| 664 | 6-(β-Sulfatoethyl-sulfonyl)-naphth-2-yl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 6-(β-Sulfatoethyl-sulfonyl)-naphth-2-yl | orange |
| 665 | 6-(β-Sulfatoethyl-sulfonyl)-naphth-2-yl | 8-Hydroxy-6-sulfo-naphth-7-yl-3-ylamino | 4-Methyl-phen-1,3-di-ylamino | 8-Hydroxy-6-sulfo-naphth-7-yl-3-ylamino | 6-(β-Sulfatoethyl-sulfonyl)-naphth-2-yl | orange |
| 666 | 6-(β-Sulfatoethyl-sulfonyl)-naphth-2-yl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 6-(β-Sulfatoethyl-sulfonyl)-naphth-2-yl | orange |
| 667 | 6-(β-Sulfatoethyl-sulfonyl)-naphth-2-yl | 8-Hydroxy-6-sulfo-naphth-7-yl-3-ylamino | 1,1-Di-phen-cyclohexan-4'-ylamino- | 8-Hydroxy-6-sulfo-naphth-7-yl-3-ylamino | 6-(β-Sulfatoethyl-sulfonyl)-naphth-2-yl | orange |
| 668 | 6-(β-Sulfatoethyl-sulfonyl)-naphth-2-yl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 6-(β-Sulfatoethyl-sulfonyl)-naphth-2-yl | orange |
| 669 | 6-(β-Sulfatoethyl-sulfonyl)-naphth-2-yl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 6-(β-Sulfatoethyl-sulfonyl)-naphth-2-yl | orange |
| 670 | 6-(β-Sulfatoethyl-sulfonyl)-naphth- | 8-Hydroxy-6-sulfo-naphth-7-yl-3-ylamino | 3,3'-Dimethyl-6,6'-disulfo-1,1'-diphenyl- | 8-Hydroxy-6-sulfo-naphth-7-yl-3-ylamino | 6-(β-Sulfatoethyl-sulfonyl)-naphth- | |

-continued

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
| 671 | 8-(β-Sulfatoethyl-sulfonyl)-naphth-2-yl | 8-Hydroxy-6-sulfo-naphth-7-yl-3-ylamino | 4,4'-di-ylamino 4-Sulfo-phen-1,3-di-ylamino | 8-Hydroxy-6-sulfo-naphth-7-yl-3-ylamino | 8-(β-Sulfatoethyl-sulfonyl)-naphth-2-yl | orange (498) |
| 672 | 8-(β-Sulfatoethyl-sulfonyl)-naphth-2-yl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 8-(β-Sulfatoethyl-sulfonyl)-naphth-2-yl | orange |
| 673 | 8-(β-Sulfatoethyl-sulfonyl)-naphth-2-yl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 8-(β-Sulfatoethyl-sulfonyl)-naphth-2-yl | orange |
| 674 | 8-(β-Sulfatoethyl-sulfonyl)-naphth-2-yl | 8-Hydroxy-6-sulfo-naphth-7-yl-3-ylamino | Phen-1,4-di-ylamino | 8-Hydroxy-6-sulfo-naphth-7-yl-3-ylamino | 8-(β-Sulfatoethyl-sulfonyl)-naphth-2-yl | orange |
| 675 | 8-(β-Sulfatoethyl-sulfonyl)-naphth-2-yl | 8-Hydroxy-6-sulfo-naphth-7-yl-3-ylamino | Phen-1,3-di-ylamino | 8-Hydroxy-6-sulfo-naphth-7-yl-3-ylamino | 8-(β-Sulfatoethyl-sulfonyl)-naphth-2-yl | orange |
| 676 | 8-(β-Sulfatoethyl-sulfonyl)-naphth-2-yl | 8-Hydroxy-6-sulfo-naphth-7-yl-3-ylamino | Phen-1,2-di-ylamino | 8-Hydroxy-6-sulfo-naphth-7-yl-3-ylamino | 8-(β-Sulfatoethyl-sulfonyl)-naphth-2-yl | orange |
| 677 | 8-(β-Sulfatoethyl-sulfonyl)-naphth-2-yl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 8-(β-Sulfatoethyl-sulfonyl)-naphth-2-yl | orange |
| 678 | 8-(β-Sulfatoethyl-sulfonyl)-naphth-2-yl | 8-Hydroxy-6-sulfo-naphth-7-yl-3-ylamino | 4-Methyl-phen-1,3-di-ylamino | 8-Hydroxy-6-sulfo-naphth-7-yl-3-ylamino | 8-(β-Sulfatoethyl-sulfonyl)-naphth-2-yl | orange |
| 679 | 8-(β-Sulfatoethyl-sulfonyl)-naphth-2-yl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 8-(β-Sulfatoethyl-sulfonyl)-naphth-2-yl | orange |
| 680 | 8-(β-Sulfatoethyl-sulfonyl)-naphth-2-yl | 8-Hydroxy-6-sulfo-naphth-7-yl-3-ylamino | 1,1-Di-phen-cyclohexan-4'-ylamino-4''-ylamino | 8-Hydroxy-6-sulfo-naphth-7-yl-3-ylamino | 8-(β-Sulfatoethyl-sulfonyl)-naphth-2-yl | orange |
| 681 | 8-(β-Sulfatoethyl-sulfonyl)-naphth-2-yl | 8-Hydroxy-6-sulfo-naphth-7-yl-3-ylamino | 1-(Phenylamino)-phen-4,4'-di-ylamino | 8-Hydroxy-6-sulfo-naphth-7-yl-3-ylamino | 8-(β-Sulfatoethyl-sulfonyl)-naphth-2-yl | orange |
| 682 | 8-(β-Sulfatoethyl-sulfonyl)-naphth-2-yl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 8-(β-Sulfatoethyl-sulfonyl)-naphth-2-yl | orange |
| 683 | 8-(β-Sulfatoethyl-sulfonyl)-naphth-2-yl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 8-(β-Sulfatoethyl-sulfonyl)-naphth-2-yl | orange |
| 684 | 6-Sulfo-8-(β-sulfatoethyl-sulfonyl)-naphth-2-yl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 685 | 6-Sulfo-8-(β-sulfatoethyl-sulfonyl)-naphth-2-yl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 686 | 6-Sulfo-8-(β-sulfatoethyl-sulfonyl)-naphth-2-yl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 6-Sulfo-8-(β-sulfatoethyl-sulfonyl)-naphth-2-yl | reddish orange |
| 687 | 6-Sulfo-8-(β-sulfatoethyl-sulfonyl)-naphth-2-yl | 8-Hydroxy-6-sulfo-naphth-7-yl-3-ylamino | Phen-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 688 | 6-Sulfo-8-(β-sulfatoethyl-sulfonyl)-naphth-2-yl | 8-Hydroxy-6-sulfo-naphth-7-yl-3-ylamino | Phen-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 689 | 6-Sulfo-8-(β-sulfatoethyl-sulfonyl)-naphth-2-yl | 8-Hydroxy-6-sulfo-naphth-7-yl-3-ylamino | Phen-1,2-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 690 | 6-Sulfo-8-(β-sulfatoethyl-sulfonyl)-naphth-2-yl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 691 | 6-Sulfo-8-(β-sulfatoethyl-sulfonyl)-naphth-2-yl | 8-Hydroxy-6-sulfo-naphth-7-yl-3-ylamino | 4-Methyl-phen-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 692 | 6-Sulfo-8-(β-sulfatoethyl-sulfonyl)-naphth-2-yl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 693 | 6-Sulfo-8-(β- | 8-Hydroxy-6-sulfo-naphth- | 1,1-Di-phen- | 8-Hydroxy-6-sulfo- | 6-Sulfo-8-(β- | reddish |

| Ex. | Radical D$^{10}$- | Radical -K$^{10}$-N(R$^{10}$)- | Azo dyestuff of the formula (A) Radical A° | Radical -N(R$^{11}$)-K$^{11}$- | Radical D$^{11}$- | Color shade |
|---|---|---|---|---|---|---|
|  | sulfatoethyl-sulfonyl)-naphth-2-yl | 7-yl-3-ylamino | cyclohexan-4'-ylamino-4"-ylamino | naphth-7-yl-3-ylamino | sulfatoethyl-sulfonyl)-naphth-2-yl | orange |
| 694 | 6-Sulfo-8-(β-sulfatoethyl-sulfonyl)-naphth-2-yl | 8-Hydroxy-6-sulfo-naphth-7-yl-3-ylamino | 1-(Phenylamino)-phen-4,4'-di-ylamino 4"-ylamino | 8-Hydroxy-6-sulfo-naphth-7-yl-3-ylamino | 6-Sulfo-8-(β-sulfatoethyl-sulfonyl)-naphth-2-yl | reddish orange |
| 695 | 6-Sulfo-8-(β-sulfatoethyl-sulfonyl)-naphth-2-yl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 696 | 6-Sulfo-8-(β-sulfatoethyl-sulfonyl)-naphth-2-yl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 697 | 6-Sulfo-8-(β-sulfatoethyl-sulfonyl)-naphth-2-yl | 8-Hydroxy-6-sulfo-naphth-7-yl-3-ylamino | Eth-1,2-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 698 | 6-Sulfo-8-(β-sulfatoethyl-sulfonyl)-naphth-2-yl | 8-Hydroxy-6-sulfo-naphth-7-yl-3-ylamino | Prop-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 699 | 6-Sulfo-8-(β-sulfatoethyl-sulfonyl)-naphth-2-yl | 8-Hydroxy-6-sulfo-naphth-7-yl-3-ylamino | But-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 700 | 6-Sulfo-8-(β-sulfatoethyl-sulfonyl)-naphth-2-yl | 8-Hydroxy-6-sulfo-naphth-7-yl-3-ylamino | Hex-1,6-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 701 | 6-Sulfo-8-(β-sulfatoethyl-sulfonyl)-naphth-2-yl | 8-Hydroxy-6-sulfo-naphth-7-yl-3-ylamino | Piperazin-1,4-ylen | 8-Hydroxy-6-sulfo-naphth-7-yl-3-ylamino | 6-Sulfo-8-(β-sulfatoethyl-sulfonyl)-naphth-2-yl | reddish orange |
| 702 | 6-Sulfo-8-(β-sulfatoethyl-sulfonyl)-naphth-2-yl | 8-Hydroxy-6-sulfo-naphth-7-yl-3-ylamino | Cyclohex-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 703 | 6-Sulfo-8-(β-sulfatoethyl-sulfonyl)-naphth-2-yl | 8-Hydroxy-6-sulfo-naphth-7-yl-3-ylamino | Prop-1,2-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 704 | 6-Sulfo-8-(β-sulfatoethyl-sulfonyl)-naphth-2-yl | 8-Hydroxy-6-sulfo-naphth-7-yl-3-ylamino | Cyclohex-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 705 | 6-Sulfo-8-(β-sulfatoethyl-sulfonyl)-naphth-2-yl | 8-Hydroxy-6-sulfo-naphth-7-yl-3-ylamino | Eth-1,2-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 706 | 6-Sulfo-8-(β-sulfatoethyl-sulfonyl)-naphth-2-yl | 8-Hydroxy-6-sulfo-naphth-7-yl-3-ylamino | Prop-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 707 | 6-Sulfo-8-(β-sulfatoethyl-sulfonyl)-naphth-2-yl | 8-Hydroxy-6-sulfo-naphth-7-yl-3-ylamino | But-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 708 | 6-Sulfo-8-(β-sulfatoethyl-sulfonyl)-naphth-2-yl | 8-Hydroxy-6-sulfo-naphth-7-yl-3-ylamino | Hex-1,6-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 709 | 6-Sulfo-8-(β-sulfatoethyl-sulfonyl)-naphth-2-yl | 8-Hydroxy-6-sulfo-naphth-7-yl-3-ylamino | Piperazin-1,4-ylen | 8-Hydroxy-6-sulfo-naphth-7-yl-3-ylamino | 6-Sulfo-8-(β-sulfatoethyl-sulfonyl)-naphth-2-yl | reddish orange |
| 710 | 6-Sulfo-8-(β-sulfatoethyl-sulfonyl)-naphth-2-yl | 8-Hydroxy-6-sulfo-naphth-7-yl-3-ylamino | Cyclohex-1,4-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 711 | 6-Sulfo-8-(β-sulfatoethyl-sulfonyl)-naphth-2-yl | 8-Hydroxy-6-sulfo-naphth-7-yl-3-ylamino | Cyclohex-1,3-di-ylamino | 8-Hydroxy-6-sulfo-naphth-7-yl-3-ylamino | 6-Sulfo-8-(β-sulfatoethyl-sulfonyl)-naphth-2-yl | reddish orange |
| 712 | 6-Sulfo-8-(β-sulfatoethyl-sulfonyl)-naphth-2-yl | 8-Hydroxy-6-sulfo-naphth-7-yl-3-ylamino | Prop-1,2-di-ylamino | 8-Hydroxy-6-sulfo-naphth-7-yl-3-ylamino | 6-Sulfo-8-(β-sulfatoethyl-sulfonyl)-naphth-2-yl | reddish orange |

-continued

| Ex. | Radical $D^{10}$- | Radical -$K^{10}$-$N(R^{10})$- | Azo dyestuff of the formula (A) Radical $A°$ | Radical -$N(R^{11})$-$K^{11}$- | Radical $D^{11}$- | Color shade |
|---|---|---|---|---|---|---|
| 713 | 2,5-Dimethoxy-4-(β-sulfatoethyl-sulfonyl)-phenyl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 2,5-Dimethoxy-4-(β-sulfatoethyl-sulfonyl)-phenyl | red |
| 714 | 2,5-Dimethoxy-4-(β-sulfatoethyl-sulfonyl)-phenyl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 2,5-Dimethoxy-4-(β-sulfatoethyl-sulfonyl)-phenyl | red |
| 715 | 2,5-Dimethoxy-4-(β-sulfatoethyl-sulfonyl)-phenyl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 2,5-Dimethoxy-4-(β-sulfatoethyl-sulfonyl)-phenyl | red |
| 716 | 2,5-Dimethoxy-4-(β-sulfatoethyl-sulfonyl)-phenyl | 8-Hydroxy-6-sulfo-naphth-7-yl-3-ylamino | Phen-1,4-di-ylamino | 8-Hydroxy-6-sulfo-naphth-7-yl-3-ylamino | 2,5-Dimethoxy-4-(β-sulfatoethyl-sulfonyl)-phenyl | red |
| 717 | 2,5-Dimethoxy-4-(β-sulfatoethyl-sulfonyl)-phenyl | 8-Hydroxy-6-sulfo-naphth-7-yl-3-ylamino | Phen-1,3-di-ylamino | 8-Hydroxy-6-sulfo-naphth-7-yl-3-ylamino | 2,5-Dimethoxy-4-(β-sulfatoethyl-sulfonyl)-phenyl | red |
| 718 | 2,5-Dimethoxy-4-(β-sulfatoethyl-sulfonyl)-phenyl | 8-Hydroxy-6-sulfo-naphth-7-yl-3-ylamino | Phen-1,2-di-ylamino | 8-Hydroxy-6-sulfo-naphth-7-yl-3-ylamino | 2,5-Dimethoxy-4-(β-sulfatoethyl-sulfonyl)-phenyl | red |
| 719 | 2,5-Dimethoxy-4-(β-sulfatoethyl-sulfonyl)-phenyl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 2,5-Dimethoxy-4-(β-sulfatoethyl-sulfonyl)-phenyl | red |
| 720 | 2,5-Dimethoxy-4-(β-sulfatoethyl-sulfonyl)-phenyl | 8-Hydroxy-6-sulfo-naphth-7-yl-3-ylamino | 4-Methyl-phen-1,3-di-ylamino | 8-Hydroxy-6-sulfo-naphth-7-yl-3-ylamino | 2,5-Dimethoxy-4-(β-sulfatoethyl-sulfonyl)-phenyl | red |
| 721 | 2,5-Dimethoxy-4-(β-sulfatoethyl-sulfonyl)-phenyl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 2,5-Dimethoxy-4-(β-sulfatoethyl-sulfonyl)-phenyl | red |
| 722 | 2,5-Dimethoxy-4-(β-sulfatoethyl-sulfonyl)-phenyl | 8-Hydroxy-6-sulfo-naphth-7-yl-3-ylamino | 1,1-Di-phen-cyclohexan-4'-ylamino-4"-ylamino | 8-Hydroxy-6-sulfo-naphth-7-yl-3-ylamino | 2,5-Dimethoxy-4-(β-sulfatoethyl-sulfonyl)-phenyl | red |
| 723 | 2,5-Dimethoxy-4-(β-sulfatoethyl-sulfonyl)-phenyl | 8-Hydroxy-6-sulfo-naphth-7-yl-3-ylamino | 1-(Phenylamino)-phen-4,4'-di-ylamino 4"-ylamino | 8-Hydroxy-6-sulfo-naphth-7-yl-3-ylamino | 2,5-Dimethoxy-4-(β-sulfatoethyl-sulfonyl)-phenyl | red |
| 724 | 2,5-Dimethoxy-4-(β-sulfatoethyl-sulfonyl)-phenyl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 2,5-Dimethoxy-4-(β-sulfatoethyl-sulfonyl)-phenyl | red |
| 725 | 2,5-Dimethoxy-4-(β-sulfatoethyl-sulfonyl)-phenyl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 2,5-Dimethoxy-4-(β-sulfatoethyl-sulfonyl)-phenyl | red |
| 726 | 2-Methoxy-5-methyl-4-(β-sulfatoethyl-sulfonyl)-phenyl | 8-Hydroxy-6-sulfo-naphth-7-yl-3-ylamino | 4-Sulfo-phen-1,3-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 727 | 2-Methoxy-5-methyl-4-(β-sulfatoethyl-sulfonyl)-phenyl | 8-Hydroxy-6-sulfo-naphth-7-yl-3-ylamino | 3-Sulfo-phen-1,4-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 728 | 2-Methoxy-5-methyl-4-(β-sulfatoethyl-sulfonyl)-phenyl | 8-Hydroxy-6-sulfo-naphth-7-yl-3-ylamino | N-Methyl-benzylamino-4'-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 729 | 2-Methoxy-5-methyl-4-(β-sulfatoethyl-sulfonyl)-phenyl | 8-Hydroxy-6-sulfo-naphth-7-yl-3-ylamino | Phen-1,4-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 730 | 2-Methoxy-5-methyl-4-(β-sulfatoethyl-sulfonyl)-phenyl | 8-Hydroxy-6-sulfo-naphth-7-yl-3-ylamino | Phen-1,3-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 731 | 2-Methoxy-5-methyl-4-(β-sulfatoethyl-sulfonyl)-phenyl | 8-Hydroxy-6-sulfo-naphth-7-yl-3-ylamino | Phen-1,2-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 732 | 2-Methoxy-5-methyl-4-(β-sulfatoethyl-sulfonyl)-phenyl | 8-Hydroxy-6-sulfo-naphth-7-yl-3-ylamino | 3-Methyl-phen-1,4-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 733 | 2-Methoxy-5-methyl-4-(β-sulfatoethyl-sulfonyl)-phenyl | 8-Hydroxy-6-sulfo-naphth-7-yl-3-ylamino | 4-Methyl-phen-1,3-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 734 | 2-Methoxy-5-methyl-4-(β-sulfatoethyl-sulfonyl)-phenyl | 8-Hydroxy-6-sulfo-naphth-7-yl-3-ylamino | 4-Methoxy-phen-1,3-di-ylamino | 8-Hydroxy-6-sulfo-naphth-7-yl-3-ylamino | 2-Methoxy-5-methyl-4-(β-sulfatoethyl-sulfonyl)-phenyl | reddish orange |
| 735 | 2-Methoxy-5-methyl-4-(β- | 8-Hydroxy-6-sulfo-naphth-7-yl-3-ylamino | 1,1-Di-phen-cyclohexan-4'-ylamino- | 8-Hydroxy-6-sulfo-naphth-7-yl-3-ylamino | 2-Methoxy-5-methyl-4-(β- | reddish orange |

-continued

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| | sulfatoethyl-sulfonyl)-phenyl | | 4"-ylamino | | sulfatoethyl-sulfonyl)-phenyl | |
| 736 | 2-Methoxy-5-methyl-4-($\beta$-sulfatoethyl-sulfonyl)-phenyl | 8-Hydroxy-6-sulfo-naphth-7-yl-3-ylamino | 1-(Phenylamino)-phen-4,4'-di-ylamino 4"-ylamino | 8-Hydroxy-6-sulfo-naphth-7-yl-3-ylamino | 2-Methoxy-5-methyl-4-($\beta$-sulfatoethyl-sulfonyl)-phenyl | reddish orange |
| 737 | 2-Methoxy-5-methyl-4-($\beta$-sulfatoethyl-sulfonyl)-phenyl | 8-Hydroxy-6-sulfo-naphth-7-yl-3-ylamino | 3,3'-Dimethoxy-6,6'-disulfo-1,1'-diphenyl-4,4'-di-ylamino | 8-Hydroxy-6-sulfo-naphth-7-yl-3-ylamino | 2-Methoxy-5-methyl-4-($\beta$-sulfatoethyl-sulfonyl)-phenyl | reddish orange |
| 738 | 2-Methoxy-5-methyl-4-($\beta$-sulfatoethyl-sulfonyl)-phenyl | 8-Hydroxy-6-sulfo-naphth-7-yl-3-ylamino | 3,3'-Dimethyl-6,6'-disulfo-1,1'-diphenyl-4,4'-di-ylamino | 8-Hydroxy-6-sulfo-naphth-7-yl-3-ylamino | 2-Methoxy-5-methyl-4-($\beta$-sulfatoethyl-sulfonyl)-phenyl | reddish orange |
| 739 | 4-($\beta$-Sulfatoethyl-sulfonyl)-phenyl | 8-Hydroxy-6-sulfo-naphth-7-yl-3-ylamino | Eth-1,2-di-ylamine | 8-Hydroxy-6-sulfo-naphth-7-yl-3-ylamino | 4-($\beta$-Sulfatoethyl-sulfonyl)-phenyl | orange |
| 740 | 4-($\beta$-Sulfatoethyl-sulfonyl)-phenyl | 8-Hydroxy-6-sulfo-naphth-7-yl-3-ylamino | Prop-1,3-di-ylamine | 8-Hydroxy-6-sulfo-naphth-7-yl-3-ylamino | 4-($\beta$-Sulfatoethyl-sulfonyl)-phenyl | orange |
| 741 | 4-($\beta$-Sulfatoethyl-sulfonyl)-phenyl | 8-Hydroxy-6-sulfo-naphth-7-yl-3-ylamino | But-1,4-di-ylamine | 8-Hydroxy-6-sulfo-naphth-7-yl-3-ylamino | 4-($\beta$-Sulfatoethyl-sulfonyl)-phenyl | orange |
| 742 | 4-($\beta$-Sulfatoethyl-sulfonyl)-phenyl | 8-Hydroxy-6-sulfo-naphth-7-yl-3-ylamino | Hex-1,6-di-ylamine | 8-Hydroxy-6-sulfo-naphth-7-yl-3-ylamino | 4-($\beta$-Sulfatoethyl-sulfonyl)-phenyl | orange |
| 743 | 4-($\beta$-Sulfatoethyl-sulfonyl)-phenyl | 8-Hydroxy-6-sulfo-naphth-7-yl-3-ylamino | Piperazin-1,4-ylen | 8-Hydroxy-6-sulfo-naphth-7-yl-3-ylamino | 4-($\beta$-Sulfatoethyl-sulfonyl)-phenyl | orange |
| 744 | 4-($\beta$-Sulfatoethyl-sulfonyl)-phenyl | 8-Hydroxy-6-sulfo-naphth-7-yl-3-ylamino | Cyclohex-1,4-di-ylamine | 8-Hydroxy-6-sulfo-naphth-7-yl-3-ylamino | 4-($\beta$-Sulfatoethyl-sulfonyl)-phenyl | orange |
| 745 | 4-($\beta$-Sulfatoethyl-sulfonyl)-phenyl | 8-Hydroxy-6-sulfo-naphth-7-yl-3-ylamino | Prop-1,2-di-ylamine | 8-Hydroxy-6-sulfo-naphth-7-yl-3-ylamino | 4-($\beta$-Sulfatoethyl-sulfonyl)-phenyl | orange |
| 746 | 4-($\beta$-Sulfatoethyl-sulfonyl)-phenyl | 8-Hydroxy-6-sulfo-naphth-7-yl-3-ylamino | Cyclohex-1,3-di-ylamine | 8-Hydroxy-6-sulfo-naphth-7-yl-3-ylamino | 4-($\beta$-Sulfatoethyl-sulfonyl)-phenyl | orange |
| 747 | 6-($\beta$-Sulfatoethyl-sulfonyl)-naphth-2-yl | 8-Hydroxy-4,6-disulfo-naphth-7-yl-3-ylamino | Eth-1,2-di-ylamino | 8-Hydroxy-4,6-disulfo-naphth-7-yl-3-ylamino | 6-($\beta$-Sulfatoethyl-sulfonyl)-naphth-2-yl | red |
| 748 | 6-($\beta$-Sulfatoethyl-sulfonyl)-naphth-2-yl | 8-Hydroxy-4,6-disulfo-naphth-7-yl-3-ylamino | Prop-1,3-di-ylamino | 8-Hydroxy-4,6-disulfo-naphth-7-yl-3-ylamino | 6-($\beta$-Sulfatoethyl-sulfonyl)-naphth-2-yl | red |
| 749 | 6-($\beta$-Sulfatoethyl-sulfonyl)-naphth-2-yl | 8-Hydroxy-4,6-disulfo-naphth-7-yl-3-ylamino | But-1,4-di-ylamino | 8-Hydroxy-4,6-disulfo-naphth-7-yl-3-ylamino | 6-($\beta$-Sulfatoethyl-sulfonyl)-naphth-2-yl | red |
| 750 | 6-($\beta$-Sulfatoethyl-sulfonyl)-naphth-2-yl | 8-Hydroxy-4,6-disulfo-naphth-7-yl-3-ylamino | Hex-1,6-di-ylamino | 8-Hydroxy-4,6-disulfo-naphth-7-yl-3-ylamino | 6-($\beta$-Sulfatoethyl-sulfonyl)-naphth-2-yl | red |
| 751 | 6-($\beta$-Sulfatoethyl-sulfonyl)-naphth-2-yl | 8-Hydroxy-4,6-disulfo-naphth-7-yl-3-ylamino | Piperazin-1,4-ylen | 8-Hydroxy-4,6-disulfo-naphth-7-yl-3-ylamino | 6-($\beta$-Sulfatoethyl-sulfonyl)-naphth-2-yl | red |
| 752 | 6-($\beta$-Sulfatoethyl-sulfonyl)-naphth-2-yl | 8-Hydroxy-4,6-disulfo-naphth-7-yl-3-ylamino | Cyclohex-1,4-di-ylamino | 8-Hydroxy-4,6-disulfo-naphth-7-yl-3-ylamino | 6-($\beta$-Sulfatoethyl-sulfonyl)-naphth-2-yl | red |
| 753 | 6-($\beta$-Sulfatoethyl-sulfonyl)-naphth-2-yl | 8-Hydroxy-4,6-disulfo-naphth-7-yl-3-ylamino | Cyclohex-1,3-di-ylamino | 8-Hydroxy-4,6-disulfo-naphth-7-yl-3-ylamino | 6-($\beta$-Sulfatoethyl-sulfonyl)-naphth-2-yl | red |
| 754 | 6-($\beta$-Sulfatoethyl-sulfonyl)-naphth-2-yl | 8-Hydroxy-4,6-disulfo-naphth-7-yl-3-ylamino | Prop-1,2-di-ylamino | 8-Hydroxy-4,6-disulfo-naphth-7-yl-3-ylamino | 6-($\beta$-Sulfatoethyl-sulfonyl)-naphth-2-yl | red |
| 755 | 1-Sulfo-6-($\beta$-sulfatoethyl-sulfonyl)-naphth-2-yl | 8-Hydroxy-6-sulfo-naphth-7-yl-3-ylamino | Eth-1,2-di-ylamino | 8-Hydroxy-6-sulfo-naphth-7-yl-3-ylamino | 1-Sulfo-6-($\beta$-sulfatoethyl-sulfonyl)-naphth-2-yl | orange |
| 756 | 1-Sulfo-6-($\beta$-sulfatoethyl-sulfonyl)-naphth-2-yl | 8-Hydroxy-6-sulfo-naphth-7-yl-3-ylamino | Prop-1,3-di-ylamino | 8-Hydroxy-6-sulfo-naphth-7-yl-3-ylamino | 1-Sulfo-6-($\beta$-sulfatoethyl-sulfonyl)-naphth-2-yl | orange |
| 757 | 1-Sulfo-6-($\beta$-sulfatoethyl-sulfonyl)-naphth-2-yl | 8-Hydroxy-6-sulfo-naphth-7-yl-3-ylamino | But-1,4-di-ylamino | 8-Hydroxy-6-sulfo-naphth-7-yl-3-ylamino | 1-Sulfo-6-($\beta$-sulfatoethyl-sulfonyl)-naphth-2-yl | orange |
| 758 | 1-Sulfo-6-($\beta$-sulfatoethyl-sulfonyl)-naphth-2-yl | 8-Hydroxy-6-sulfo-naphth-7-yl-3-ylamino | Hex-1,6-di-ylamino | 8-Hydroxy-6-sulfo-naphth-7-yl-3-ylamino | 1-Sulfo-6-($\beta$-sulfatoethyl-sulfonyl)-naphth-2-yl | orange |
| 759 | 1-Sulfo-6-($\beta$-sulfatoethyl-sulfonyl)-naphth-2-yl | 8-Hydroxy-6-sulfo-naphth-7-yl-3-ylamino | Piperazin-1,4-ylen | 8-Hydroxy-6-sulfo-naphth-7-yl-3-ylamino | 1-Sulfo-6-($\beta$-sulfatoethyl-sulfonyl)-naphth-2-yl | orange |
| 760 | 1-Sulfo-6-($\beta$-sulfatoethyl-sulfonyl)-naphth- | 8-Hydroxy-6-sulfo-naphth-7-yl-3-ylamino | Cyclohex-1,4-di-ylamino | 8-Hydroxy-6-sulfo-naphth-7-yl-3-ylamino | 1-Sulfo-6-($\beta$-sulfatoethyl-sulfonyl)-naphth- | orange |

| Ex. | Radical D¹⁰- | Radical -K¹⁰-N(R¹⁰)- | Azo dyestuff of the formula (A) Radical A° | Radical -N(R¹¹)-K¹¹- | Radical D¹¹- | Color shade |
|---|---|---|---|---|---|---|
| 761 | 1-Sulfo-6-(β-sulfatoethyl-sulfonyl)-naphth-2-yl | 8-Hydroxy-6-sulfo-naphth-7-yl-3-ylamino | Prop-1,2-di-ylamino | 8-Hydroxy-6-sulfo-naphth-7-yl-3-ylamino | 1-Sulfo-6-(β-sulfatoethyl-sulfonyl)-naphth-2-yl | orange |
| 762 | 1-Sulfo-6-(β-sulfatoethyl-sulfonyl)-naphth-2-yl | 8-Hydroxy-6-sulfo-naphth-7-yl-3-ylamino | Cyclohex-1,3-di-ylamino | 8-Hydroxy-6-sulfo-naphth-7-yl-3-ylamino | 1-Sulfo-6-(β-sulfatoethyl-sulfonyl)-naphth-2-yl | orange |
| 763 | 6-Sulfo-8-(β-sulfatoethyl-sulfonyl)-naphth-2-yl | 8-Hydroxy-4,6-disulfo-naphth-7-yl-3-ylamino | Eth-1,2-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 764 | 6-Sulfo-8-(β-sulfatoethyl-sulfonyl)-naphth-2-yl | 8-Hydroxy-4,6-disulfo-naphth-7-yl-3-ylamino | Prop-1,3-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 765 | 6-Sulfo-8-(β-sulfatoethyl-sulfonyl)-naphth-2-yl | 8-Hydroxy-4,6-disulfo-naphth-7-yl-3-ylamino | But-1,4-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 766 | 6-Sulfo-8-(β-sulfatoethyl-sulfonyl)-naphth-2-yl | 8-Hydroxy-4,6-disulfo-naphth-7-yl-3-ylamino | Hex-1,6-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 767 | 6-Sulfo-8-(β-sulfatoethyl-sulfonyl)-naphth-2-yl | 8-Hydroxy-4,6-disulfo-naphth-7-yl-3-ylamino | Piperazin-1,4-ylen | 8-Hydroxy-4,6-disulfo-naphth-7-yl-3-ylamino | 6-Sulfo-8-(β-sulfatoethyl-sulfonyl)-naphth-2-yl | bluish red |
| 768 | 6-Sulfo-8-(β-sulfatoethyl-sulfonyl)-naphth-2-yl | 8-Hydroxy-4,6-disulfo-naphth-7-yl-3-ylamino | Cyclohex-1,4-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 769 | 6-Sulfo-8-(β-sulfatoethyl-sulfonyl)-naphth-2-yl | 8-Hydroxy-4,6-disulfo-naphth-7-yl-3-ylamino | Cyclohex-1,3-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 770 | 6-Sulfo-8-(β-sulfatoethyl-sulfonyl)-naphth-2-yl | 8-Hydroxy-4,6-disulfo-naphth-7-yl-3-ylamino | Prop-1,2-di-ylamino | 8-Hydroxy-4,6-disulfo-naphth-7-yl-3-ylamino | 6-Sulfo-8-(β-sulfatoethyl-sulfonyl)-naphth-2-yl | bluish red |
| 771 | 2-Methoxy-5-(β-sulfatoethyl-sulfonyl)-phenyl | 8-Hydroxy-6-sulfo-naphth-7-yl-3-ylamino | Eth-1,2-di-ylamino | 8-Hydroxy-6-sulfo-naphth-7-yl-3-ylamino | 2-Methoxy-5-(β-sulfatoethyl-sulfonyl)-phenyl | reddish orange |
| 772 | 2-Methoxy-5-(β-sulfatoethyl-sulfonyl)-phenyl | 8-Hydroxy-6-sulfo-naphth-7-yl-3-ylamino | Prop-1,3-di-ylamino | 8-Hydroxy-6-sulfo-naphth-7-yl-3-ylamino | 2-Methoxy-5-(β-sulfatoethyl-sulfonyl)-phenyl | reddish orange |
| 773 | 2-Methoxy-5-(β-sulfatoethyl-sulfonyl)-phenyl | 8-Hydroxy-6-sulfo-naphth-7-yl-3-ylamino | But-1,4-di-ylamino | 8-Hydroxy-6-sulfo-naphth-7-yl-3-ylamino | 2-Methoxy-5-(β-sulfatoethyl-sulfonyl)-phenyl | reddish orange |
| 774 | 2-Methoxy-5-(β-sulfatoethyl-sulfonyl)-phenyl | 8-Hydroxy-6-sulfo-naphth-7-yl-3-ylamino | Hex-1,6-di-ylamino | 8-Hydroxy-6-sulfo-naphth-7-yl-3-ylamino | 2-Methoxy-5-(β-sulfatoethyl-sulfonyl)-phenyl | reddish orange |
| 775 | 2-Methoxy-5-(β-sulfatoethyl-sulfonyl)-phenyl | 8-Hydroxy-6-sulfo-naphth-7-yl-3-ylamino | Piperazin-1,4-ylen | 8-Hydroxy-6-sulfo-naphth-7-yl-3-ylamino | 2-Methoxy-5-(β-sulfatoethyl-sulfonyl)-phenyl | reddish orange |
| 776 | 2-Methoxy-5-(β-sulfatoethyl-sulfonyl)-phenyl | 8-Hydroxy-6-sulfo-naphth-7-yl-3-ylamino | Cyclohex-1,4-di-ylamino | 8-Hydroxy-6-sulfo-naphth-7-yl-3-ylamino | 2-Methoxy-5-(β-sulfatoethyl-sulfonyl)-phenyl | reddish orange |
| 777 | 2-Methoxy-5-(β-sulfatoethyl-sulfonyl)-phenyl | 8-Hydroxy-6-sulfo-naphth-7-yl-3-ylamino | Cyclo-1,3-di-ylamino | 8-Hydroxy-6-sulfo-naphth-7-yl-3-ylamino | 2-Methoxy-5-(β-sulfatoethyl-sulfonyl)-phenyl | reddish orange |
| 778 | 2-Methoxy-5-(β-sulfatoethyl-sulfonyl)-phenyl | 8-Hydroxy-6-sulfo-naphth-7-yl-3-ylamino | Prop-1,2-di-ylamino | 8-Hydroxy-6-sulfo-naphth-7-yl-3-ylamino | 2-Methoxy-5-(β-sulfatoethyl-sulfonyl)-phenyl | reddish orange |
| 779 | 2-Methoxy-5-(β-sulfatoethyl-sulfonyl)-phenyl | 8-Hydroxy-4,6-disulfo-naphth-7-yl-3-ylamino | Eth-1,2-di-ylamino | 8-Hydroxy-4,6-disulfo-naphth-7-yl-3-ylamino | 2-Methoxy-5-(β-sulfatoethyl-sulfonyl)-phenyl | reddish orange |
| 780 | 2-Methoxy-5-(β-sulfatoethyl-sulfonyl)-phenyl | 8-Hydroxy-4,6-disulfo-naphth-7-yl-3-ylamino | Prop-1,3-di-ylamino | 8-Hydroxy-4,6-disulfo-naphth-7-yl-3-ylamino | 2-Methoxy-5-(β-sulfatoethyl-sulfonyl)-phenyl | reddish orange |
| 781 | 2-Methoxy-5-(β-sulfatoethyl-sulfonyl)-phenyl | 8-Hydroxy-4,6-disulfo-naphth-7-yl-3-ylamino | But-1,4-di-ylamino | 8-Hydroxy-4,6-disulfo-naphth-7-yl-3-ylamino | 2-Methoxy-5-(β-sulfatoethyl-sulfonyl)-phenyl | reddish orange |
| 782 | 2-Methoxy-5-(β-sulfatoethyl-sulfonyl)-phenyl | 8-Hydroxy-4,6-disulfo-naphth-7-yl-3-ylamino | Hex-1,6-di-ylamino | 8-Hydroxy-4,6-disulfo-naphth-7-yl-3-ylamino | 2-Methoxy-5-(β-sulfatoethyl-sulfonyl)-phenyl | reddish orange |

-continued

| Ex. | Radical $D^{10}$- | Radical -$K^{10}$-$N(R^{10})$- | Azo dyestuff of the formula (A)<br>Radical $A°$ | Radical -$N(R^{11})$-$K^{11}$- | Radical $D^{11}$- | Color shade |
|---|---|---|---|---|---|---|
| 783 | 2-Methoxy-5-(β-sulfatoethyl-sulfonyl)-phenyl | 8-Hydroxy-4,6-disulfo-naphth-7-yl-3-ylamino | Piperazin-1,4-ylen | 8-Hydroxy-4,6-disulfo-naphth-7-yl-3-ylamino | 2-Methoxy-5-(β-sulfatoethyl-sulfonyl)-phenyl | reddish orange |
| 784 | 2-Methoxy-5-(β-sulfatoethyl-sulfonyl)-phenyl | 8-Hydroxy-4,6-disulfo-naphth-7-yl-3-ylamino | Cyclohex-1,4-di-ylamino | 8-Hydroxy-4,6-disulfo-naphth-7-yl-3-ylamino | 2-Methoxy-5-(β-sulfatoethyl-sulfonyl)-phenyl | reddish orange |
| 785 | 2-Methoxy-5-(β-sulfatoethyl-sulfonyl)-phenyl | 8-Hydroxy-4,6-disulfo-naphth-7-yl-3-ylamino | Cyclo-1,3-di-ylamino | 8-Hydroxy-4,6-disulfo-naphth-7-yl-3-ylamino | 2-Methoxy-5-(β-sulfatoethyl-sulfonyl)-phenyl | reddish orange |
| 786 | 2-Methoxy-5-(β-sulfatoethyl-sulfonyl)-phenyl | 8-Hydroxy-4,6-disulfo-naphth-7-yl-3-ylamino | Prop-1,2-di-ylamino | 8-Hydroxy-4,6-disulfo-naphth-7-yl-3-ylamino | 2-Methoxy-5-(β-sulfatoethyl-sulfonyl)-phenyl | reddish orange |
| 787 | 2-Methoxy-5-methyl-4-(β-sulfatoethyl-sulfonyl)-phenyl | 8-Hydroxy-6-sulfo-naphth-7-yl-2-ylamino | 4-Sulfo-phen-1,3-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 788 | 2-Methoxy-5-methyl-4-(β-sulfatoethyl-sulfonyl)-phenyl | 8-Hydroxy-6-sulfo-naphth-7-yl-2-ylamino | 3-Sulfo-phen-1,4-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 789 | 2-Methoxy-5-methyl-4-(β-sulfatoethyl-sulfonyl)-phenyl | 8-Hydroxy-6-sulfo-naphth-7-yl-2-ylamino | N-Methyl-benzyl-amino-4'-ylamino | 8-Hydroxy-6-sulfo-naphth-7-yl-2-ylamino | 2-Methoxy-5-methyl-4-(β-sulfatoethyl-sulfonyl)-phenyl | scarlet |
| 790 | 2-Methoxy-5-methyl-4-(β-sulfatoethyl-sulfonyl)-phenyl | 8-Hydroxy-6-sulfo-naphth-7-yl-2-ylamino | Phen-1,4-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 791 | 2-Methoxy-5-methyl-4-(β-sulfatoethyl-sulfonyl)-phenyl | 8-Hydroxy-6-sulfo-naphth-7-yl-2-ylamino | Phen-1,3-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 792 | 2-Methoxy-5-methyl-4-(β-sulfatoethyl-sulfonyl)-phenyl | 8-Hydroxy-6-sulfo-naphth-7-yl-2-ylamino | Phen-1,2-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 793 | 2-Methoxy-5-methyl-4-(β-sulfatoethyl-sulfonyl)-phenyl | 8-Hydroxy-6-sulfo-naphth-7-yl-2-ylamino | 4-Methyl-phen-1,3-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 794 | 2-Methoxy-5-methyl-4-(β-sulfatoethyl-sulfonyl)-phenyl | 8-Hydroxy-6-sulfo-naphth-7-yl-2-ylamino | 3-Methyl-phen-1,3-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 795 | 2-Methoxy-5-methyl-4-(β-sulfatoethyl-sulfonyl)-phenyl | 8-Hydroxy-6-sulfo-naphth-7-yl-2-ylamino | 3-Methoxy-phen-1,4-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 796 | 2-Methoxy-5-methyl-4-(β-sulfatoethyl-sulfonyl)-phenyl | 8-Hydroxy-6-sulfo-naphth-7-yl-2-ylamino | 1,1-Di-phen-cyclo-hexan-4'-ylamino-4''-ylamino | 8-Hydroxy-6-sulfo-naphth-7-yl-2-ylamino | 2-Methoxy-5-methyl-4-(β-sulfatoethyl-sulfonyl)-phenyl | scarlet |
| 797 | 2-Methoxy-5-methyl-4-(β-sulfatoethyl-sulfonyl)-phenyl | 8-Hydroxy-6-sulfo-naphth-7-yl-2-ylamino | 1-(Phenylamino)-phen-4,4'-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 798 | 2-Methoxy-5-methyl-4-(β-sulfatoethyl-sulfonyl)-phenyl | 8-Hydroxy-6-sulfo-naphth-7-yl-2-ylamino | 3,3'-Dimethoxy-6,6'-disulfo-1,1'-diphenyl-4,4'-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 799 | 2-Methoxy-5-methyl-4-(β-sulfatoethyl-sulfonyl)-phenyl | 8-Hydroxy-6-sulfo-naphth-7-yl-2-ylamino | 3,3'-Dimethyl-6,6'-disulfo-1,1'-diphenyl-4,4'-di-ylamino | 8-Hydroxy-6-sulfo-naphth-7-yl-2-ylamino | 2-Methoxy-5-methyl-4-(β-sulfatoethyl-sulfonyl)-phenyl | scarlet |
| 800 | 2-Methoxy-5-methyl-4-(β-sulfatoethyl-sulfonyl)-phenyl | 8-Hydroxy-4,6-disulfonaphth-7-yl-2-ylamino | 4-Sulfo-phen-1,3-di-ylamino | 8-Hydroxy-4,6-disulfo-naphth--7-yl-2- | 2-Methoxy-5-methyl-4-(β-sulfatoethyl-sulfonyl)-phenyl | claret |
| 801 | 2-Methoxy-5-methyl-4-(β-sulfatoethyl-sulfonyl)-phenyl | 8-Hydroxy-4,6-disulfonaphth-7-yl-2- | 3-Sulfo-phen-1,4-di-ylamino | 8-Hydroxy-4,6-disulfo-naphth--7-yl-2- | 2-Methoxy-5-methyl-4-(β-sulfatoethyl-sulfonyl)-phenyl | claret |
| 802 | 2-Methoxy-5-methyl-4-(β-sulfatoethyl-sulfonyl)-phenyl | 8-Hydroxy-4,6-disulfonaphth-7-yl-2- | N-Methyl-benzyl-amino-4'-ylamino | 8-Hydroxy-4,6-disulfo-naphth--7-yl-2- | 2-Methoxy-5-methyl-4-(β-sulfatoethyl-sulfonyl)-phenyl | claret |
| 803 | 2-Methoxy-5- | 8-Hydroxy-4,6- | Phen-1,4-di-ylamino | 8-Hydroxy-4,6-disulfo- | 2-Methoxy-5- | claret |

-continued

| Ex. | Radical D$^{10}$- | Radical -K$^{10}$-N(R$^{10}$)- | Azo dyestuff of the formula (A)<br>Radical A° | Radical -N(R$^{11}$)-K$^{11}$- | Radical D$^{11}$- | Color shade |
|---|---|---|---|---|---|---|
|  | methyl-4-(β-sulfatoethyl-sulfonyl)-phenyl | disulfonaphth-7-yl-2- |  | naphth--7-yl-2- | methyl-4-(β-sulfatoethyl-sulfonyl)-phenyl |  |
| 804 | 2-Methoxy-5-methyl-4-(β-sulfatoethyl-sulfonyl)-phenyl | 8-Hydroxy-4,6-disulfonaphth-7-yl-2- | Phen-1,3-di-ylamino | 8-Hydroxy-4,6-disulfo-naphth--7-yl-2- | 2-Methoxy-5-methyl-4-(β-sulfatoethyl-sulfonyl)-phenyl | claret |
| 805 | 2-Methoxy-5-methyl-4-(β-sulfatoethyl-sulfonyl)-phenyl | 8-Hydroxy-4,6-disulfonaphth-7-yl-2- | Phen-1,2-di-ylamino | 8-Hydroxy-4,6-disulfo-naphth--7-yl-2- | 2-Methoxy-5-methyl-4-(β-sulfatoethyl-sulfonyl)-phenyl | claret |
| 806 | 2-Methoxy-5-methyl-4-(β-sulfatoethyl-sulfonyl)-phenyl | 8-Hydroxy-4,6-disulfonaphth-7-yl-2- | 4-Methyl-phen-1,3-di-ylamino | 8-Hydroxy-4,6-disulfo-naphth--7-yl-2- | 2-Methoxy-5-methyl-4-(β-sulfatoethyl-sulfonyl)-phenyl | claret |
| 807 | 2-Methoxy-5-methyl-4-(β-sulfatoethyl-sulfonyl)-phenyl | 8-Hydroxy-4,6-disulfonaphth-7-yl-2- | 3-Methyl-phen-1,3-di-ylamino | 8-Hydroxy-4,6-disulfo-naphth--7-yl-2- | 2-Methoxy-5-methyl-4-(β-sulfatoethyl-sulfonyl)-phenyl | claret |
| 808 | 2-Methoxy-5-methyl-4-(β-sulfatoethyl-sulfonyl)-phenyl | 8-Hydroxy-4,6-disulfonaphth-7-yl-2- | 3-Methoxy-phen-1,4-di-ylamino | 8-Hydroxy-4,6-disulfo-naphth--7-yl-2- | 2-Methoxy-5-methyl-4-(β-sulfatoethyl-sulfonyl)-phenyl | claret |
| 809 | 2-Methoxy-5-methyl-4-(β-sulfatoethyl-sulfonyl)-phenyl | 8-Hydroxy-4,6-disulfonaphth-7-yl-2- | 1,1-Di-phen-cyclo-hexan-4'-ylamino-4''-ylamino | 8-Hydroxy-4,6-disulfo-naphth--7-yl-2- | 2-Methoxy-5-methyl-4-(β-sulfatoethyl-sulfonyl)-phenyl | claret |
| 810 | 2-Methoxy-5-methyl-4-(β-sulfatoethyl-sulfonyl)-phenyl | 8-Hydroxy-4,6-disulfonaphth-7-yl-2- | 1-(Phenylamino)-phen-4,4'-di-ylamino | 8-Hydroxy-4,6-disulfo-naphth--7-yl-2- | 2-Methoxy-5-methyl-4-(β-sulfatoethyl-sulfonyl)-phenyl | claret |
| 811 | 2-Methoxy-5-methyl-4-(β-sulfatoethyl-sulfonyl)-phenyl | 8-Hydroxy-4,6-disulfonaphth-7-yl-2- | 3,3'-Dimethoxy-6,6'-disulfo-1,1'-diphenyl-4,4'-di-ylamino | 8-Hydroxy-4,6-disulfo-naphth--7-yl-2- | 2-Methoxy-5-methyl-4-(β-sulfatoethyl-sulfonyl)-phenyl | claret |
| 812 | 2-Methoxy-5-methyl-4-(β-sulfatoethyl-sulfonyl)-phenyl | 8-Hydroxy-4,6-disulfonaphth-7-yl-2- | 3,3'-Dimethyl-6,6'-disulfo-1,1'-diphenyl-4,4'-di-ylamino | 8-Hydroxy-4,6-disulfo-naphth--7-yl-2- | 2-Methoxy-5-methyl-4-(β-sulfatoethyl-sulfonyl)-phenyl | claret |

Example 813 bis 895

Further azo dyestuffs according to the invention, corresponding to the formula (B)

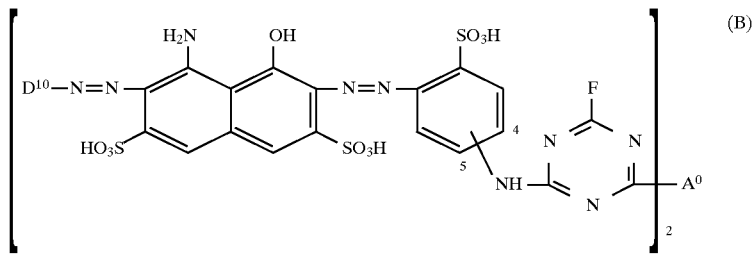

are described in the following Tabular Examples with the aid of the components shown in the particular Tabular Example. They can be prepared in the manner according to the invention, for example analogously to one of the above Embodiment Examples 8 and 9, by means of the starting compounds, which can be ascertained from the components of the particular Tabular Example in association with the formula (B) (cyanuric fluoride, the compounds D$^{10}$—NH$_2$ and 2-sulfo-4- or -5-amino-aniline as diazo components, 1-amino-8-hydroxy-napthalene-3,6-disulfonic acid as coupling component and a diamino compound H—A°—H). These azo dyestuffs according to the invention show very good fiber-reactive dyestuff properties and give, on the materials mentioned in the description, such as, for example, wool and, in particular, cellulose fiber materials, deep dyeings and prints with good fastness properties in the color shade stated for the dyestuff of the particular Tabular Example (in this case on cotton).

| Ex. | Radical D¹⁰- | —NH— in ... | Radical A° | Color shade |
|---|---|---|---|---|
| | | Azo dyestuff of the formula (B) | | |
| 813 | 4-(β-Sulfatoethylsulfonyl)phenyl | 5-position | Ethy-1,2-di-ylamino | navy blue (606) |
| 814 | " | " | But-1,4-di-ylamino | navy blue (603) |
| 815 | " | " | Piperazin-1,4-ylamino | navy blue |
| 816 | " | " | Hex-1,6-di-ylamino | navy blue |
| 817 | " | " | Cyclohex-l,4-di-ylamino | navy blue |
| 818 | " | " | 1-(Phenylamino)phen-4,4'-di-ylamino | navy blue |
| 819 | " | " | Phen-1,4-di-ylamino | navy blue |
| 820 | " | " | Phen-1,3-di-ylamino | navy blue |
| 821 | " | " | 4-Sulfophen-1,3-di-ylamino | navy blue |
| 822 | " | " | 4-Methoxyphen-1,3-di-ylamino | navy blue |
| 823 | " | " | 1-(3'-Methylphen-1'-ylamino)-3-methylphen-4,4'-di-ylamino | navy blue |
| 824 | 3-(β-Sulfatoethylsulfonyl)phenyl | 5-position | Eth-1,2-di-ylamino | navy blue (608) |
| 825 | " | " | But-1,4-di-ylamino | navy blue |
| 826 | " | " | Piperazin-1,4-ylamino | navy blue |
| 827 | " | " | Hex-1,6-di-ylamino | navy blue |
| 828 | " | " | Cyclohex-1,4-di-ylamino | navy blue |
| 829 | " | " | 1-(Phenylamino)phen-4,4'-di-ylamino | navy blue |
| 830 | " | " | Phen-1,4-di-ylamino | navy blue |
| 831 | " | " | Phen-1,3-di-ylamino | navy blue |
| 832 | " | " | 4-Sulfophen-1,3-di-ylamino | navy blue |
| 833 | " | " | 4-Methoxyphen-1,3-di-ylamino | navy blue |
| 834 | " | " | 1-(3'-Methylphen-1'-ylamino)-3-methylphen-4,4'-di-ylamino | navy blue |
| 835 | 4-Vinylsulfonylphenyl | 5-position | Eth-1,2-di-ylamino | navy blue (602) |
| 836 | " | " | But-1,4-di-ylamino | navy blue |
| 837 | " | " | Piperazin-1,4-ylamino | navy blue |
| 838 | " | " | Hex-1,6-di-ylamino | navy blue |
| 839 | " | " | Cyclohex-1,4-di-ylamino | navy blue |
| 840 | " | " | 1-(Phenylamino)phen-4,4'-di-ylamino | navy blue |
| 841 | " | " | Phen-1,4-di-ylamino | navy blue |
| 842 | " | " | Phen-1,3-di-ylamino | navy blue |
| 843 | " | " | 4-Sulfophen-1,3-di-ylamino | navy blue |
| 844 | " | " | 4-Methoxyphen-1,3-di-ylamino | navy blue |
| 845 | " | " | 1-(3'-Methylphen-1'-ylamino)-3-methylphen-4,4'-di-ylamino | navy blue |
| 846 | 2-Methoxy-5-(βsulfatoethyl-sulfonyl)phenyl | 5-position | Eth-1,2-di-ylamino | navy blue (618) |
| 847 | " | " | But-1,4-di-ylamino | navy blue |
| 848 | " | " | Piperazin-1,4-ylamino | navy blue |
| 849 | " | " | Hex-1,6-di-ylamino | navy blue |
| 850 | " | " | Cyclohex-1,4-di-ylamino | navy blue |
| 851 | " | " | 1-(Phenylamino)phen-4,4'-di-ylamino | navy blue |
| 852 | " | " | Phen-1,4-di-ylamino | navy blue |
| 853 | " | " | Phen-1,3-di-ylamino | navy blue |
| 854 | " | " | 4-Sulfophen-1,3-di-ylamino | navy blue |
| 855 | " | " | 4-Methoxyphen-1,3-di-ylamino | navy blue |
| 856 | " | " | 1-(3'-Methylphen-1'-ylamino)-3-methylphen-4,4'-di-ylamino | navy blue |
| 857 | 4-(β-Sulfatoethylsulfonyl)phenyl | 4-position | Eth-1,2-di-ylamino | navy blue (617) |
| 858 | " | " | But-1,4-di-ylamino | navy blue |
| 859 | " | " | Piperazin-1,4-ylamino | navy blue |
| 860 | " | " | Hex-1,6-di-ylamino | navy blue |
| 861 | " | " | Cyclohex-1,4-di-ylamino | navy blue |
| 862 | " | " | 1-(Phenylamino)phen-4,4'-di-ylamino | navy blue |
| 863 | " | " | Phen-1,4-di-ylamino | navy blue |
| 864 | " | " | Phen-1,3-di-ylamino | navy blue |
| 865 | " | " | 4-Sulfophen-1,3-di-ylamino | navy blue |
| 866 | " | " | 4-Methoxyphen-1,3-di-ylamino | navy blue |
| 867 | " | " | 1-(3'-Methylphen-1'-ylamino)-3-methylphen-4,4'-di-ylamino | navy blue |
| 868 | 4-Vinylsulfonylphenyl | 4-position | Eth-1,2-di-ylamino | navy blue (620) |
| 869 | " | " | But-1,4-di-ylamino | navy blue |
| 870 | " | " | Piperazin-1,4-ylamino | navy blue |
| 871 | " | " | Hex-1,6-di-ylamino | navy blue |
| 872 | " | " | Cyclohex-1,4-di-ylamino | navy blue |
| 873 | " | " | 1-(Phenylamino)phen-4,4'-di-ylamino | navy blue |
| 874 | " | " | Phen-1,4-di-ylamino | navy blue |
| 875 | " | " | Phen-1,3-di-ylamino | navy blue |
| 876 | " | " | 4-Sulfophen-1,3-di-ylamino | navy blue |
| 877 | " | " | 4-Methoxyphen-1,3-di-ylamino | navy blue |
| 878 | " | " | 1-(3'-Methylphen-1'-ylamino)-3-methylphen 4,4'-di-ylamino | navy blue |
| 879 | 3-(β-Sulfatoethylsulfonyl)phenyl | 4-position | Eth-1,2-di-ylamino | navy blue (616) |
| 880 | " | " | But-1,4-di-ylamino | navy blue |
| 881 | " | " | Piperazin-1,4-ylamino | navy blue |
| 882 | " | " | Hex-1,6-di-ylamino | navy blue |

-continued

Azo dyestuff of the formula (B)

| Ex. | Radical D[10]- | —NH— in ... | Radical A° | Color shade |
|---|---|---|---|---|
| 883 | " | " | Cyclohex-1,4-di-ylamino | navy blue |
| 884 | " | " | 1-(Phenylamino)phen-4,4'-di-ylamino | navy blue |
| 885 | " | " | Phen-1,4-di-ylamino | navy blue |
| 886 | " | " | Phen-1,3-di-ylamino | navy blue |
| 887 | " | " | 4-Sulfophen-1,3-di-ylamino | navy blue |
| 888 | " | " | 4-Methoxyphen-1,3-di-ylamino | navy blue |
| 889 | " | " | 1-(3'-Methylphen-1'-ylamino)-3-methylphen-4,4'-di-ylamino | navy blue |
| 890 | 4-(β-Sulfatoethylsulfonyl)phenyl | 4-position | 4,6-Disulfophen-1,3-di-ylamino | navy blue |
| 891 | " | " | 2,5-Disulfophen-1,4-di-ylamino | navy blue |
| 892 | " | " | 2,2'-Disulfo-1-(phenylvinyl)phen-4,4'-di-ylamino | navy blue |
| 893 | " | " | 3,3'-Dimethyl-6,6'-disulfo-1,1'-diphenyl-4,4'-di-ylamino | navy blue |
| 894 | " | 5-position | 3,3'-Dimethyl-6,6'-disulfo-1,1'-diphenyl-4,4'-di-ylamino | navy blue |
| 895 | " | " | 2,2'-Disulfo-1-(phenylvinyl)phen-4,4'-di-ylamino | navy blue |

I claim:

1. An azo dyestuff corresponding to the formula (1)

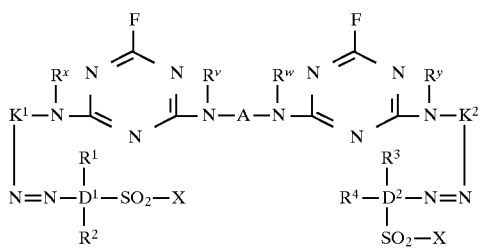

in which:

$D^1$ is a benzene or a naphthalene radical;

$D^2$ is a benzene or a naphthalene radical;

$R^1$ is hydrogen, halogen, alkyl having 1 to 4 carbon atoms, alkoxy having 1 to 4 carbon atoms, hydroxy, carboxy or sulfo;

$R^2$ is hydrogen, halogen, alkyl having 1 to 4 carbon atoms, alkoxy having 1 to 4 carbon atoms, nitro or sulfo;

$R^3$ is hydrogen, halogen, alkyl having 1 to 4 carbon atoms, alkoxy having 1 to 4 carbon atoms, hydroxy, carboxy or sulfo;

$R^4$ is hydrogen, halogen, alkyl having 1 to 4 carbon atoms, alkoxy having 1 to 4 carbon atoms, nitro or sulfo;

X is vinyl, β-sulfatoethyl, β-thiosulfatoethyl or β-chloroethyl;

$R^x$ is hydrogen or alkyl having 1 to 4 carbon atoms;

$R^y$ is hydrogen or alkyl having 1 to 4 carbon atoms;

$R^v$ is hydrogen;

$R^w$ is hydrogen;

$K^1$ is a group of the formula (2a), (2b) or (2c)

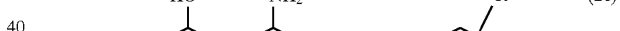

in which

M is hydrogen or an alkali metal, m is the number zero, 1 or 2 (where, if m is zero, the $(SO_3M)$ is replaced by hydrogen), the bond marked with * is bonded to the azo group of said azo dyestuff of formula (1), $R^5$ is hydrogen or sulfo and $R^6$ is hydrogen, sulfo, carboxy, alkyl having 1 to 4 carbon atoms, alkoxy having 1 to 4 carbon atoms, chlorine or bromine;

$K^2$ is a group of the formula (3a), (3b) or (3c)

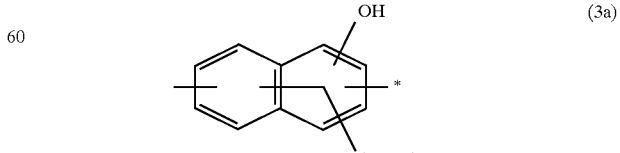

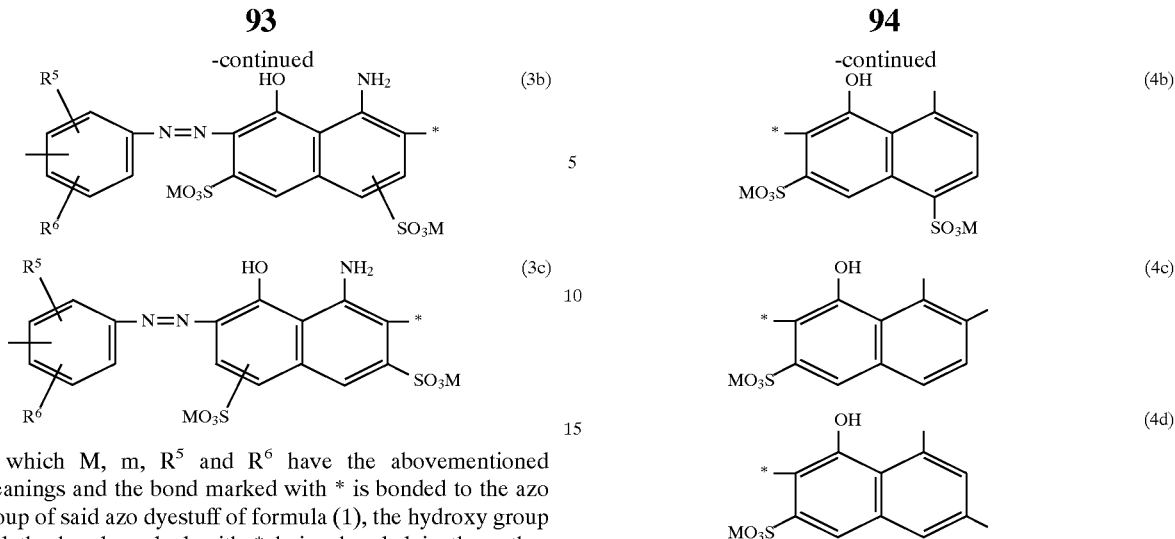

in which M, m, $R^5$ and $R^6$ have the abovementioned meanings and the bond marked with * is bonded to the azo group of said azo dyestuff of formula (1), the hydroxy group and the bond marked with * being bonded in the ortho-position relative to one another;

A is a straight-chain or branched alkylene having 2 to 10 carbon atoms, which is interrupted by 1 or 2 hetero groups, or is unsubstituted phenylene, disulfosubstituted phenylene wherein the sulfo groups are in ortho positions with respect to the N—$R^v$ and N—$R^w$ groups, mono-sulfo-substituted phenylene wherein the sulfo group is in a position ortho to the N—$R^v$ or N—$R^w$ group and wherein the N—$R^v$ group is meta or para to the N—$R^w$ group, alkyl-substituted phenylene wherein the alkyl group has 1 to 4 carbon atoms, alkoxy-substituted phenylene wherein the alkoxy group has 1 to 4 carbon atoms or carboxy-substituted phenylene, or is naphthylene unsubstituted or substituted by 1 or 2 sulfo or carboxy substituents, or is cycloalkylene having 5 to 8 carbon atoms or a group of the formula alk-E, B-alk or alk-B-alk, in which alk is alkylene having 2 to 4 carbon atoms or alkylene having 2 to 10 carbon atoms, which is interrupted by 1 or 2 hetero groups from the group consisting of —O— and —NH—, and B is phenylene unsubstituted or substituted by 1 or 2 substituents from the group consisting of sulfo, carboxy, methyl, ethyl, methoxy, ethoxy, chlorine and bromine, or cycloalkylene having 5 to 8 carbon atoms or the bivalent radical of a saturated 5-to 8-membered heterocyclus containing two N atoms, one or both N atoms of which are bonded to the alk radicals or to alk and a carbon atom of the triazine radical, while in the case of A being an alkylene having 2 to 10 carbon atoms, the definitions of the radicals —N($R^x$)—$K^1$— N=N—$D^1(R^1,R^2)$—$SO_2$—X and —N($R^y$)—$K^2$— N=N—$D^2(R^3,R^4)$—$SO_2$—X in formula (1) have the same meaning or the group —N(R')—A—N(R'')— is the bivalent radical of a saturated 5- to 8-membered heterocyclus containing the two N atoms, each N atom being bonded to a carbon atom of the adjacent triazine radical.

2. An azo dyestuff as claimed in claim 1, in which $K^1$ and $K^2$ are groups of the formula (4a), (4b), (4c) or (4d)

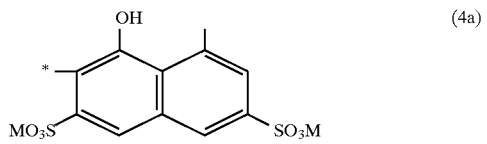

in which M has the meaning given in claim 1 and the bond marked with * is bonded to the azo group.

3. An azo dyestuff as claimed in claim 1, in which $R^1$ and $R^3$, each independently of one another, are hydrogen, methyl, methoxy, ethoxy or sulfo, $R^2$ and $R^4$ are each, independently of one another, hydrogen, methyl, methoxy, ethoxy or sulfo and $D^1$ and $D^2$ are each a benzene radical.

4. An azo dyestuff as claimed in claim 1, in which X is vinyl or β-sulfatoethyl.

5. An azo dyestuff as claimed in claim 2, in which X is vinyl or β-sulfatoethyl.

6. An azo dyestuff as claimed in claim 3, in which X is vinyl or β-sulfatoethyl.

7. An azo dyestuff as claimed in claim 1, in which $R^x$ and $R^y$ are each hydrogen.

8. An azo dyestuff as claimed in claim 1, in which the groups X—$SO_2$—$D^1(R^1,R^2)$— and X—$SO_2$—$D^2(R^3,R^4)$—, each independently of one another, are 3-(β-sulfatoethylsulfonyl)phenyl, 4-(β-sulfatoethylsulfonyl)phenyl, 2-methoxy-5-(β-sulfatoethyl-sulfonyl)phenyl, 2-methoxy-4-(β-sulfatoethylsulfonyl)-phenyl, 2,5-dimethoxy-4-(β-sulfatoethylsulfonyl)phenyl, 2,4-dimethoxy-5-(β-sulfatoethylsulfonyl)phenyl, 2-methoxy-5-methyl-4-(β-sulfatoethylsulfonyl)phenyl or 1-sulfo-6-(β-sulfatoethylsulfonyl)-naphth-2-yl.

9. An azo dyestuff as claimed in claim 2, in which the groups X—$SO_2$—$D^1(R^1,R^2)$— and X—$SO_2$—$D^2(R^3, R^4)$—, each independently of one another, are 3-(β-sulfatoethylsulfonyl)phenyl, 4-(β-sulfatoethylsulfonyl)phenyl, 2-methoxy-5-(β-sulfatoethylsulfonyl)phenyl, 2-methoxy-4-(β-sulfatoethylsulfonyl)-phenyl, 2,5-dimethoxy-4-(β-sulfatoethylsulfonyl)phenyl, 2,4-dimethoxy-5-(β-sulfatoethylsulfonyl)phenyl, 2-methoxy-5-methyl-4-(β-sulfatoethylsulfonyl)phenyl or 1-sulfo-6-(β-sulfatoethylsulfonyl)-naphth-2-yl.

10. An azo dyestuff as claimed in claim 1, in which the group —N(R')—A—N(R'')— is piperazin-1,4-ylene.

11. An azo dyestuff as claimed in claim 1, in which A is 1,2-ethylene, 1,3-propylene, 1,6-hexylene, 1,3-phenylene, 1,4-phenylene, 3-sulfo-1,4-phenylene or 4,6-disulfo-1,3-phenylene.

12. An azo dyestuff as claimed in claim 2, in which A is 1,2-ethylene, 1,3-propylene, 1,6-hexylene, 1,3-phenylene, 1,4-phenylene, 3-sulfo-1,4-phenylene or 4,6-disulfo-1,3-phenylene.

13. An azo dyestuff as claimed in claim 3, in which A is 1,2-ethylene, 1,3-propylene, 1,6-hexylene, 1,3-phenylene, 1,4-phenylene, 3-sulfo-1,4-phenylene or 4,6-disulfo-1,3-phenylene.

14. An azo dyestuff as claimed in claim 8, in which A is 1,2-ethylene, 1,3-propylene, 1,6-hexylene, 1,3-phenylene, 1,4-phenylene, 3-sulfo-1,4-phenylene or 4,6-disulfo-1,3-phenylene.

15. An azo dyestuff as claimed in claim 11, in which X is vinyl or β-sulfatoethyl.

16. An azo dyestuff as claimed in claim 1, wherein the definitions of the radicals —N(R$^x$)—K$^1$—N=N—D$^1$(R$^1$, R$^2$)—SO$_2$—X and —N(R$^y$)—K$^2$—N=N—D$^2$(R$^3$,R$^4$)—SO$_2$—X in formula (1) have the same meaning.

17. An azo dyestuff as claimed in claim 1, wherein A is 4-sulfo-1,3-phenylene, 2-sulfo-1,4-phenylene, 4,6-disulfo-1,3-phenylene, unsubstitutedphenylene, 5-methyl-1,3-phenylene or 1-methoxy-2,4-phenylene.

18. An azo dyestuff as claimed in claim 17, wherein A is 4-sulfo-1,3-phenylene, 2-sulfo-1,4-phenylene, or 4,6-disulfo-1,3-phenylene.

19. An azo dyestuff as claimed in claim 1, in which the group —N(R$^y$)—A—N(R$^w$)— is the bivalent radical of a saturated 5- to 8-membered heterocyclus containing the two N atoms, each N atom being bonded to a carbon atom of the adjacent triazine radical.

\* \* \* \* \*

UNITED STATES PATENT AND TRADEMARK OFFICE
CERTIFICATE OF CORRECTION

PATENT NO. : 5,821,347
DATED : October 13, 1998
INVENTOR(S) : Jorg Dannheim

It is certified that error appears in the above-identified patent and that said Letters Patent is hereby corrected as shown below:

In claim 2, at col. 94, lines 8-20, formulas (4c) and (4d) should read

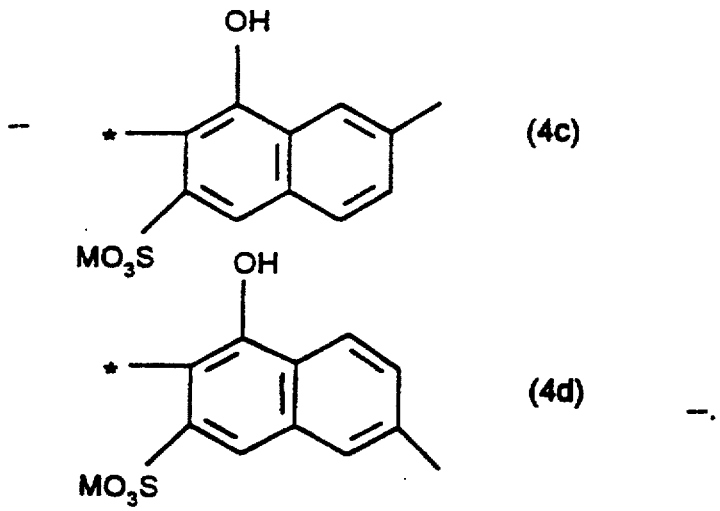

Signed and Sealed this

Ninth Day of March, 1999

Attest:

Q. TODD DICKINSON

Attesting Officer

Acting Commissioner of Patents and Trademarks